(12) United States Patent
Garapati et al.

(10) Patent No.: US 12,135,605 B2
(45) Date of Patent: Nov. 5, 2024

(54) PROBABILISTIC ROOT CAUSE ANALYSIS

(71) Applicant: BMC Software, Inc., Houston, TX (US)

(72) Inventors: Sai Eswar Garapati, Hyderabad (IN); Erhan Giral, Danville, CA (US)

(73) Assignee: BMC Software, Inc., Houston, TX (US)

( * ) Notice: Subject to any disclaimer, the term of this patent is extended or adjusted under 35 U.S.C. 154(b) by 96 days.

(21) Appl. No.: 17/657,628

(22) Filed: Mar. 31, 2022

(65) Prior Publication Data

US 2023/0095270 A1    Mar. 30, 2023

Related U.S. Application Data

(60) Provisional application No. 63/269,807, filed on Mar. 23, 2022, provisional application No. 63/262,997, filed on Oct. 25, 2021, provisional application No. 63/262,994, filed on Oct. 25, 2021, provisional application No. 63/262,995, filed on Oct. 25, 2021, provisional application No. 63/261,627, filed on Sep. 24, 2021, provisional application No. 63/261,629, filed on Sep. 24, 2021.

(51) Int. Cl.
| | |
|---|---|
| *G06F 11/07* | (2006.01) |
| *G06F 16/901* | (2019.01) |
| *G06N 3/08* | (2023.01) |
| *G06N 5/022* | (2023.01) |
| *H04L 41/0631* | (2022.01) |
| *H04L 41/12* | (2022.01) |
| *H04L 41/14* | (2022.01) |

(52) U.S. Cl.
CPC ...... *G06F 11/0793* (2013.01); *G06F 11/0709* (2013.01); *G06F 11/0769* (2013.01); *G06F 11/079* (2013.01); *G06F 16/9024* (2019.01); *G06N 3/08* (2013.01); *G06N 5/022* (2013.01); *H04L 41/0636* (2013.01); *H04L 41/065* (2013.01); *H04L 41/12* (2013.01); *H04L 41/145* (2013.01)

(58) Field of Classification Search
CPC .... G06F 11/079; G06F 16/9024; G06N 5/022
See application file for complete search history.

(56) References Cited

U.S. PATENT DOCUMENTS 11,269,718 B1 *  3/2022  Chen ............... G06F 11/079
11,336,506 B1 *  5/2022  Li ..................... H04N 21/2402
(Continued)

OTHER PUBLICATIONS

L. Zhao: "Event Prediction in the Big Data Era: a Systematic Survey," arXiv preprint, ArXivorg, Aug. 4, 2020, 40 pages.
(Continued)

*Primary Examiner* — Jigar P Patel
(74) *Attorney, Agent, or Firm* — Brake Hughes Bellermann LLP

(57) ABSTRACT

Described systems and techniques determine causal associations between events that occur within an information technology landscape. Individual situations that are likely to represent active occurrences requiring a response may be identified as causal event clusters, without requiring manual tuning to determine cluster boundaries. Consequently, it is possible to identify root causes, analyze effects, predict future events, and prevent undesired outcomes, even in complicated, dispersed, interconnected systems.

21 Claims, 40 Drawing Sheets

(56) References Cited

U.S. PATENT DOCUMENTS

| | | | | |
|---|---|---|---|---|
| 2007/0203870 | A1* | 8/2007 | Saito | G06F 17/10 |
| | | | | 706/52 |
| 2008/0162453 | A1* | 7/2008 | Liu | G06F 16/951 |
| | | | | 707/999.005 |
| 2016/0373535 | A1* | 12/2016 | El Defrawy | H04L 41/22 |
| 2017/0091642 | A1* | 3/2017 | Enck | G16H 50/50 |
| 2020/0268306 | A1* | 8/2020 | Mazumder | A61B 5/4842 |
| 2021/0034618 | A1* | 2/2021 | Lu | G06F 16/2456 |
| 2021/0073285 | A1* | 3/2021 | Hunter | H04L 9/3263 |
| 2021/0158176 | A1* | 5/2021 | Wan | G06F 18/22 |
| 2021/0165704 | A1* | 6/2021 | Savir | G06F 11/079 |
| 2022/0052905 | A1* | 2/2022 | Vasseur | H04L 41/14 |

OTHER PUBLICATIONS

M. Du et al.: "DeepLog: Anomaly Detection and Diagnosis from System Logs through Deep Learning," Proceedings of the 2017 ACM SIGSAC conference on computer and communications security. Oct. 30-Nov. 3, 2017, Dallas, TX, USA, 2017, 14 pages.

R. Boutaba et al.: "A comprehensive survey on machine learning for networking: evolution, applications and research opportunities," Journal of Internet Services and Applications, 9(16), 2018, 99 pages.

W. Liu et al.: "A survey of deep neural network architectures and their applications," Neurocomputing, vol. 234, Apr. 19, 2017, 31 pages.

S. Hochreiter et al.: "Long short-term memory," Neural Computation, vol. 9, No. 8, 1997, pp. 1735-1780.

S. Hochreiter et al.: "Gradient Flow in Recurrent Nets: the Difficulty of Learning Long-Term Dependencies," in a Field Guide to Dynamical Recurrent Neural Networks, IEEE press, 2001, 15 pages.

Y. Li et al.: "Time-Dependent Representation for Neural Event Sequence Prediction," Workshop track—ICLR 2018, arXiv preprint arXiv:1708.00065, Jul. 20, 2018, 11 pages.

R. M. Gray: "Entropy and Information Theory," First Edition, Corrected, Springer-Verlag, New York, Mar. 3, 2013, 311 pages.

J. Tang et al.: "Line: Large-scale Information Network Embedding," in Proceedings of the 24th International Conference on World Wide Web, May 2015, 11 pages.

M. Chen et al.: "Failure Diagnosis Using Decision Trees," International Conference on Autonomic Computing, 2004, Proceedings, IEEE; 2004. 8 pages.

M. Chen et al.: "Pinpoint: Problem Determination in Large, Dynamic Internet Services," Proceedings International Conference on Dependable Systems and Networks, IEEE, 2002, 10 pages.

S. Na et al.: "Resarch on k-means Clustering Algorithm, an Improved k-means Clustering Algorithm," Third International Symposium on Intelligent Information Technology and Security Informatics, 2010, pp. 63-67.

A. Ng et al.: "On Spectral Clustering: Analysis and an algorithm," Advances in Neural Information Processing Systems, 14, 2001, 8 pages.

M. E. J. Newman et al.: "Scaling and Percolation in the small-world network model," Phys. Rev. E 60, 1999, 12 pages.

L. Page et al.: "The PageRank Citation Ranking: Brining Order to the Web," Stanford InfoLab, 1999, 17 pages.

B. James et al.: "How to Predict, prevent, and deflect issues before they impact employees and customers with Predictive AIOps," YouTube video available at https://www.youtube.com/watch?v=FzGvHx-FpiQ, uploaded Mar. 24, 2022.

* cited by examiner

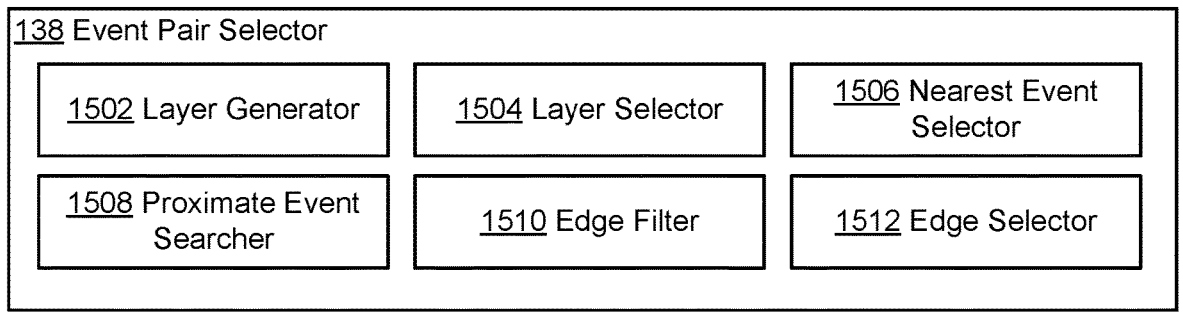
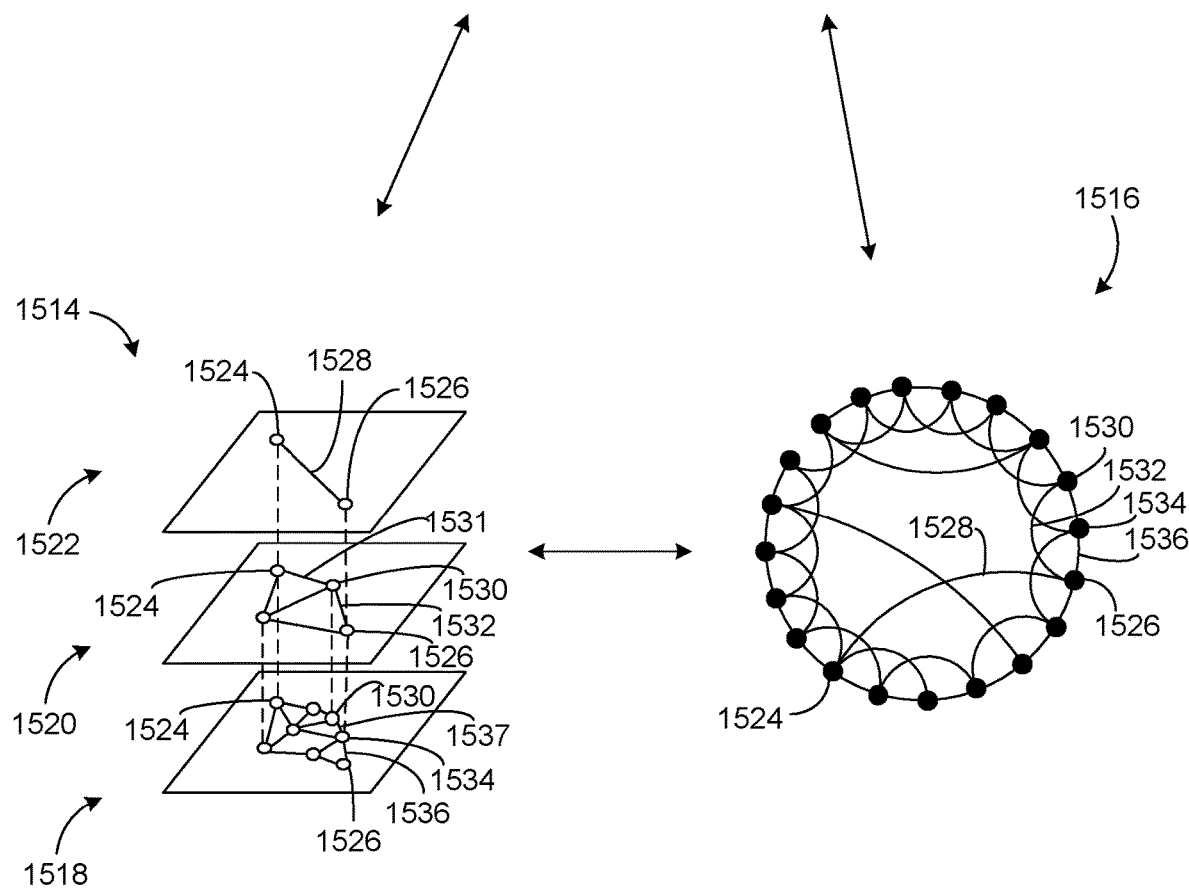
FIG. 15

3400

Automation recommendations ✕

Run-user-1004 file system available space > 1mb a ...

Severity | Priority | Ticket no
CRITICAL | ▲HIGHTEST | INC00007648

| Sr. No | Recommendation name | Success rate | Actions |
|---|---|---|---|
| 1. | Run file system cleanup script<br>This will automatically run a file system cleanup script every time file system available space is less than 100MB | 95% | Run this automation |
| 2. | Delete log files<br>This will automatically temporary files every time file system available space is less than 100 MB | 80% | Run this automation |
| 3. | Delete log files<br>This automatically delete log files every time file system available space is less than 100MB | 65% | Run this automation |
| 4. | Restart application<br>This will automatically restart application to delete unwanted files every time file system available space is less than 100MB | 45% | Run this automation |

Do not see an automation you want to execute?
Request a new automation for this event

3402

Automation submitted ✕

Event details
Run-user-1004 Filesystem available space > 1 mb a...
dm-pun-umfm56.bmc.com ( ▷ )

Automation request submitted successfully

Please rate your experience
☆ ☆ ☆ ☆ ☆

---

Remediation history
RESPONSETIME.VARI... $1002012 ☑ SUBMITTED 18-Apr-20 05:45 pm
RESPONSETIME.VARI... $1002013 ☑ SUCEEDED 18-Apr-20 05:33 pm

| Automation action | User rating |
|---|---|
| ⊙ Restart JVM ☑ | ★★★★☆ |
| ⊙ Add more resources ☑ | ★★★★☆ |
| ⊙ Revert config change ☑ | ★★★★★ |
| ⊙ Change QoS tier ☑ | ★★★☆☆ |
| ⊙ Update routing policy ☑ | ★★★★☆ |
| ⊙ AWS S3 status report ☑ | ★★★★★ |

| Overview | Entities | Situations | Prediction | Automation | Configurtion |

Overview\SharePoint

SharePoint    Last modified:10 mins ago    Impacted Entities
CRITICAL (10% Impacted) similar issue (2 days ago) Health Score 24    CRM
INCIDENT ID   Location   Service Type     Website
INC0000108 2 more Tel Aviv   Discovered     Order

Q | 12:12

[3] Activity Feed 1 min ago — Automation Completed
[12] Collaboration 10 mins ago — I have revered back the changes Sharepoint Health 3 Hrs ▼

(34) / 80%

Events SLO Compliance

▲Incident □Event ○Changes

07:00 AM    8:00 AM    9:00 AM    10:00 AM 10:20 AM

● Probable Cause ✗ Topology ◢ Metric

Portable Causes (% Probability)    Top Situations/Events    | Events | Changes |

82% Impacted Server MSSQL 2012 SP3...

75% Impacted Database mcr-spwfedper-03

60% Impacted Entity mcr-spwfedper-04

Q Search 3 records

| | Message/Type | Occurred | Score | Severity | Status | Priority | Incident ID | Automation | Actions | Feedback |
|---|---|---|---|---|---|---|---|---|---|---|
| ☐ | Run-user-1004 files...10 mins ago | | 89 | CRITICAL | ⊗ | ↑ Highest | INC0000108 | ♥ 2 Available | ⓘ | 👍 👎 |
| ☐ | dev FileSystem... | 15 mins ago | 78 | CRITICAL | ⊗ | ↓ Lowest | INC0007668 | | ⓘ | |
| ☐ | dev FileSystem... | 15 mins ago | 75 | CRITICAL | ⊗ | ↓ Low | INC0007668 | | ⓘ | |

PROBABILISTIC ROOT CAUSE ANALYSIS

CROSS REFERENCE TO RELATED APPLICATIONS

This application claims priority to U.S. Provisional Application No. 63/261,627, filed on Sep. 24, 2021, entitled "NEAR REAL-TIME, INCREMENTAL EVENT CLUSTERING USING MULTI-LAYERED SMALL WORLD NETWORKS AND CAUSAL RELATIONSHIPS", U.S. Provisional Application No. 63/269,807, filed on Mar. 23, 2022, entitled "DIRECTED INCREMENTAL CLUSTERING OF CAUSALLY RELATED EVENTS", U.S. Provisional Application No. 63/261,629, filed on Sep. 24, 2021, entitled "DIRECTED INCREMENTAL DIFFERENTIAL CLUSTERING OF CAUSALLY RELATED EVENTS", U.S. Provisional Application No. 63/262,994, filed on Oct. 25, 2021, entitled "CAUSAL EVENT PREDICTION FOR INFORMATION TECHNOLOGY EVENTS", U.S. Provisional Application No. 63/262,995, filed on Oct. 25, 2021, entitled "RECOMMENDATION OF REMEDIAL ACTIONS FOR IT PROBLEMS WITH CLICK MODELS AND DELAYED FEEDBACK", and U.S. Provisional Application. No. 63/262,997, filed on Oct. 25, 2021, entitled "PROBABILISTIC ROOT CAUSE ANALYSIS FOR IT FAILURES". The disclosures of these earlier filed applications are all incorporated by reference herein in their entireties.

TECHNICAL FIELD

This description relates to network event management.

BACKGROUND

Many companies and other entities have extensive technology landscapes that include numerous Information Technology (IT) assets, including hardware and software. It is often required for such assets to perform at high levels of speed and reliability, while still operating in an efficient manner. For example, various types of computer systems are used by many entities to execute mission critical applications and high volumes of data processing, across many different workstations and peripherals.

Various types of system monitoring methods are used to detect, predict, prevent, mitigate, or cure system faults that might otherwise disrupt or prevent monitored IT assets from achieving system goals. For example, it is possible to monitor various types of performance metrics characterizing aspects of system performance. When monitored values of the detected performance metrics exceed a predetermined threshold, the monitored values may be considered potentially indicative of a current or future system malfunction, and responsive action may be taken.

For the types of extensive technology landscapes referenced above, it may occur that a plurality of events may occur within a given period of time. Various ones of the events may be related to one another. For example, one event may cause a chain reaction involving multiple other events.

When detecting multiple events, however, it may be very difficult to determine what, if any, relationships exist between any two or more of the multiple events. For example, a sheer number of events being examined may make it infeasible or impossible to consider all possible relationships within an amount of time available to respond to the events. Moreover, the interconnected nature of network topologies implies that events may be related to one another across large geographical or topological distances. For these and other reasons, existing network event management tools are often unable to adequately analyze, respond to, predict, or prevent undesired network events.

SUMMARY

According to one general aspect, a computer program product for identifying root causes may be tangibly embodied on a non-transitory computer-readable medium and include executable code that, when executed, causes a computing device to receive an event group, where the event group includes a plurality of nodes, construct and extract a causal graph for the plurality of nodes from the event group using one or more of historical priors, topological priors, real time priors, and custom knowledge priors, and identify a probabilistic root cause from the plurality of nodes by ranking graph vertices from the causal graph.

According to other general aspects, a computer-implemented method may perform the instructions of the computer program product. According to other general aspects, a system, such as a mainframe system or a distributed server system, may include at least one memory, including instructions, and at least one processor that is operably coupled to the at least one memory and that is arranged and configured to execute instructions that, when executed, cause the at least one processor to perform the instructions of the computer program product and/or the operations of the computer-implemented method.

The details of one or more implementations are set forth in the accompanying drawings and the description below. Other features will be apparent from the description and drawings, and from the claims.

BRIEF DESCRIPTION OF THE DRAWINGS

FIG. 15 is a block diagram of a more detailed example implementation of a system for event pair determination using multi-layered small world graphs.

FIG. 34 illustrates an example screen shot for obtaining implicit feedback and explicit feedback.

FIG. 35 illustrates an example screen shot of FIG. 36 is an example flow diagram of a process for using the remediation generator of FIG. 1.

DETAILED DESCRIPTION

Figure 1:
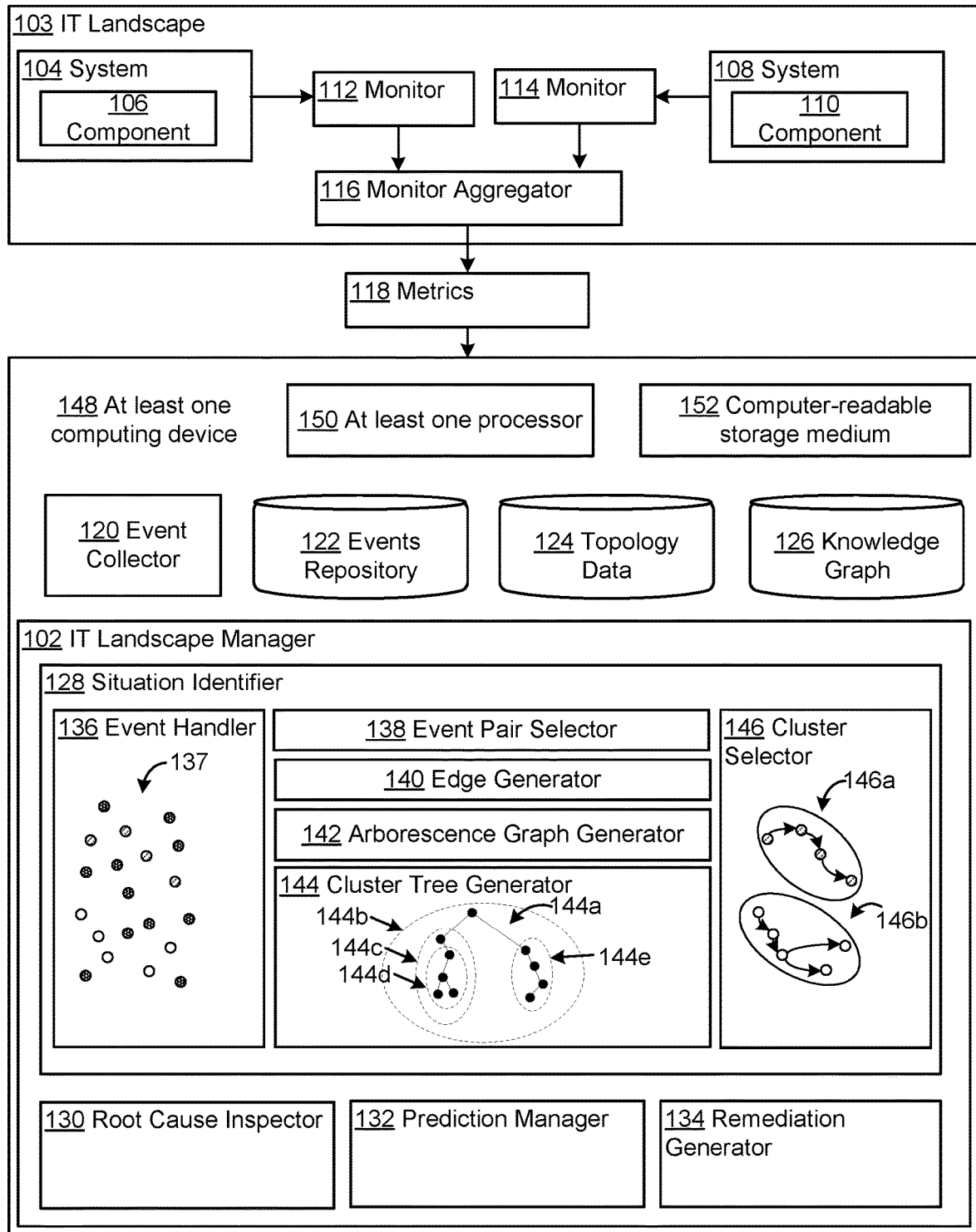
FIG. 1 is a block diagram of a system for directed incremental clustering of causally related events.

Described systems and techniques enable identification of, and insights into, causal associations between events that occur within a technology landscape, such as a crash or a freeze, a memory that reaches capacity, or a resource that becomes inaccessible. Consequently, it is possible to identify root causes of events, analyze their effects, predict future events, and prevent undesired outcomes as a result of the events, even in complicated, dispersed, interconnected systems. Accordingly, with the described systems and techniques, decision-making may be improved across diverse areas such as, e.g., IT management, management of healthcare technology, public and private infrastructure initiatives and enhancements, and industrial or financial ventures. Such areas may be analyzed as networks of events and are prone to difficulty in decision-making because of their interconnectedness and complexity.

Existing methods for network event management may attempt to cluster a plurality of events into smaller individual subsets of events. However, such conventional clustering techniques do not successfully provide causal relationships between pairs or chains of events.

Moreover, such conventional clustering techniques rely on clustering parameters that require periodic or intermittent manual adjustments. As a result, such approaches may be burdensome, impractical, or even impossible for manual manipulation and/or may become increasingly inaccurate over a period of time, until relevant clustering parameters are adjusted. For example, event distributions within a network may change over time, due to corresponding changes in underlying network usage. Such event distribution changes may cause previously configured clustering parameters to become inaccurate or obsolete.

Described techniques, in contrast, determine clusters of events from among potentially large numbers of events, across large, dispersed, and complex network topologies. For each pair of events within an event cluster, a causal direction may be determined. Therefore, a causal chain may be constructed for the event cluster as a whole.

In other words, whereas conventional clustering techniques might cluster three events, event_1, event_2, event_3, as being correlated, described techniques determine a causal relationship between event_1 and event_2, and a causal relationship between event_2 and event_3. Consequently, a causal event chain of event_1 causing event_2 and event_2 causing event_3 may be constructed. Of course, the preceding is highly simplified for the sake of explanation, and as described below, many events may be assembled into causal event chains using described techniques.

As a result, it is possible to determine a root cause event of a constructed causal event chain. By determining a root cause event, it is possible to focus preventative and remediation efforts in an efficient, effective manner.

Further, once a pattern is found that includes a causal event chain and included root cause event, described techniques may be used to train one or more neural networks to recognize the captured pattern(s). Then, the trained neural network(s) may be used to recognize and/or predict patterns in the future.

Additionally, described techniques may be used to enable automated remediation efforts. For example, repairs or reallocations of resources may be automatically formulated, scheduled, and performed, once a root cause event is identified. Similarly, preventative measures may be automatically taken in response to a prediction of a problematic event(s) in the future.

FIG. 1 is a block diagram of a system for directed incremental clustering of causally related events. In the example of FIG. 1, an IT landscape manager 102 may be configured to provide the types of causal chain determination, root cause analysis, performance prediction, and remediation actions referenced above, and described in detail, below.

For purposes of explaining example functionalities of the IT landscape manager 102, FIG. 1 illustrates an IT landscape 103 that includes a system 104 having a component 106, which represents a plurality of components of the system 104. Similarly, the IT landscape 103 includes a system 108 having a component 110, which may itself represent many different individual components. The systems 104, 108 may represent many different types of component-based systems, so that the components 106, 110 may also represent many different types of components.

By way of non-limiting examples, the systems 104, 108 may represent various types of computing environments, such as a mainframe computing environment, a distributed server environment, or any computing environment of an enterprise or organization conducting network-based information technology (IT) transactions. The systems 104, 108 may include many other types of network environments, such as a private network of an enterprise.

The systems 104, 108 may also represent scenarios in which the components 106, 110 represent various types of sensors, such as internet of things devices (IoT) used to monitor environmental conditions and report on corresponding status information. For example, the system 104 may be used to monitor patients in a healthcare setting, working conditions of manufacturing equipment or other types of machinery in many other industrial settings (including the oil, gas, or energy industry), or working conditions of banking equipment, such as automated transaction machines (ATMs).

Thus, the components 106, 110 should be understood broadly to represent any component that may be used in the above and other types of systems to perform a system-related function. Such components may include various types of hardware or software components, or combinations thereof. For example, the components 106, 110 may represent any infrastructure element(s). The components 106, 110 may represent a server, a workstation, a router, or a switch, or may represent more granular hardware components, such as an individual processor or memory.

Similarly, the components 106, 110 may represent various types of software components, such as individual applications, or virtual machines. In further examples, a service may be a type of aggregated component that includes an orchestrated sequence or process of underlying hardware and software components. Many other components, including hosts, databases, or containers, may be included, some examples of which are provided below.

In some implementations, the system 104 and the system 108 may be geographically dispersed from one another. In other examples, the systems 104, 108 may be overlapping systems within a larger network, and may be collocated. Thus, the systems 104, 108 should be understood to represent virtually any IT landscape 103 that may be monitored and managed using the IT landscape manager 102.

In FIG. 1, a monitor 112 is illustrated as monitoring the system 104, including the component 106, while the system 108 (and the component 110) may be monitored by a monitor 114. A monitor aggregator 116 may be configured to oversee and monitor the two or more monitors represented by the monitors 112, 114.

Accordingly, a plurality of metrics 118 may be obtained that provide data characterizing operations of the systems 104, 108, including, e.g., characterizations of a performance or other operations of the systems 104, 108, and of individual components 106, 110, thereof. The metrics 118 may be understood to be, for example, a sequence of metrics collected at defined intervals or timesteps. For example, the metrics 118 may be collected every second, every minute, every 10 minutes, every 30 minutes, or every hour, or at any other time set by an administrator or other user.

Accordingly, the metrics 118 may represent any types of quantified performance characterizations that may be suitable for specific types of components. The metrics 118 represent and include performance metrics providing any corresponding type(s) of data that may be captured and reported, particularly in an ongoing, dynamic fashion, for any of the above-referenced types of systems/components, and various other systems, not specifically mentioned here for the sake of brevity. Metrics 118 may be defined with respect to technical device or network performance, and/or characterized with respect to relevant business performance.

For example, in a setting of online sales or other business transactions, the performance metrics 118 may characterize a condition of many servers being used. In a healthcare setting, the performance metrics 118 may characterize either a condition of patients being monitored or a condition of IoT sensors being used to perform such monitoring. Similarly, the performance metrics 118 may characterize machines being monitored, or IoT sensors performing such monitoring, in manufacturing, industrial, telecommunications, energy, banking, or financial settings. In some examples, which may occur in mainframe, distributed server, or other networking environments, the performance metrics 118 may become or include key performance indicators also known as KPIs.

In the example of FIG. 1, the system monitors 112, 114 are illustrated as separate components from the systems 104, 108. In various implementations, portions of the system monitors 112, 114 may be implemented within their respective systems, or within individual ones of the components 106, 110, and/or the components 106, 110 may be configured to output the metrics 112 directly.

In some implementations, monitoring may require specialized, proprietary, or otherwise configured interfaces to underlying systems or components. The monitor aggregator 116 may be configured to convert or format any monitored metrics, as needed, to provide the metrics 118 as a uniform stream of metrics for processing by the IT landscape manager 102.

In some implementations, the monitor aggregator 116 may be integrated with the IT landscape manager 102. In other implementations, e.g., if a smaller number or type of metrics is/are needed, then the IT landscape manager 102 may interface directly with the system monitor(s) 112, 114 themselves, and the monitor aggregator 116 may be omitted.

As referenced above, the administrator or other user may wish to identify, classify, describe, or predict various network occurrences or other events. For example, such events may relate to, or describe different types of optimal or sub-optimal network behavior. For example, network characteristics such as processing speeds, available bandwidth, available memory, or transmission latencies may be evaluated. These and various other characteristics may be related to specific types of network events, such as a crash or a freeze, a memory that reaches capacity, or a resource that becomes inaccessible.

For ease of explanation, the below description is provided primarily with respect to the types of network-based examples just given. As may be appreciated from the above description, however, such network examples are non-limiting, and the IT landscape manager 102 may be configured to provide similar functionalities in any of the other contexts referenced above (e.g., medical, IoT, manufacturing, or financial), and in many other contexts.

In many cases, the metrics 118 may represent extremely large quantities of data, since individual values for individual metrics may be collected at frequent time intervals.

Consequently, it may be impractical or infeasible to store all such metric values. Moreover, there may be limited utility in storing metric values that are associated with normal system usage.

In the example of FIG. 1, an event collector 120 may be configured to analyze the metrics 118 and determine whether any events are included therein, or may be determined therefrom, that may require processing by the IT landscape manager 102. In this context, the term event should be understood broadly to refer to any occurrence within the IT landscape 103 that may be determined from analysis of one or more metric value(s) of the metrics 118.

For example, a metric may each be associated with a threshold value, and an event may be determined when the threshold value is exceeded (or not reached). For example, a memory being 80% full may cause a notification or alert to be generated, so that a response may be implemented to mitigate or avoid system failures. Such thresholds may be set in a static or dynamic fashion. Such thresholds may be set with respect to device or network performance requirement, and/or with respect to relevant business performance requirements.

In other examples, the event may be determined from one or more metric values using other techniques. For example, the neural network may be trained to recognize a metric value as being anomalous in specific contexts. In other examples, the event may be determined for a particular metric value when the metric value varies to a certain extent, or in a predefined way, from historical norms for that metric value.

The event may be defined with respect to a single metric value, such as a particular memory, as just referenced, or may be defined with respect to multiple metric values. Multiple such single events may thus occur at a single timestep.

In other examples, an event may be defined with respect to a plurality or combination of variables, such as when a system crash affects multiple components. Therefore, an event may include one or more metric values and related information (e.g., generated alerts or thresholds exceeded), including specific combinations thereof.

The event collector 120 may thus be configured to determine events from the metrics 118, using any of the above techniques, or other techniques not mentioned here, or combinations thereof. The event collector 120 may store collected events within an events repository 122.

The events repository 122 may thus contain a large number of events. Each event may be stored together with any relevant information, such as timestamps or related thresholds. Various examples of events are provided and discussed below in more detail.

As referenced above, events may be isolated, correlated, or causal. Multiple or pluralities of events may occur together that have a cumulative or compounded effect(s). For example, events may occur together in the sense that they are proximate in time, close in geographical distance, and/or local to one another within a network topology. For example, two events may occur at consecutive timesteps but across a network topology, or, conversely, may occur within a single device but with multiple timesteps occurring in between.

In the following description, such pluralities of events may be referred to as event clusters. An event cluster may thus define a singular situation that has an impact on operations of one or more of the systems 104, 108. Put another way, the event may represent an alarm that may or may not require a response, while a situation may represent a problem that requires a response. Thus, a situation may include events that are aggregated based on various factors, including, e.g., occurrence, message, and/or topology.

For example, in a simplified example, a server may have a required response time. If the server exceeds the required response time, then the event may be detected by the event collector 120 and stored in the events repository 122. If no other component requires a response from the server during the response time requirement, then there may not be a downstream effect other than the delayed response itself. On the other hand, if another component does require a response from the server during the response time requirement, then the operations of that component may be delayed and may cause other undesired effects.

Topology data 124 represents any data that reflects or describes network topologies associated with the systems 104, 108. In some cases, topology data 124 may include relatively static topology data that may be captured and stored for use by the IT landscape manager 102 as described herein. In many cases, however, topology data 124 may represent or include dynamic topology data that changes based on underlying needs.

For example, in the context of executing business transactions (e.g., seasonal increase in sales or increase in insurance claims after a weather catastrophe), there may be a spike in demand for related network resources. In response, additional resources may be allocated dynamically to accommodate the demand, and then re-allocated when the demand is reduced. In other examples, new resources may be deployed as new services are offered. Various topology discovery tools may be used to discover a current network topology and related information, including use of information collected by one or more of the monitor 112, the monitor 114, or the monitor aggregator 116. More detailed examples of network topologies are provided below, or would be apparent to one of skill in the art.

In example topology approaches, a multi-layer approach may be used. For example, a topmost layer may contain connections between software components, such as calling relationships between front-end servers and back-end servers. Middle layer(s) may contain infrastructure topology data between different virtualized and physical infrastructures, such as relationships between containers and virtual machines. Lower layer(s) may contain network infrastructure information, such as relationships between networking components such as switches and routers.

A knowledge graph 126 represents another source of data for use by the IT landscape manager 102, as described below. For example, the knowledge graph 126 may be used to capture domain knowledge that is entity-specific, user-specific, or deployment-specific. The knowledge graph 126 may include user knowledge captured declaratively in graph form over time and/or in response to changes being made to the systems 104, 108.

For example, two entities may deploy networks with very similar topologies, but which differ based on underlying use-case scenarios. Such use-case scenarios may dictate, for example, a response of an application or service. Therefore, the knowledge graph 126 may include, for example, various domain heuristics, ontological inferences, legacy configuration data, and various other types of domain knowledge. Additional examples and explanations of the knowledge graph 126 are provided below.

For example, the knowledge graph 126 may include known relationships across monitored entities and may use a graph-based data model to represent domain knowledge. A framework of monitored entities may enable capture of data from experts, either manually or by machine learning to create the knowledge graph 126. The knowledge graph 126 may be constructed as a directed labelled graph.

In some scenarios, there may be overlapping data or types of data stored in the topology data 124 and the knowledge graph 126. Additionally, there may be other types of network data available with respect to the system 104, the system 108, or any aspect of the IT landscape 103 monitored by the IT landscape manager 102.

As referenced above, and described in detail, below, the IT landscape manager 102 may be configured to use the events repository 122, the topology data 124, the knowledge graph 126, and any other available sources of network data, to ensure smooth, continuous operation of the IT landscape 103 being monitored. For example, the IT landscape manager 102 may be configured to determine causal connections between event pairs to construct causal event clusters, which identify situations occurring within the IT landscape. Further, the IT landscape manager 102 may be configured to use the identified situations to determine root cause events thereof, to predict potential occurrences of similar situations in the future, and to automatically remediate actual or potential situations.

In more detail, the IT landscape manager 102 may include a situation identifier 128, which may be configured to analyze sets of events from the event collector 120 and/or the events repository 122 to determine one or more situations that have occurred, or are occurring, within the IT landscape 103. As referenced above, the situation may refer to a group or cluster of individual events that are determined to be causally related to one another and that have some combined impact within the IT landscape 103.

For example, the situation may include a large-scale situation such as a system-wide crash. In other examples, the situation may include a smaller scale situation such as a component freeze. In general, the situation may be considered to include one or more events that require attention, repair, or remediation, or that have some other consequence for users of the IT landscape.

That is, as referenced above, some individual events may be transient or harmless when occurring in isolation. Some detected events may raise a false alarm and may not require any attention or action on the part of an administrator or user. Some detected events may have an impact that does not rise to the level of requiring action in response, such as when a response time of the component 110 is slowed, but a response time of the system 108 as a whole remains within acceptable levels.

The situation, on the other hand, as used herein, generally requires some response. The situation may reflect an aggregate impact of multiple events. In some cases, however, the situation could be caused by, or include, a single event. In many cases, multiple situations may occur within a single time period, or across overlapping time periods. Consequently, when multiple situations occur within single or overlapping time period(s), and each situation includes multiple events, it may be difficult to determine which events should be included within each situation.

In more specific examples, the events repository 122 may include a large number of individual events. For example, the situation identifier 128 may analyze a set of 50 events from the events repository 122. In this particular example, the 50 events may be selected as occurring during a time period that includes a system crash of the system 104 and a component freeze of the component 110.

The situation identifier 128 may be configured to determine a group or cluster of 10 events from the set of 50 events that led up to, and caused, the system crash of the system 104, and a separate group or cluster of 15 events that led up to, and caused, the component freeze of the component 110. A remaining 25 events of the 50 events may be determined to be causally unrelated to the two situations being examined.

Moreover, as referenced above and described in detail, below, the situation identifier 128 may be configured to characterize the 10 events causing the system crash as a first directed graph and the 15 events causing the component freeze as a second directed graph. For example, each event in the 10 events causing the system crash of the system 104 may have either a parent or a child event, or both.

In conventional approaches to clustering events, event clusters include potentially correlated events, without establishing a causal direction between individual pairs of events. Consequently, it is difficult in conventional approaches to determine whether an individual event is either a cause of or an effect of another event or is merely correlated with another event.

In contrast, the situation identifier 128 provides directed clusters of events that define corresponding situations. Consequently, a root cause inspector 130 may be configured to identify, within each directed cluster of events, one or more specific events that should be a focus for correcting the situation, or for avoiding the situation in the future.

For example, in the examples above, the 10 events leading to the system crash of the system 104 may each include corresponding system violations, such as excessive memory usage. However, the excess memory usage may be caused by an underlying application that is malfunctioning, which also may be causing other events (e.g., excessive processor usage).

The root cause inspector 130 may thus be configured to identify an event of a directed cluster of events as a root cause event. In many scenarios, however, identifying a root cause node may be more complex than simply picking an earliest event node within the directed cluster of event nodes. Additional features and functions of the root cause inspector 130 are provided below, e.g., with respect to FIGS. 38-40.

Thus, the situation identifier 128 and the root cause inspector 130 may be configured to identify a situation and its root cause. Consequently, the administrator or user may be provided with an ability to resolve a situation quickly, efficiently, and reliably.

Moreover, a prediction manager 132 may be configured to utilize captured situation information, root cause information, and resolution information of multiple situations that occur over time, to thereby predict similar situations prior to such predicted situation actually occurring. For example, machine learning algorithms may be trained using the actual situation, root cause, and/or resolution data, so that the trained algorithms may then predict similar situation in the future. Additional features and functions of the prediction manager 132 are provided below, e.g., with respect to FIGS. 22-29.

A remediation generator 134 may be configured to determine and execute remediation techniques to address and resolve situations in an automated manner. That is, instead of, or in addition to, the administrator or user taking action to resolve actual situations, or avoid predicted situations, the remediation generator 134 may be configured to do so with little or no human interaction or moderation. Additional features and functions of the remediation generator 134 are provided below, e.g., with respect to FIGS. 30-37.

The situation identifier 128 may further include an event handler 136. The event handler 136 may be configured to identify which events from the events repository 122 to be further processed by the situation identifier 128.

In the simplified example of FIG. 1, the event handler 136 is shown as determining an event set 137 that includes a number of events. For example, the event set 137 may represent a static set of events. For example, the event set 137 may be captured as occurring within a specified time window prior to some recognized situation(s) to be examined. In other examples, the event set 137 may be captured as being related to a particular network(s), geographical location(s), and/or any other factors that may be relevant to diagnosing situation(s) that have occurred.

In other examples, the event set 137 may represent a dynamic event set. For example, new events determined by the event collector 120 and stored within the events repository 122 may be added to the event set 137 upon arrival in the event handler 136 if determined to be potentially relevant to the situation analysis being performed.

An event pair selector 138 may be configured to analyze selected pairs of events from the event set 137. For example, in some examples, the event pair selector 138 may be configured to analyze each pair-wise combination of all of the events of the event set 137.

In many scenarios, however, it may be undesirable, infeasible, or inefficient to select all possible pairs of events within the event set 137. For example, the event set 137 may include too many events to perform a complete pair-wise analysis of all included events in an effective or efficient manner.

In other examples, some event pairs may be more valuable than others for purposes of identification and processing by the situation identifier 128. Moreover, as referenced above, the event set 137 may dynamically change over time, and the event pair selector 138 may benefit from being configured to incrementally add new events to the event set 137. Related example operations of these and similar functions of some implementations of the event pair selector 138 are described below, e.g., with respect to FIGS. 15-20.

In any of the above examples, and other scenarios, the event pair selector 138 may be configured to filter some events from the event set 137 prior to, or in conjunction with, selecting event pairs for further processing. For example, the event pair selector 138 may be configured to identify and filter low-entropy events.

For each event pair determined by the event pair selector 138, an edge generator 140 may be configured to determine a causal probability that indicates both a direction and a score associated with an intervening edge. As referenced above, and described in detail, below, the edge generator 140 may calculate and quantify a probability that one event of an event pair being analyzed caused (or was caused by) the other event of the event pair.

For example, for an event pair of event_1 and event_2, a causal probability may be determined as to whether event_1 caused event_2, or vice versa. In the following description, calculated probabilities are normalized between [0, 1]. However, many different representations of the calculated probabilities may be used.

Thus, the calculated probability may be used to indicate a direction between the two events, and the magnitude of the calculated probability may be used to indicate a strength of the causal connection. In some cases, an event pair may not have a causal connection, or the calculated causal probability may be indeterminate or otherwise unusable. In these cases, one or both of the events of such event pairs may be omitted from further analysis by the edge generator 140.

The edge generator 140 may be configured to determine and characterize causal pairs of events (which may be referred to as causal event pairs) using one or more of a plurality of techniques and data sources. For example, the event pair selector 138 may be configured to consider all candidate edges between candidate pairs and remove uncorrelated edges therefrom. Then, the edge generator 140 may be configured to apply one or more types of orientation rules and available, relevant data, in order to determine a direction and causal strength of each remaining edge.

Techniques for calculating causal event pair edges are described in more detail, below, e.g., with respect to FIGS. 38-40. For purposes of explaining FIG. 1, it may be appreciated that the edge generator 140 may utilize various types of data referred to herein as 'priors,' to indicate types of information determined prior to the edge calculations being performed.

For example, topological priors may be determined from the topology data 124. For example, as described above, the topology data 124 may reflect and describe connections between and among the various systems and components of the IT landscape 103. Therefore, knowledge of such connections may be leveraged to determine a probability as to whether and to what extent events at two connected components were likely to have been causally related.

Similarly, the knowledge graph 126 may include custom knowledge priors collected over time from administrators or users such as customers. For example, such knowledge may be obtained in the form of customer feedback, such as may occur after previously resolved situations. Knowledge needed to make accurate edge characterizations for causal event pairs may be obtained directly, through the use of generated questionnaires provided to administrators or users to collect needed information.

In other examples, historical or real-time priors may be used, which refer to past or concurrent IT landscape data collected in various contexts and formats. For example, the metrics 118 may be analyzed during normal operations of the IT landscape to collect and aggregate information characterizing historical or current operations of the IT landscape 103 that may be relevant. In other examples, some types of historical and/or real-time priors may be collected in the context of the events repository 122.

The edge generator 140 may use any one or more of the above-referenced types of priors, or other types of priors, to calculate desired edges for causal event pairs, including both a direction and a causality strength for each causal event pair. The causality strength may be understood to characterize, for example, a level of certainty with which one event of a causal event pair may be said to cause the other event of the causal event pair. The causality strength may also be understood to represent a degree of similarity of the two events of a causal event pair, in the sense that the two events similarly appear within a single situation or type of situation.

As mentioned above, the causal strength may be expressed as a normalized value between [0, 1]. For example, a causal strength may be expressed as 0.8. In some implementations below, two events of a causal event pair may be said to be related to one another by a distance, which may also be referred to as a topological distance, that is defined as an inverse of the causal strength, e.g., as (1−causal strength). For the example just given with a causal strength of 0.8, the same causal event pair may be said to be separated by a distance of (1−0.8)=0.2.

Once causal event pairs and intervening edges have been determined, an arborescence graph generator 142 may be configured to transform the event pairs and edges into an arborescence graph. An arborescence graph is a directed graph in which, for a vertex u called the root and any other vertex v, there is exactly one directed path from u to v. An arborescence may also be understood as the directed-graph form of a rooted tree structure.

The arborescence graph generator 142 may be capable of generating many different instances of arborescence graphs from the causal event pairs and intervening edges provided by the edge generator 140, because, for example, there may be many different paths to follow within the causal event pairs and intervening edges. In FIG. 1, the arborescence graph generator 142 may be configured to generate and provide the instance of the potential minimum arborescence graphs in which, for each directed path from u to v, the summed edge scores of the included edges within that directed path are the least number of edge scores. Such an arborescence graph may be referred to as a minimum arborescence graph. Techniques for generating the arborescence graph, including the minimum arborescence graph, are described in detail, below, e.g., with respect to FIGS. 5 and 14.

A cluster tree generator 144 may then be configured to convert the arborescence graph into a cluster tree 144a. As described below, e.g., with respect to FIGS. 6-8 and 14, the cluster tree 144a refers to a modification or enhancement of the arborescence graph in which potential or candidate event clusters 144b, 144c, 144d, 144e are identified and characterized for further evaluation.

For example, the cluster tree generator 144 may be configured to generate the cluster tree 144a with each candidate event cluster 144b, 144c, 144d, 144e therein having a corresponding causal score. For example, two (or more) causal event pairs (that is, four or more total events) within the arborescence graph that have the same causal score may be grouped within a single candidate event cluster having that same causal score as its cluster score. Thus, individual candidate event clusters may be identified by their respective cluster scores and by their respective placements within the hierarchy of the cluster tree 144a. For example, two candidate event clusters (e.g., 144c and 144e) may have the same cluster score but may be differentiated by their respective placements within the cluster tree 144a.

Thus, the candidate event clusters 144b, 144c, 144d, 144e may be arranged hierarchically within the cluster tree 144a, based on the arborescence graph determined by the arborescence graph generator 142. Thus, each candidate event cluster 144b, 144c, 144d, 144e may have a parent and/or child candidate event cluster. For example, the candidate event cluster 144c is a parent of the candidate event cluster 144d, and the candidate event cluster 144b is a parent of the candidate event clusters 144c and 144e.

Then, a cluster selector 146 may be configured to analyze the cluster tree 144a, using the cluster scores of the candidate event clusters and the layout of the cluster tree 144a, to identify and select specific event clusters from the candidate event clusters 144b, 144c, 144d, 144e, which are shown in FIG. 1 as event clusters 146a, 146b. For example, selecting the largest candidate event cluster 144b may not helpful, because the candidate event cluster 144b may be too inclusive and may not define a situation that is sufficiently isolated for further analysis by the root cause inspector 130 to be helpful. On the other hand, the candidate event cluster 144d may be too small to provide useful insights, e.g., may be part of a larger situation that may not be recognizable from just the candidate event cluster 144d.

The cluster selector 146 thus performs an optimization in which event clusters are defined and selected at levels that are representative of situations large enough to be meaningfully analyzed, without being so large as to be over-inclusive. For example, as described in detail, below, the cluster selector 146 may use differences between cluster scores of parent candidate event clusters and child candidate event clusters to determine an effective merger limit of a candidate event cluster, at which point that candidate event cluster would be merged with another candidate event cluster.

As referenced above, in conventional clustering solutions using correlated events without causal connections being available, cluster identifications as causal require manual selection and tuning based on, e.g., underlying characteristics of the IT landscape 103, or of the included events. In FIG. 1, however, the arborescence graph of the arborescence graph generator and the cluster tree 144a provide causal connections between events, and the cluster selector 146 may automatically determine optimum clustering parameters in a dynamic fashion over time, without requiring manual tuning.

Consequently, as referenced above, and described in detail, below, the clusters 146a, 146b may represent specific problems or other situations to be resolved within the IT landscape 103. Thus, the root cause inspector 130 may be configured to determine a root cause event of each of the clusters 146a, 146b, and, in some examples, the remediation generator 134 may be configured to automatically generate and execute remediation plans.

For example, in simplified examples, the event cluster 146a may be related to a low disk space error caused by a root node of the event cluster 146a. Remediation efforts may include cleaning up the disk in question and/or adding more disk space. For example, the event cluster 146b may be related to a database query response time degradation error caused by a root node of the event cluster 146b. Remediation efforts may include cleaning up relevant queues and restarting the database in question.

In the example of FIG. 1, the IT landscape manager 102 is illustrated as being provided using at least one computing device 148, which includes at least one processor 150 and a non-transitory computer-readable storage medium 152. Thus, the at least one computing device 148 may represent multiple computers, a mainframe(s), a server(s), a virtual machine(s), or other computing devices connected by a suitable network, any one of which may include multiple processors represented by the at least one processor 150, as well as multiple types of memories represented by the non-transitory computer-readable storage medium 152. For example, instructions may be stored on the non-transitory computer-readable storage medium 152 for execution by the at least one processor 150.

Accordingly, any of the event collector 120, events repository 122, topology data 124, and/or knowledge graph 126 may be executed or stored using a plurality of networked computers and need not be provided using the same computer(s) as used to provide the IT landscape manager 103. In some implementations, the monitors 112, 114 or the monitor aggregator 116 may be executed using the at least one computing device 148. In some implementations, any of the event collector 120, events repository 122, topology data 124, and/or knowledge graph 126 may be incorporated into the IT landscape manager 103. Many other implementations are possible.

The simplified example of FIG. 1 omits many components or aspects of the at least one computing device 148, for the sake of brevity. For example, the at least one computing device 148 may include, or have access to, a suitable display for displaying any of the inputs or outputs of the situation identifier 128, the root cause inspector 130, the prediction manager 132, and/or the remediation manager 134. For example, a suitable graphical user interface (GUI) may be used to display the clusters 146a, 146b, along with related aspects or details.

Figure 2:
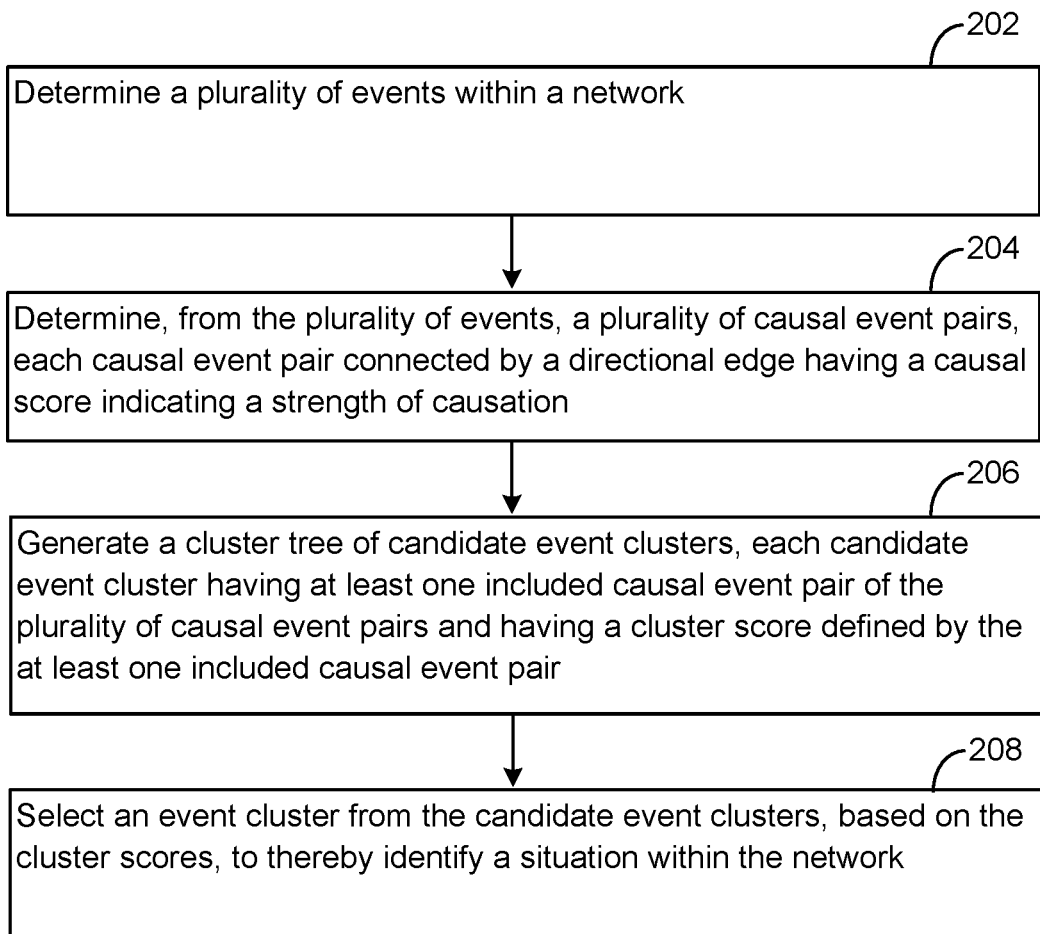
FIG. 2 is a flowchart illustrating example operations of the system of FIG. 1.

FIG. 2 is a flowchart illustrating example operations of the system 104 of FIG. 1. In the example of FIG. 2, operations 202-208 are illustrated as separate, sequential operations. In various implementations, the operations 202-208 may include sub-operations, may be performed in a different order, may include alternative or additional operations, or may omit one or more operations. Further, in all such implementations, included operations may be performed in an iterative, looped, nested, or branched fashion.

In FIG. 2, a plurality of events within a network may be determined (202). For example, the event handler 136 may be configured to determine the event set 137, using the event collector 120 or the events repository 122. As described, the event set 137 may be a static set of events or may be a dynamically changing set of events.

A plurality of causal event pairs may be determined from the plurality of events, each causal event pair connected by a directional edge having a causal score indicating a strength of causation (204). For example, the event pair selector 138 may determine pairs of events from the event set 137 that are causally connected, as referenced above and described in detail below.

A cluster tree of candidate event clusters may be generated, each candidate event cluster having at least one included causal event pair of the plurality of causal event pairs and having a cluster score defined by the at least one included causal event pair (206). For example, the causal event pairs of the event pair selector 138 may be formed into an arborescence graph by the arborescence graph generator 142. Then, the cluster tree generator 144 may generate the cluster tree 144a from the arborescence graph. For example, as described below with respect to FIGS. 5 and 6, causal event pairs may be grouped by corresponding causal scores thereof and positioned within the cluster tree 144a based on the hierarchical structure of the arborescence graph.

An event cluster may be selected from the candidate event clusters, based on the cluster scores, to thereby identify a situation within the network (208). For example, the cluster selector 146 may be configured to determine a difference in cluster scores between a parent candidate cluster and a child or nested candidate cluster, as well as a difference in cluster scores between the parent candidate cluster and its own parent (grandparent) candidate cluster. By comparing these differences, the cluster selector 146 may determine whether is it preferable, for example, to maintain the child candidate cluster as a selected event cluster, or to merge the child candidate cluster into the parent candidate cluster to define a selected event cluster.

Put another way, the cluster selector 146 may be configured to compare expansions of parent candidate clusters and child candidate clusters, and to select for example, the candidate cluster that takes longer to expand into its parent candidate cluster as a selected event cluster. For example, in FIG. 1 if both the candidate event clusters 144c and 144d expanded at the same rate of change, the candidate event cluster 144d may merge into its parent candidate cluster 144c prior to the parent candidate event cluster 144c merging into its own parent candidate cluster 144b. In other words, the child candidate event cluster 144d may merge into the parent candidate event cluster 144c prior to the parent candidate event cluster 144c merging into the grandparent candidate event cluster 144b. Consequently, the cluster selector 146 may select the candidate event cluster 144c as the selected event cluster 146b.

In the above simplified example, the parent candidate event cluster is discussed as having a single child candidate event cluster. In practice, however, a parent candidate event cluster may have two or more child candidate event clusters. Consequently, the cluster selector 146 may be configured to perform the above-described analyses of a parent candidate event cluster with two or more relevant child candidate event clusters. In such scenarios, the cluster selector 146 may be configured to compare the rate of change of expansion of the parent candidate event cluster with an aggregate measure of the rate(s) of change of expansion of the various child candidate event clusters. Consequently, the parent candidate event cluster may be generally more likely to be retained as a selected cluster than any individual one of the multiple child candidate event nodes.

Figure 3:
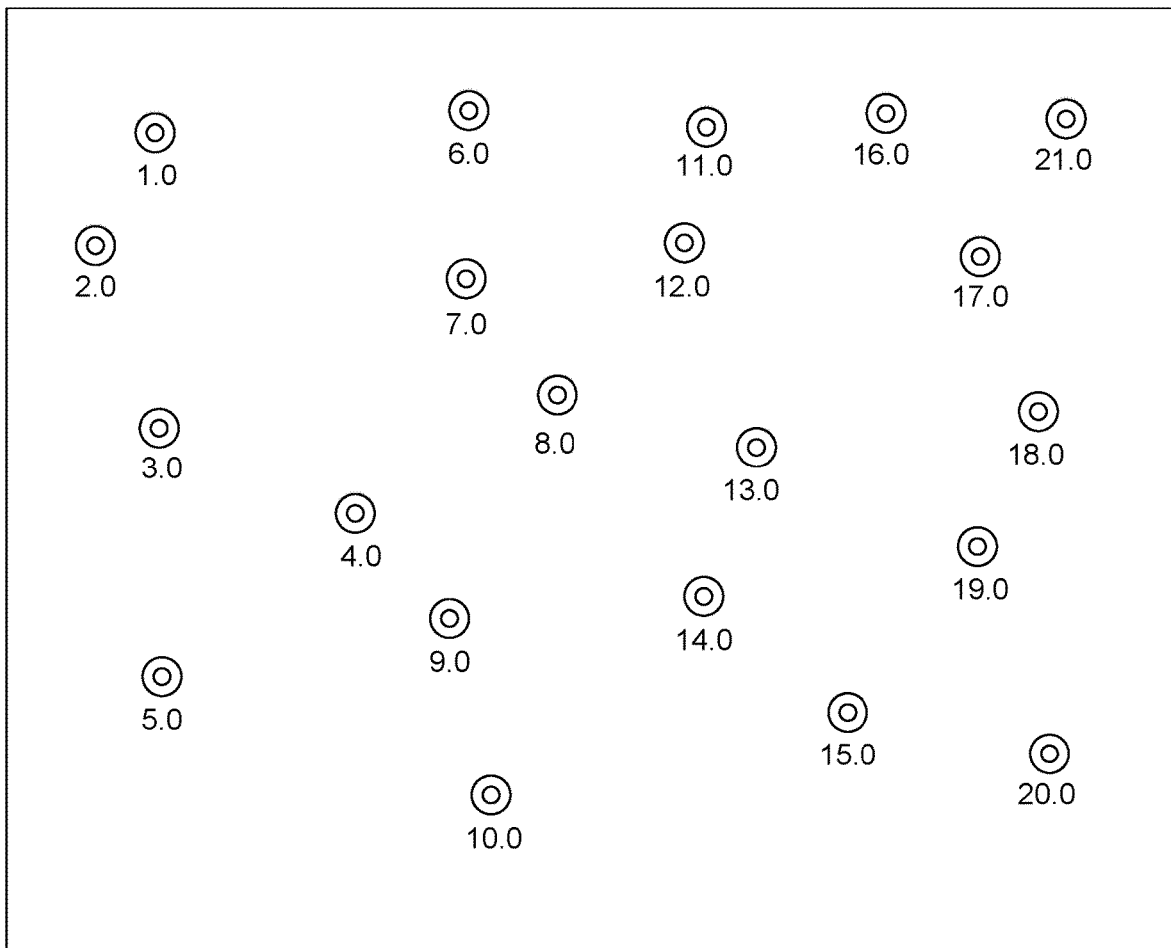
FIG. 3 illustrates an event set that may be processed by the system of FIG. 1.

FIG. 3 illustrates an event set 300 that may be processed by the system of FIG. 1. For example, FIG. 3 may illustrate an example of the event set 137 of FIG. 1. In the simplified example of FIG. 3, twenty-one events are illustrated, and numbered consecutively as events 1.0-21.0.

It will be appreciated from the above description of FIGS. 1-2 that the events 1.0-21.0 may represent many different types of events captured by the event collector 120 using the metrics 118. For example, events may include a breach of a threshold measuring a total number of allowed queries. Events may include a response time breach for one or more types of components (e.g., a server or a webservice). Events may include indications of statistically rare occurrences that are known to indicate potential problems, such as a number of concurrent invocations occurring beyond a known percentile probability range.

As already described, such events may occur over a period of time within the IT landscape 103. Individual events may be harmless or may not require action in response. Certain ones of the events may be causally related, however, and may cumulatively lead to problems or other situations that require a response. For example, in a network context, a database may have slow response times, which may be caused by a slow disk used to implement the database. The disk may be network-connected and may be slowed by a misconfiguration of a router connected to the disk.

As described above, such causal chains or other causal relationships may be determined as causal event clusters by the situation identifier 128 of FIG. 1. FIGS. 4-9 provide more detailed examples of operations of the situation identifier 128, using the example event set 300 of FIG. 3.

Figure 4:
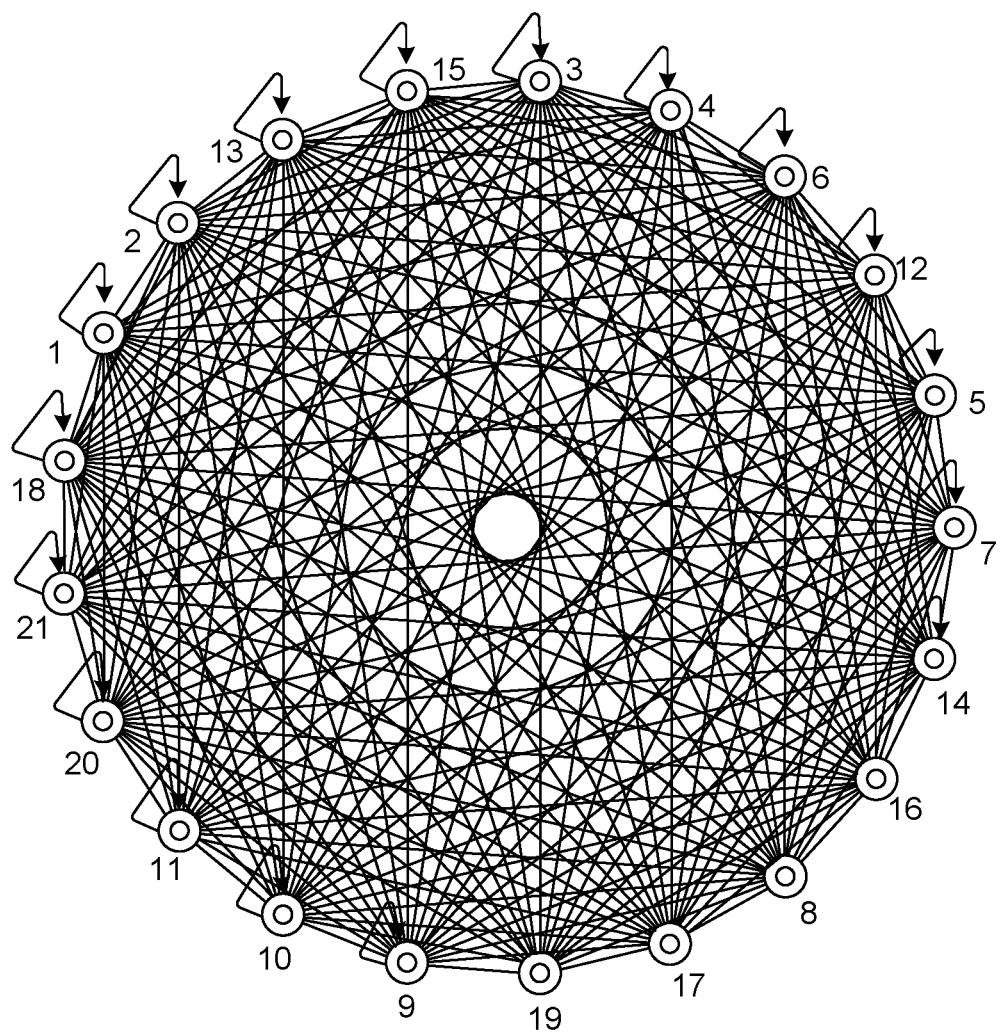
FIG. 4 illustrates possible event pairs of the event set of FIG. 3.

FIG. 4 illustrates example operations of the event pair selector 138. As shown in FIG. 4, the event pair selector 138 may determine all possible pair-wise combinations of the individual events 1.0-21.0, to determine candidate causal event pairs. The edge generator 140 may then determine and assign a causal score to each resulting edge connecting each candidate causal event pair. The causal score also may be referred to as an edge weight.

The causal score may be used to characterize a similarity of events in each candidate causal event pair and/or likelihood that the two events in each pair occur together. For example, two events may be considered to be more likely to be causally related if the two events occur within a certain time window as one another, with a decaying probability of being causally related outside of that time window. As a result of using such a methodology, each of the individual events 1.0-21.0 is illustrated as being causally related to itself, reflecting the tautological recognition of an event occurring when it occurs. Various other techniques may be used to assign causal scores, as referenced above and described in more detail, below.

In the following examples, the causal scores may be normalized to be within a causal score range, e.g., [0, 1]. A causal score may be expressed as a causal strength, so that two events of a candidate causal event pair may have a causal strength of 0.8. A causal score also may be referred to as a distance and expressed as an inverse of the causal strength. For example, the same two events may be referred to as having a distance of (1.0−0.8)=0.2 between them.

Although mathematically equivalent and interchangeable for practical purposes, the preceding terminologies may be used in different contexts to express different aspects of operation of the situation identifier 128. For example, the cluster tree generator 144 and the cluster selector 146 may be said to construct and evaluate candidate event clusters based on relative distances therebetween, because it is intuitive to consider whether event nodes are near or far from one another when attempting to form clusters of those event nodes.

FIG. 4 illustrates that for even a relatively small number of events, a large number of candidate causal event pairs may exist. The edge generator 140 may be configured to reduce the number of candidate causal event pairs, e.g., by filtering out candidate causal event pairs with causal scores outside of a pre-determined threshold. Nonetheless, a resulting number of candidate causal event pairs may be infeasible or inefficient to use for purposes of defining event clusters with respect to the events 1.0-21.0.

Alternatively, FIGS. 15-20 illustrate and describe techniques for determining candidate causal event pairs in a more efficient manner. As described there, candidate causal event pairs may be determined and expressed using a multi-layer, small world network, which enables a determination of an optimized subset of the candidate causal event pairs of FIG. 4. Moreover, the techniques of FIGS. 15-20 may be used to incrementally add new events to the multi-layer, small world network, so that the event set 300 of FIG. 3 may grow over time as new, relevant events arrive, and those new events may be processed in a fast, efficient manner.

Figure 5:
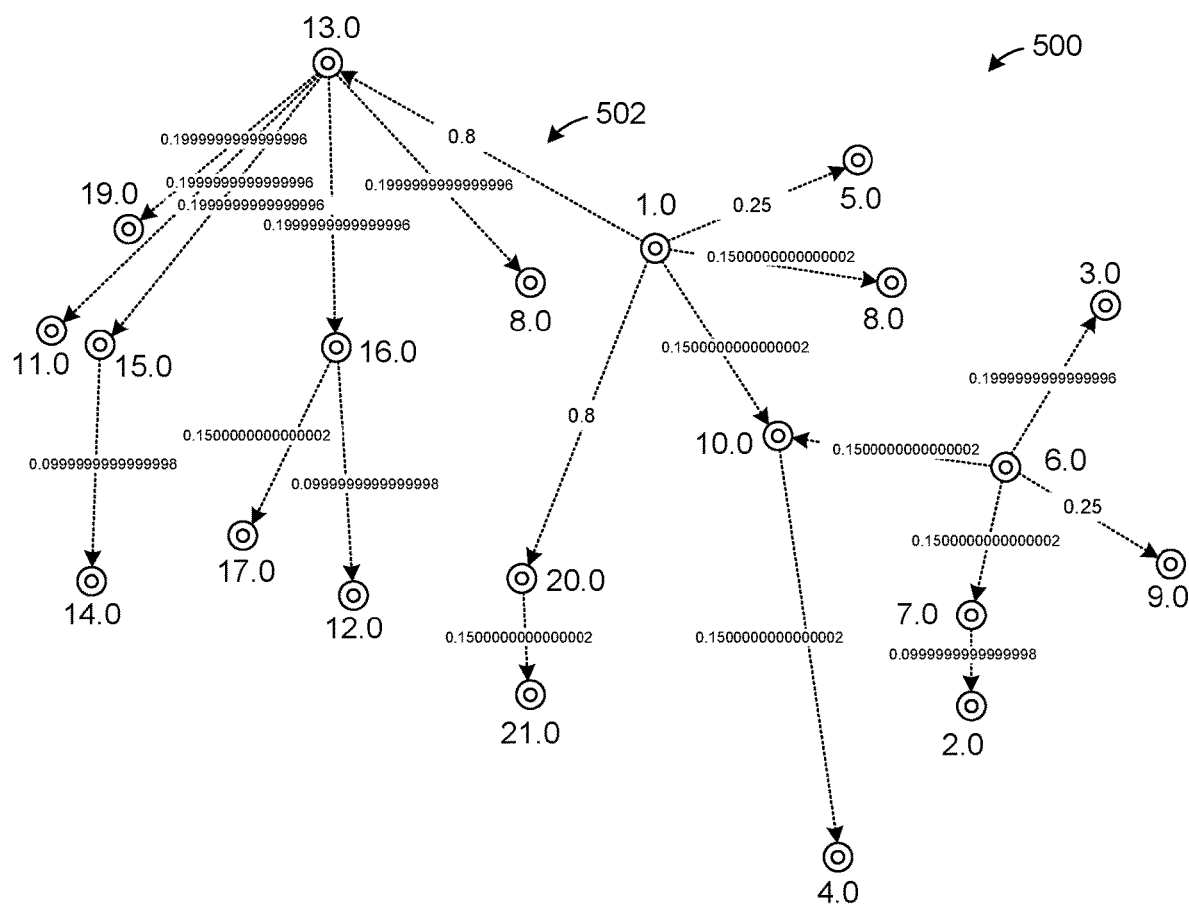
FIG. 5 illustrates an arborescence graph generated using the event pairs of FIG. 4.

FIG. 5 illustrates an arborescence graph 500 generated using the event pairs of FIG. 4. For example, the arborescence graph 500 includes a subset of the events 1.0-21.0 of the event set 300 of FIG. 3, arranged using the determined directions and weights of the causal event scores of each causal event pair. As shown, for example, the event 13.0 is directionally connected to event 1.0 by an edge 502 with determined distance of 0.8.

In more detail, the arborescence graph generator 142 of FIG. 1 may be configured to generate the arborescence graph 500 of FIG. 5 as a directed tree in which, for a root vertex 'u' and any other vertex 'v,' there is exactly one directed path between u to v. The arborescence graph 500 also may be defined as a directed, rooted tree in which all edges point away from the root. Thus, the arborescence graph 500 is an example of a directed acyclic graph (DAG), although not every DAG forms an arborescence graph.

Put another way, the arborescence graph 500 of FIG. 5 may be considered to represent an instance of many possible graph instances that could be generated from the causal event pairs of FIG. 4. For example, a given event of FIG. 4 may have many different incoming or outgoing edges (e.g., may be paired with multiple other events), however described techniques are able to select a minimum number of incoming and outgoing edges of each event node to facilitate and optimize subsequent cluster tree generation and resulting event cluster selection.

As an example optimization, the arborescence graph 500 may be constructed as a minimum arborescence graph, in which a sum of edge weights, with causal scores expressed as distances, is minimized. The minimum arborescence graph 500 of FIG. 5 thus provides a global optimization of the determined causal event pairs in which total distances between all nodes of each directed path are minimized, while ensuring that an appropriate subset of events of the event set 300 are included. In other examples, however, the arborescence graph 500 may be constructed as a maximum arborescence graph, in which a sum of edge weights, with causal scores expressed as causal strengths, is maximized.

Various techniques for calculating the arborescence graph 500 of FIG. 5 from candidate causal event pairs are known and are not described here in detail for the sake of brevity. For example, the Chu-Liu/Edmonds' algorithm and/or the Gabow and Tarjan algorithm may be used. In other examples, other types of directed graphs may be constructed using available causal event pairs.

Figure 6:
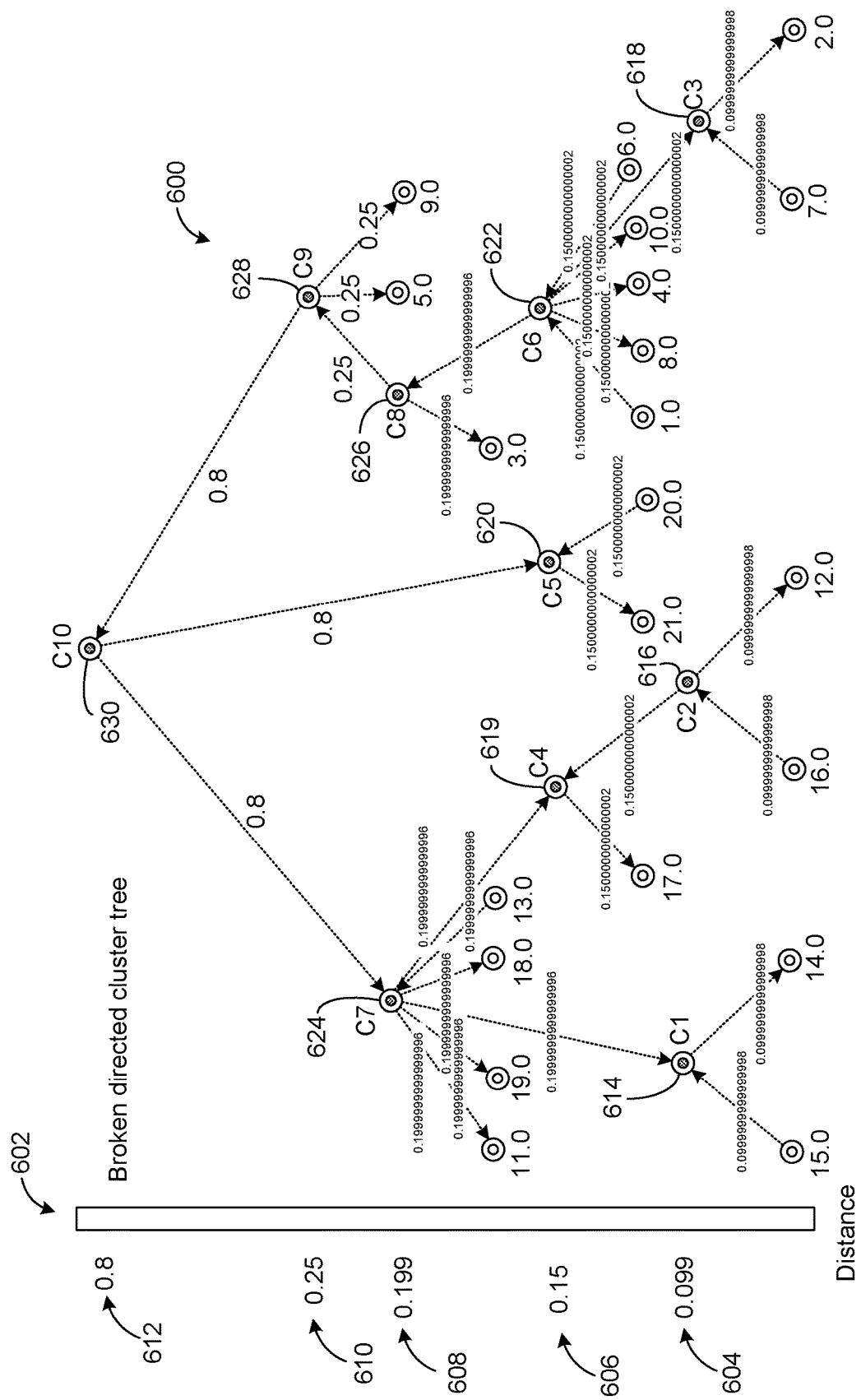
FIG. 6 illustrates a cluster tree generated using the arborescence graph of FIG. 5.

FIG. 6 illustrates a cluster tree 600 generated using the arborescence graph of FIG. 5. In the example, the minimum arborescence graph 500 of FIG. 5 may be leveraged to identify optimum structures and distances to be used by the cluster tree generator 144 and the cluster selector 146, as described in detail, below, with respect to FIGS. 6-9.

Figure 7:
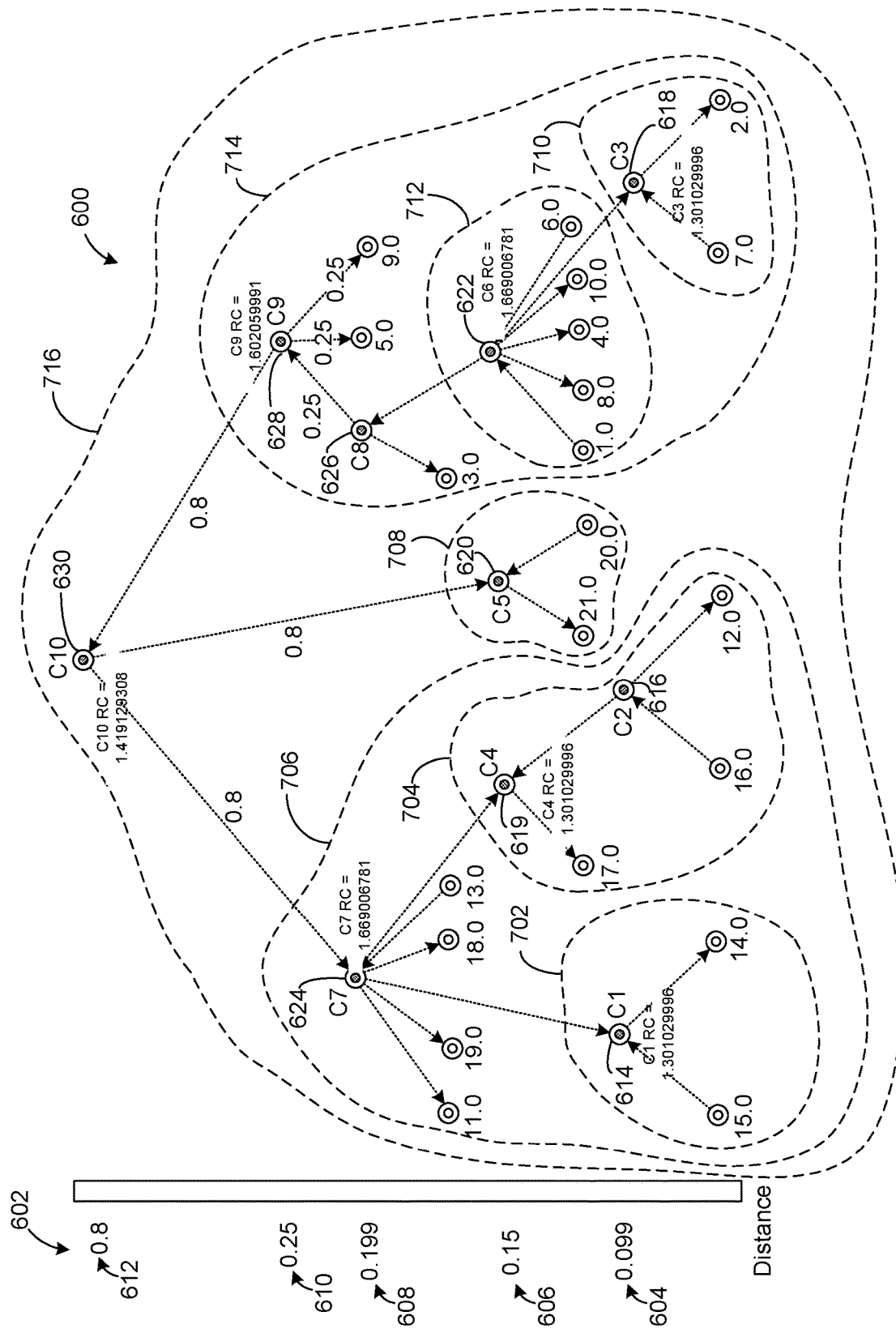
FIG. 7 illustrates the cluster tree of FIG. 6 with rate of change calculations for included candidate event clusters.
Figure 8:
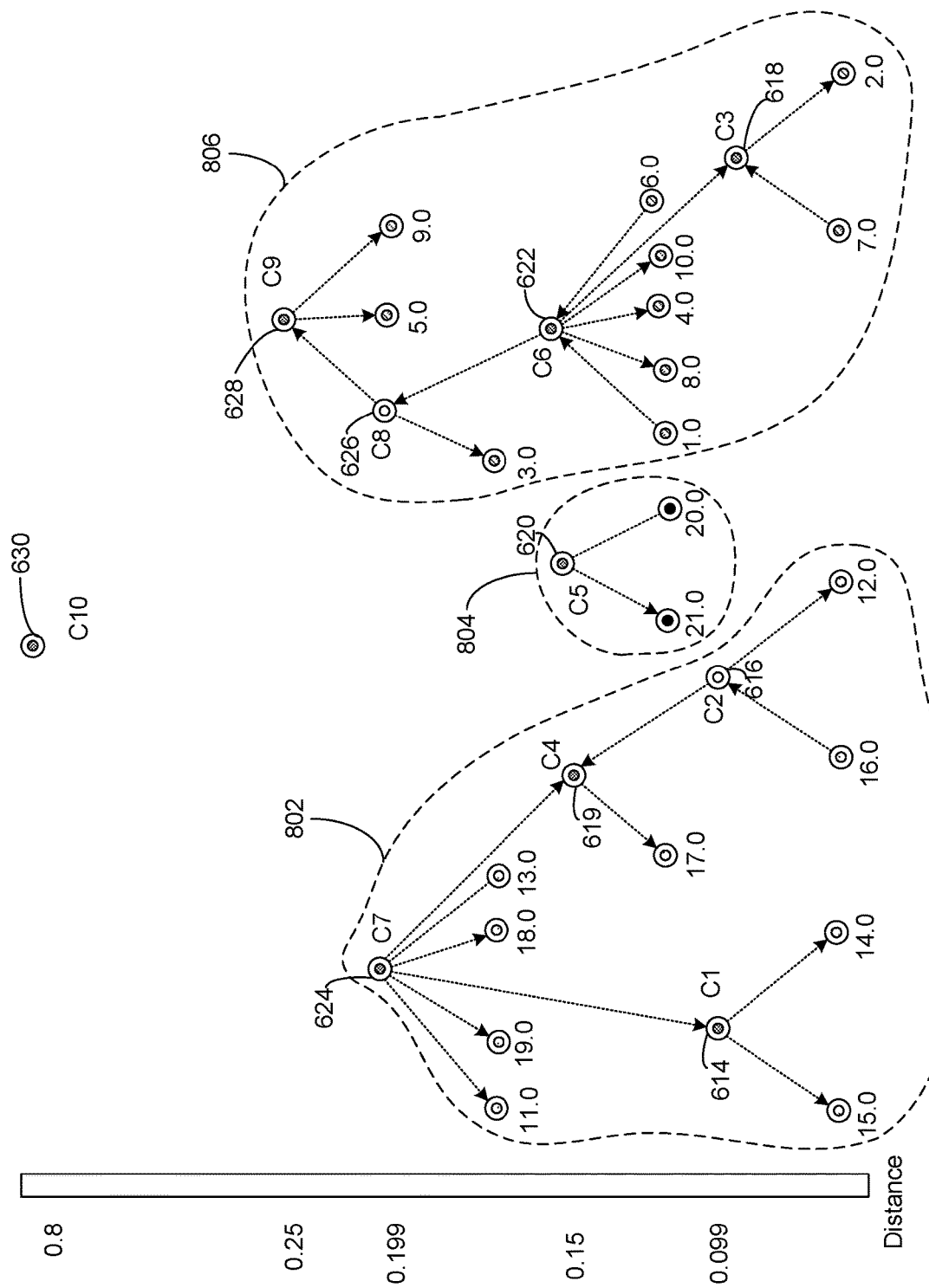
FIG. 8 illustrates event clusters selected from the candidate event clusters of FIG. 7.

For example, FIG. 6 illustrates a cluster tree 600 with a corresponding distance axis 602. The distance axis 602 may be scaled according to the normalized range of causal scores, e.g., [0, 1] as described above. In FIGS. 6-8, however, distances are not necessarily drawn to scale, and are not limiting as to the manners in which distances may be determined or displayed for purposes of constructing and using the cluster tree 600.

Further in FIG. 6, the distance axis 602 includes specific cluster levels 604, 606, 608, 610, 612, which represent and correspond to existing distances within the arborescence graph 500. For example, with reference to FIG. 5, the distance 0.09999999999999998 defining cluster level 604 occurs with respect to (between) event pairs 14.0/15.0, 12.0/16.0, and 2.0/7.0. The distance 0.15000000000000002 defining cluster level 606 occurs with respect to (between) event pairs 16.0/17.0, 1.0/10.0, 4.0/10.0, 1.0/8.0, 10.0/6.0, and 20/21. The distance 0.19999999999999996 defining cluster level 608 occurs with respect to (between) event pairs 13.0/19.0, 13.0/11.0, 13.0/15.0, 13.0/16.0, 13.0/8.0, and 3.0/6.0. The distance 0.25 defining cluster level 610 occurs with respect to (between) event pairs 6.0/9.0 and 1.0/5.0. The distance 0.8 defining cluster level 612 occurs with respect to (between) event pairs 1.0/13.0 and 1.0/20.0. The preceding listing is non-exhaustive and illustrates that there are a finite number (set) of distances between node pairs within the arborescence graph 500, and that these distances may be used to define cluster levels, and therefore candidate event clusters, within the cluster tree 600.

For example, a candidate event cluster C1 614 is defined at cluster level 604 as including events 14.0 and 15.0, which are shown as being causally related in FIG. 5 with a causal score represented as a distance of 0.09999999999999998. A candidate event cluster C2 616 is defined at cluster level 604 as including events 12.0 and 16.0, which are shown as being causally related in FIG. 5 with a causal score represented as a distance of 0.09999999999999998. A candidate event cluster C3 618 is defined at cluster level 606 as including events 2.0 and 7.0, which are shown as being causally related in FIG. 5 with a causal score represented as a distance of 0.09999999999999998.

Similarly, a candidate event cluster C4 619 is defined at cluster level 606 as including event 17.0 and the events 12.0, 16.0 of the candidate event cluster 616, which are shown as being causally related in FIG. 5 with a causal score represented as a distance of 0.15000000000000002. A candidate event cluster C5 620 is defined at cluster level 606 as including events 20.0 and 21.0, which are shown as being causally related in FIG. 5 with a causal score represented as a distance of 0.15000000000000002. A candidate event cluster C6 622 is defined at cluster level 606 as including event pairs 1.0/8.0 and 4.0/10.0, which are shown as being causally related in FIG. 5 with a causal score represented as a distance of 0.15000000000000002, as well as event 6.0, which is shown as being causally related to the events 2.0/7.0 of candidate event cluster C3 618 with a causal score represented as a distance of 0.15000000000000002.

A candidate event cluster C7 624 is defined at cluster level 608 as including event 13.0 paired with each of events 11.0, 19.0, and 18.0 with a causal score represented as a distance of 0.19999999999999996, as shown in FIG. 6. The candidate event cluster C7 624 also includes child candidate event clusters C1 614 and C4 619 as shown at a distance of 0.19999999999999996 in FIG. 6.

Also at cluster level 608, a candidate event cluster C8 626 illustrates that event 3.0 is separated from the events of the candidate event cluster C6 622 by a distance of 0.19999999999999996 (and its child candidate event cluster C3 618). A candidate event cluster C9 628 at the cluster level 610 illustrates that events 5.0 and 9.0 each have a causal score represented as a distance of 0.25 from their respective paired events of 1.0 and 6.0, respectively.

Finally in FIG. 6, a candidate event cluster C10 630 is illustrated with candidate event clusters C7 624, C5 620, C9 628 as child candidate event clusters. As may be observed from FIG. 5, events 13.0 and 1.0 are a causal event pair separated by a distance of 0.8 and events 20.0 and 1.0 are a causal event pair separated by a distance of 0.8.

Thus, as shown by FIGS. 5 and 6, the minimum arborescence graph 500 of FIG. 5 may be used to identify the optimum distances for candidate cluster levels. Then, candidate event clusters may be identified by matching causal event pairs with their corresponding cluster levels, working from least to greatest distances/cluster levels.

FIG. 7 illustrates the cluster tree of FIG. 6 with rate of change calculations for included candidate event clusters, as referenced above with respect to FIG. 1. For example, FIG. 7 illustrates a candidate event cluster 702 corresponding to the candidate event cluster C1 614, and a candidate event cluster 704 corresponding to the candidate event cluster C4 619, both of which are child candidate event clusters of a parent candidate event cluster 706 corresponding to the candidate event cluster C7 624. In the example implementation, the candidate event cluster C2 616 may be filtered from further consideration as being below a size threshold, and only considered in the context of its parent candidate event cluster C4 619.

Similarly, a candidate event cluster C5 620 may be considered as candidate event cluster 708. A candidate event cluster C3 618 may be considered as candidate event cluster 710, with the candidate event cluster C6 622 as its parent candidate event cluster 712. The parent candidate event cluster 712 is itself included with a candidate event cluster 714 corresponding to the candidate event cluster C9 628. Similar to the candidate event cluster C2 616 vis-à-vis its parent event cluster C4 619, the candidate event cluster C8 626 may be filtered from further consideration and only considered in the context of its parent candidate event cluster C9 628 (i.e., candidate event cluster 714). Finally in FIG. 7, the candidate event cluster C10 630 may be defined as candidate event cluster 716, in which all of the remaining illustrated events are included.

Thus, by way of analogy with the more abstracted, higher-level view of FIG. 1, the candidate event cluster(s) 702 and/or 704 may correspond to the candidate event cluster 144d of FIG. 1, while the candidate event cluster 706 may correspond to the candidate event cluster 144c of FIG. 1, and the candidate event cluster 716 may correspond to the candidate event cluster 144b of FIG. 1. Similarly, the candidate event cluster 714 may correspond to the candidate event cluster 144e of FIG. 1.

Consequently, as described with respect to FIG. 1, the cluster tree generator 144 may be configured to calculate a relative rate of change of each candidate event cluster 702, 704, 706, 708, 710 with respect to its parent and/or child candidate event cluster(s), so as to determine and select event clusters 802, 804, 806 of FIG. 8. That is, for each candidate event cluster, the rate of change considers a starting distance $D_{st}$ that is the cluster level of the candidate event cluster being considered, and an ending distance $D_e$ that is the cluster level of a parent candidate event cluster of the candidate event cluster being considered. The rate of change also considers a starting distance $C_{st}$ that is the cluster level of the candidate event cluster being considered, and an ending distance $C_e$ that is the cluster level of a child candidate event cluster of the candidate event cluster being considered. Then, the rate of change compares the calculated distance $(D_{st}-D_e)$ with the distance $(C_{st}-C_e)$ to determine an overall Rate of Change $(R_c)$ for the candidate event cluster being examined.

In a more specific example, an $R_c$ value may be calculated for the candidate event cluster 706, with respect to its parent candidate event cluster 716 and child candidate event cluster 702. As shown in FIG. 7, the candidate event cluster 706 has a starting distance $D_{st}$ of 0.19999999999999996, and an ending distance $D_e$ of 0.8. The difference $(D_{st}-D_e)$ calculated with respect to the parent candidate event cluster 716 would thus be approximately 0.6. The candidate event cluster 706 has a starting distance $C_{st}$ of 0.19999999999999996 an ending distance $C_e$ of 0.09999999999999998 with respect to the child candidate event cluster 702. The difference $(C_{st}-C_e)$ calculated with respect to the child candidate event cluster 702 would thus be approximately 0.1. Comparing the ratio of 0.6/0.19 thus yields a rate of change of approximately 6.

The above example is non-limiting, and the rate of change $R_c$ may be calculated in multiple different ways. For example, it is mathematically consistent to calculate $R_c = [\log(D_{st}/D_e)/\log(C_{st}/C_e)]$, which has the benefit of normalizing resulting values. This normalizing calculation was used in calculating illustrated values of $R_c$ shown in FIG. 7, but again, other comparable techniques may be used.

Regardless of manner of calculation, however, the rate of change parameter $R_c$ effectively characterizes a stability of each candidate event cluster using a common scale, so that the cluster selector 146 may select more stable candidate event clusters as selected event clusters. Put another way, the rate of change determines, for each candidate event cluster, a distance that the candidate event cluster may expand before merging into another candidate event cluster, where candidate event clusters that can expand relatively farther distances without merging are considered to be more stable than candidate event clusters that merge quickly with (are closer to) adjacent candidate event clusters.

For example, comparisons and selections may be made working in a direction of child candidate event clusters to parent candidate event clusters and comparing $R_c$ of each child candidate event cluster with $R_c$ of its parent candidate event cluster. If a parent candidate event cluster has multiple child candidate event clusters, then $R_c$ of the parent candidate event cluster may be compared to a sum of $R_c$ values for all of the included children.

Put another way, if the rate of change of the parent candidate event cluster is less than the rate of change of the sum of its children candidate event clusters, then the cluster selector 146 may be configured to keep the rate of change of the parent candidate event cluster and to discard the compared child event cluster(s). Otherwise, if the rate of change of the parent candidate event cluster is more than the rate of change of the sum of its children candidate event clusters, then the cluster selector 146 may be configured to retain the rate of change of the child candidate event cluster(s) for propagation upwards within the cluster tree until the root cluster 716 is reached.

FIG. 8 illustrates the result of the above-described rate of change calculations. The candidate event cluster 706 of FIG. 7 is selected as event cluster 802, while candidate event cluster 708 of FIG. 7 is selected as event cluster 804, and candidate event cluster 714 of FIG. 7 is selected as event cluster 806. As may also be observed, the candidate event clusters 702, 704 are merged into the selected event cluster 802, and the candidate event clusters 710, 712 are merged into the selected event cluster 806.

Figure 9:
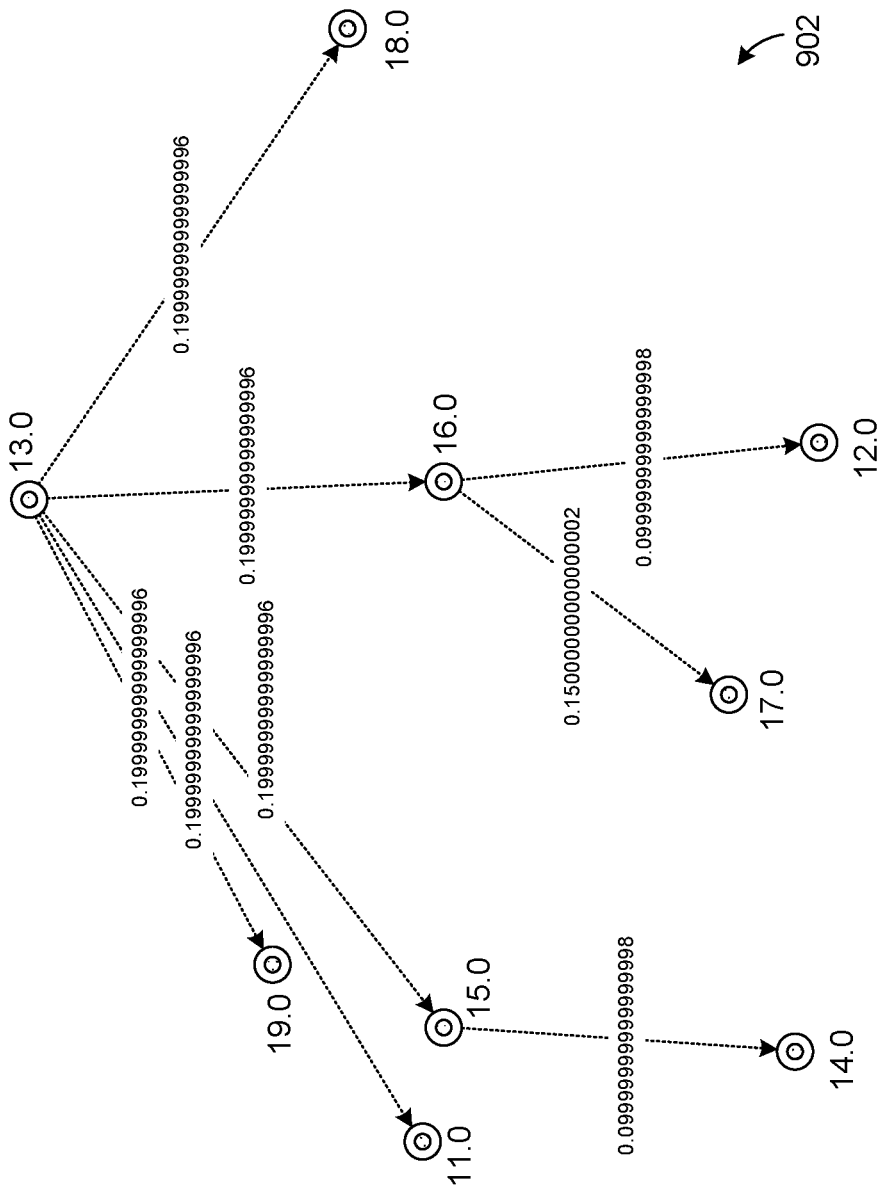
FIG. 9 illustrates a final event cluster of the event clusters of FIG. 8.

FIG. 9 illustrates a final event cluster 902 of the clusters of FIG. 8. As shown, the example final event cluster 902 includes all of the events of the selected cluster 802 of FIG. 8, but without the cluster nodes 614, 616, 619, 624, and rearranged based on the directionality of each of the various included edges. As a result, the original tree structure exhibited by the included events in the arborescence graph 500 of FIG. 5 is illustrated in the final event cluster 902, showing the event 13.0 as a root node.

Figure 10:
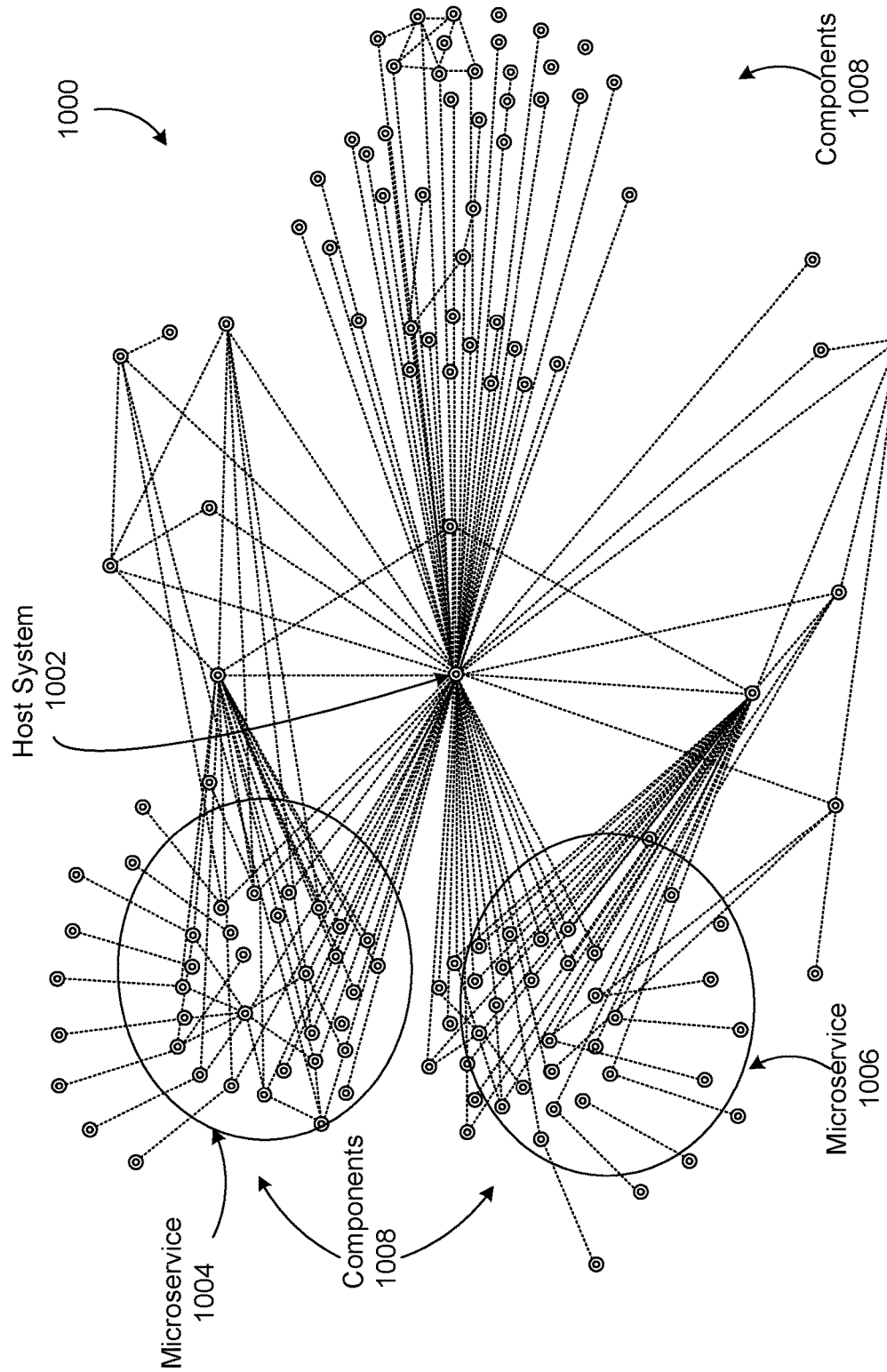
FIG. 10 illustrates an example topology for which event clusters may be determined using the techniques of FIGS. 1-9.

FIG. 10 illustrates an example topology 1000 for which event clusters may be determined using the techniques of FIGS. 1-9. In the example of FIG. 10, the topology 1000 includes a host system 1002 that provides or leverages a plurality of system components 1008 to enable various services or other features. In the specific example, two independent microservices 1004, 1006 are shared by the host system 1002. Of course, this is a non-limiting example, and many other topologies may be processed using described techniques.

Figure 11:
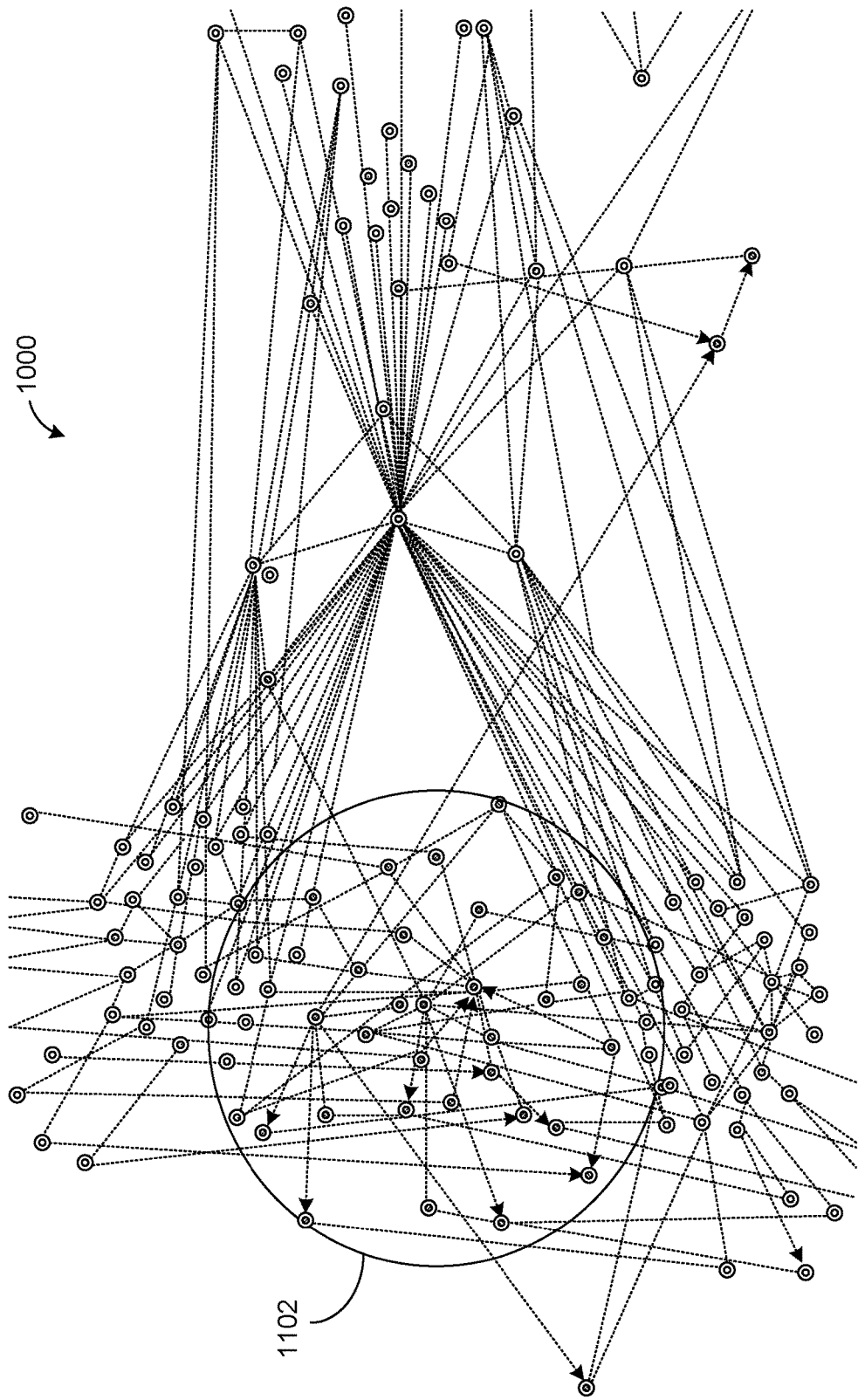
FIG. 11 illustrates an example event set with determined causal event pairs for the example of FIG. 10.

FIG. 11 illustrates an example event set 1102 with determined causal event pairs for the example of FIG. 10. That is, whereas FIG. 10 illustrates the example topology 1000 including sites of the microservices 1004, 1006, FIG. 11 further illustrates topology 1000 with various events captured with respect to individual devices, nodes, or other components of the topology 1000. The events form the event set 1102, analogous to the event set 137 of FIG. 1 or the event set 300 of FIG. 3. The event handler 136 may thus be considered to have determined individual events to include within the event set 1102 in FIG. 11, the event pair selector 138 may have identified individual causal event pairs, and the edge generator 140 may have determined corresponding causality directions and scores for the various causal event pairs, as described above with respect to FIGS. 3 and 4, and as described in more detail, below, with respect to FIGS. 15-20.

As also described above, the various events of the event set 1102 may include one or more event subsets that relate specifically to individual problems or other situations, which may be characterized as corresponding event clusters. Observing the event set 1102 of FIG. 11, by itself, does not provide sufficiently specific information to identify and analyze such individual situations.

Figure 12:
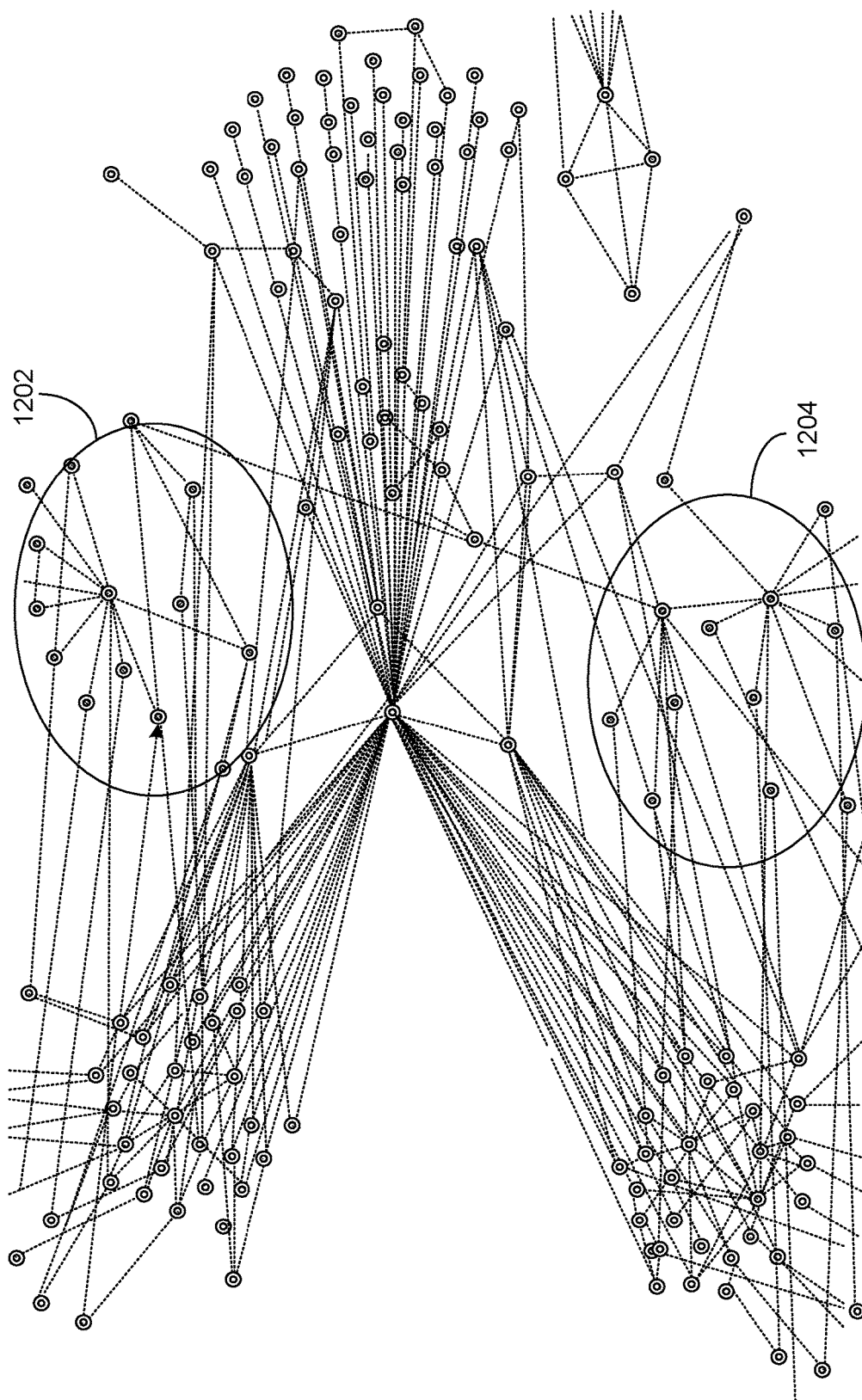
FIG. 12 illustrates two example clusters determined from the causal event pairs of FIG. 11.

FIG. 12 illustrates two example event clusters 1202, 1204 determined from the causal event pairs of FIG. 11. In FIG. 12, individual event clusters (situations) 1202 and 1204 are identified by implementing above-described operations of the arborescence graph generator 142, the cluster tree generator 144, and the cluster selector 146, as illustrated and described with respect to FIGS. 5-9. As illustrated, the situation 1202 may be determined to be for example, an application performance situation on microservice 1004 of FIG. 10, while the situation 1204 may be determined to be for example a database failure situation on microservice 1006 of FIG. 10.

Figure 13:
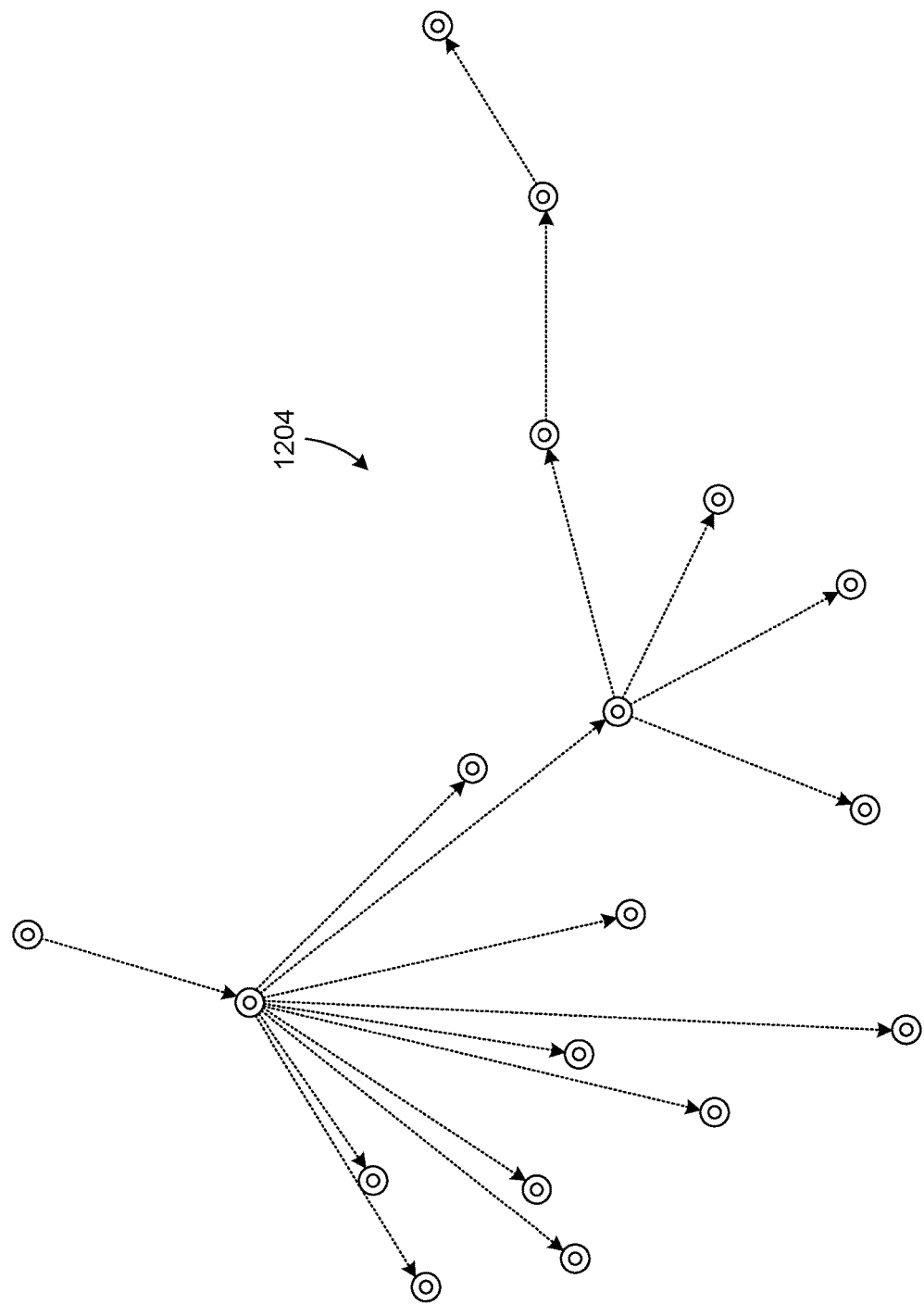
FIG. 13 illustrates a more detailed example of one of the two example clusters of FIG. 12.

FIG. 13 illustrates a more detailed example of the example event cluster 1204 of FIG. 12. In FIG. 13, the referenced database failure situation on microservice 1006 is illustrated in more detail to demonstrate that all relevant events have been identified, along with a causal flow between the events and causal scores between individual causal event pairs.

Figure 14:
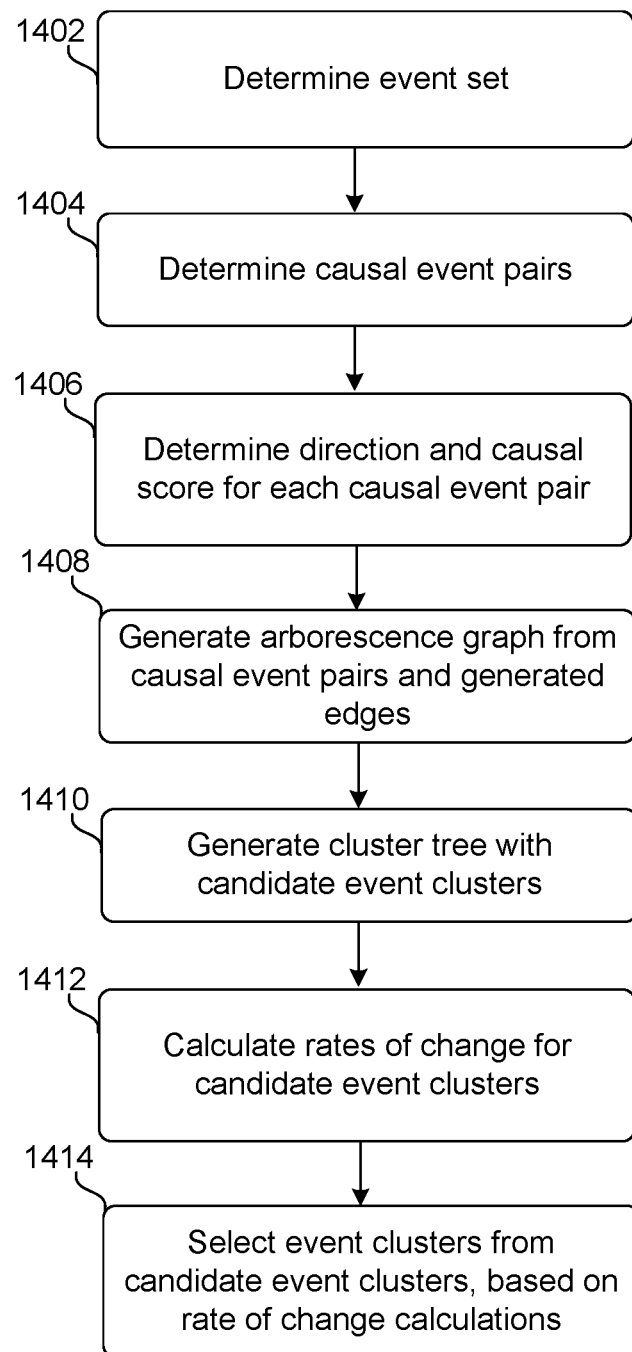
FIG. 14 is a flowchart illustrating more detailed example operations of the examples of FIGS. 1-13.

FIG. 14 is a flowchart illustrating more detailed example operations of the examples of FIGS. 1-13. In the example of FIG. 14, an event set is determined (1402). As described above, the event set may be static or dynamic, and may be determined based on, e.g., a relevant time window and/or identification of relevant systems or components.

Causal event pairs may be determined (1404). For example, pair-wise calculations of all possible event pairs within the event set may be determined. In other examples, a subsampling may be performed of events or event pairs.

In specific examples, described below with respect to FIGS. 15-21, the subsampling may be performed by constructing a multi-layer, small world network. As described below, the multi-layer, small world network may be constructed to eliminate or ignore some event connections, while identifying and retaining certain long-range connections between event pairs that are particularly useful and effective in constructing arborescence graphs and cluster trees, so that resulting event clusters are accurate and useful in identifying root cause events.

Once event pairs are determined, a direction and causal score may be determined for each event pair, to define causal event pairs (1406). As referenced above, and described in detail, below, a direction and causal score for each event pair may be determined as a probabilistic function defining a likelihood that one event of the pair caused the other event of the pair. The probabilistic function may be defined as a function of time, e.g., as a decaying function of time, and may rely on various types of available causal priors, including historical priors, real-time priors, topology graph priors, and/or knowledge graph priors.

An arborescence graph may be generated from the causal event pairs and generated edges (1408). For example, when the causal score (edge weight) is expressed as a topological distance, the arborescence graph may be generated as a minimum arborescence graph, also referred to as a minimum arborescence tree.

A cluster tree with candidate event clusters may then be generated (1410) from the minimum arborescence graph. As described above, a cluster tree refers to a modification of the minimum arborescence graph in which the causal event pairs of the minimum arborescence graph are grouped by common distances therebetween, and at least one candidate event cluster is defined at each common distance, subject to the constraints of the minimum arborescence graph. The candidate event clusters may then be displayed along a range of cluster distances, e.g., from least to greatest cluster distance, with each candidate event cluster occurring at a cluster level corresponding to an included cluster distance(s). The cluster tree may also be referred to as a directed cluster tree, as it maintains the directionality of the arborescence graph, or as a broken directed cluster tree because it is cut or broken at each candidate event cluster level.

A rate of change for candidate event clusters may be calculated (1412). For example, for a candidate event cluster, a comparison may be made between a parent distance between that candidate event cluster its parent candidate event cluster, as compared to the child distance between that candidate event cluster and the child candidate event cluster.

In this way, a rate of change may be calculated for each candidate event cluster, although some candidate event clusters may be omitted, e.g., if below a pre-determined threshold for number of events within the candidate event cluster. Then, relative rates of change may be compared between parent and child candidate event clusters, working from least to greatest distances along the distance range and keeping the more stable (lower rate of change) candidate event cluster(s).

Put another way, if the rate of change of a parent candidate event cluster is less than a rate of change of a sum of the rate(s) of change of its child candidate event clusters, the rate of change of the parent candidate event cluster may be retained. If a rate of change of a parent candidate event cluster is more than a rate of change of a sum of the rate(s) of change of its child candidate event clusters, the rate of change of the child candidate event clusters may be inherited, and propagation may proceed upwards until a root node is reached.

Using the above-described techniques, event clusters may be selected from candidate event clusters, based on the rate of change calculations just referenced (1414). Accordingly, causal event clusters may be obtained in a dynamic, automatic fashion, without requiring manual tuning. For example, as described above, rate of change scores may be calculated at each cluster level. Then, starting from a lowest cluster level, the described processes determine whether it is better to keep a child candidate event cluster or a parent candidate event cluster. If the parent candidate event cluster has a rate of change that is preferable to the sum of individual child candidate event clusters, as described above, the child(ren) candidate event cluster may be merged into the parent, and the process continues up to the root node. Otherwise, the child candidate event clusters are retained. Thus, even though a root candidate event cluster may have many underlying child candidate event clusters, the distance to the root node also tends to become high, so that it is not always the root node that has the least rate of change, as shown in the above examples.

FIG. 15 is a block diagram of a more detailed example implementation of a system for event pair determination using multi-layered small world graphs. In the example of FIG. 15, the event pair selector 138 is configured to receive an event set, such as the event set 137 of FIG. 1, and to output a multi-layered small world graph 1514, which may also be represented as a nearest neighbor graph 1516. As referenced above, and described in detail, below, the multi-layered small world graph 1514 effectively samples or extracts the causal event pairs of FIG. 4 and their connected edges which optimize subsequent operations of the situation identifier 128 of FIG. 1.

Moreover, the event pair selector 138 of FIG. 15 enables incremental additions of new events to the multi-layered small world graph 1514, as new events are received. In this way and using the optimization techniques for constructing the multi-layered small world graph 1514 in the first place, the multi-layered small world graph 1514 may be maintained over time as an optimized graph of causal event pairs needed to identify situations and root cause events of such situations.

As shown in FIG. 15, the multi-layered small world graph 1514 includes a plurality of layers 1518, 1520, and 1522. As described below, the multi-layered small world graph 1514 is merely a non-limiting example, and any suitable number of layers may be included.

A base or lowest layer 1518 may include all events of the event set 137 (except, in some implementations, any events filtered out as being unrelated or not useful, using a suitable filtering technique). In FIG. 15, the lowest layer 1518 is illustrated as including, for example, an event 1524 and an event 1526. The event 1526 is illustrated as being connected to the event 1526 by an edge 1536. More generally, the lowest layer 1518 includes a number of events 1524, 1526, 1530, 1534 and connecting edges 1536, 1537, etc., representing, as mentioned above, an entire desired plurality of events of an event set 137.

As described above with respect to FIG. 4, the various events of the event set being processed, as represented by the various events of the lowest layer 1518, could be processed as part of a complete pairwise comparison or computation. In other words, for example, it is possible to consider all possible pairs of the events of the lowest layer 1518 that would result in connected edges between all such pairs. As described in detail, herein, however, the techniques of FIG. 15 enable retention of only the sampled set of edges illustrated in the lowest layer 1518, along with longer-range connections of higher layers, as described below.

For example, the intervening layer 1520 includes a subset of the events of the lowest layer 1518, referred to herein as an intervening subset, with longer-range connections that effectively summarize or subsume selected combinations of connections and edges of the lowest layer 1518. For example, the intervening layer 1520 includes the events 1524, 1526, while also including an event 1530. In the lowest layer 1518, the event 1530 is connected to the event 1526 by an event 1534, including an edge 1536. In the intervening layer 1520, however, the event 1534 and edge 1536 are subsumed within a connection or edge 1532.

Similarly, the highest layer 1522 also includes the events 1524, 1526, illustrated as being connected by an edge 1528. As may be observed, the edge 1528 subsumes, e.g., the event 1530 and the edge 1532, and represents a longer-range connection between the events 1524, 1526 than is represented by the connections of the intervening layer 1520 and the lower layer 1518.

Thus, as explained in detail, below, the two events 1524, 1526 represent two events that are determined to be most likely to provide long-range causal connections among the various events of the event set being graphed. As such, the two events 1524, 1526 enable potential connection(s)

between otherwise disparate events and avoid or minimize a need to investigate or retain included shorter-range connections.

For example, the nearest neighbor graph 1516 provides an alternate form of the multi-layered small world graph 1514, in which inter-event paths may be visualized in a different manner. For example, the nearest neighbor graph 1516 illustrates that the path or connection 1532 exists between the event 1530 and the event 1526, without having to traverse the event 1534 (and included connection 1536).

Similarly, the nearest neighbor graph 1516 illustrates a path from the event 1534 to the event 1524 that includes the event 1534, the edge 1536, the event 1526, the edge 1528, and the event 1524. As may be observed from both the multi-layered small world graph 1514 and the nearest neighbor graph 1516, such a path is considerably more direct between the events 1534, 1524 than an alternate path(s) that could be constructed that includes a larger number of included, short-range edges.

In more detail, the event pair selector 138 of FIG. 15 includes a layer generator 1502 that is configured to select and generate a number of layers to be included in the multi-layer small world graph 1514. That is, in the simplified example of FIG. 15, the multi-layer small world graph 1514 includes the three layers 1518, 1520, 1522, but in other implementations the multi-layer small world graph 1514 may include four or more layers, e.g., may have two or more intervening layers represented in FIG. 15 by the single intervening layer 1520.

The layer generator 1502 may determine a number of layers to be used based in part on a number of connections allowed per event. For example, FIG. 4 illustrates that for an event set of 21 events, each event may theoretically be connected to 20 other events, with a mix of long distance and short distance connections. In FIG. 15, however, a maximum number of per-event connections may be established, such as a maximum of only two or three connections per event. Using techniques described below, the event pair selector 138 of FIG. 15 may continually update the connections that are included to ensure that the included connections are the strongest, nearest, or otherwise most useful connections available for each event.

Once a number of layers is established, events of an event set may be assigned to the multi-layer small world graph 1514. For example, a layer selector 1504 may be configured to receive an event to be assigned, and to select one or more of the layers 1518, 1520, 1522 to receive the event.

When an event is assigned to a particular layer, then, as noted above, that event will automatically be assigned to every layer beneath the assigned layer and will also be associated with a nearest neighbor in every layer above the assigned layer. For example, if the event 1530 is received and assigned to the intervening layer 1520, then the event 1530 will be added to the lowest layer 1518, as well, and will also be associated with either the event 1524 or the event 1526 in the highest layer 1522.

For example, a nearest event selector 1506 may be configured to select, for an assigned event at an assigned layer, a nearest event in each higher layer that is above the assigned layer. For the example of the event 1530, the nearest event selector 1506 may determine that the event 1530 is nearer to the event 1526 in the highest layer 1522.

A proximate event searcher 1508 may be configured to connect the assigned event to at least one other event within its assigned layer(s). Continuing the example of the event 1530, which is added to both the intervening layer 1520 and to the lowest layer 1518, the proximate event searcher 1508 may determine, for example, that the event 1530 should be connected to the event 1526 in the intervening layer 1520 by the edge 1532, and to the event 1534 by the edge 1537 in the lowest layer 1518.

In another example, if the event 1534 is assigned to the lowest layer 1518, then the event 1534 will not be added to either the intervening layer 1520 or the highest layer 1522 by the layer selector 1504. The nearest event selector 1506, working in an upwards direction within the multi-layer small world graph 1514, will establish a nearest event to the event 1534 within the intervening layer 1520, and within the highest layer 1522. The proximate event searcher 1508 will determine which of the events in the lowest layer 1518 (e.g., the events 1530 or 1526) the event 1534 should be connected to.

In another example, when the event 1526 is added to the highest layer 1522 by the layer selector 1504, then the event 1526 is also automatically added to both of the intervening layer 1520 and the lowest layer 1518. The nearest event selector 1506 is not needed, because the event 1526 is in the highest layer 1522, and so there are no higher layers to search. The proximate event searcher 1508 may search within each of the layers 1518, 1520, 1522 to which the event 1526 is added, to determine connections for the event 1526 at each layer (e.g., the edge 1528 in the highest layer 1522, the edge 1532 in the intervening layer 1520, and the edge 1536 in the lowest layer 1518).

An edge filter 1510 may be configured to prune or filter edges that are weaker (farther) than any newly added edges. That is, as mentioned above, every event has a maximum number of allowed edges. Thus, for example, as the new event and associated edge(s) are added, it may occur that the new event has a stronger, nearer connection to an existing event than any existing edge of the existing event. In such cases, the weakest edge of the existing event may be removed by the edge filter 1510.

An edge selector 1512 may be configured to make final edge selections to optimize for subsequent operations of the arborescence graph generator 142 of FIG. 1. For example, the edge selector 1512 may operate in a top-down fashion with respect to the multi-layer small world graph 1514, by selectively retaining edges of the highest layer 1522 and the intervening layer 1520, as compared to similar or redundant edges of the lowest layer 1518.

For example, events at relatively higher layers may be considered to represent connective or hub events that are more likely to be useful in identifying IT situations and associated root causes within the IT landscape 103 of FIG. 1. For example, with respect to FIG. 1, the edge 1528 might be understood to represent a causal connection between an event at the component 106 and an event at the component 110, even though the components 106, 110 are in different systems, which might be widely separated in a topological and/or geographical distance(s). Consequently, such events may be more likely to contribute to a global view of the IT landscape 103, as compared, for example, to a pair of events occurring together at the component 106.

Moreover, with respect to the arborescence graph generator 142, as referenced above, it may occur that an arborescence graph may have two or more instances of potential minimum arborescence graphs that are mathematically equivalent to one another. For example, a given event may have multiple incoming causal relationships from other event(s) that are of equal strength, and that both provide an equivalent minimization.

For example, in a general minimization problem, a first event may be connected to a second event with a causal score of 0.8, while the first event may also be connected to the second event via a third event and two intervening edges, each having a causal score of 0.4. The first and second events are thus connected by mathematically equivalent levels of causality, and either path could be taken to obtain a minimum arborescence graph. In the context of FIG. 15, however, the more direct and longer-range connection of the first option is preferable to, and may be selected by, the edge selector 1512 over, the more segmented connection(s) of the second option.

Thus, the edge selector 1512 may be configured to determine if mathematically equivalent connections exist between pairs of events. If so, the edge selector 1512 may be further configured to preferentially select the connection (edge) that is longer-range and more direct.

The edge selector 1512 may then provide the resulting graphs 1514 and 1516 to the arborescence graph generator 142. In this way, the arborescence graph generator 142 may be enabled to generate a highly optimized minimum arborescence graph that results in a highly optimized cluster tree and which yields accurate and meaningful event clusters (IT situations).

The techniques of FIG. 15 thus provide optimized subsampling techniques to simplify the quadratic-time complexity problem of FIG. 4 into a logarithmic-time complexity problem. Moreover, as the subsampling techniques are based on, and reflect underlying IT landscape characteristics (e.g., topology), the subsampling techniques provide a regularizer function which avoids overfitting of the graphs 1514, 1516.

For example, the event pair selector 138 of FIG. 15 effectively streamlines the use of the graphs 1514, 1516 by avoiding a surplus of either weak, long-range connections or strong, short-range connections. Instead, as described, the graphs 1514, 1516 retain an optimum balance of long-range connections that (despite having relatively more distance between events) identify useful relationships and paths through the graphs 1514, 1516, and which subsume short-range connections that are at best redundant to the subsuming, longer-range connections.

Figure 16:
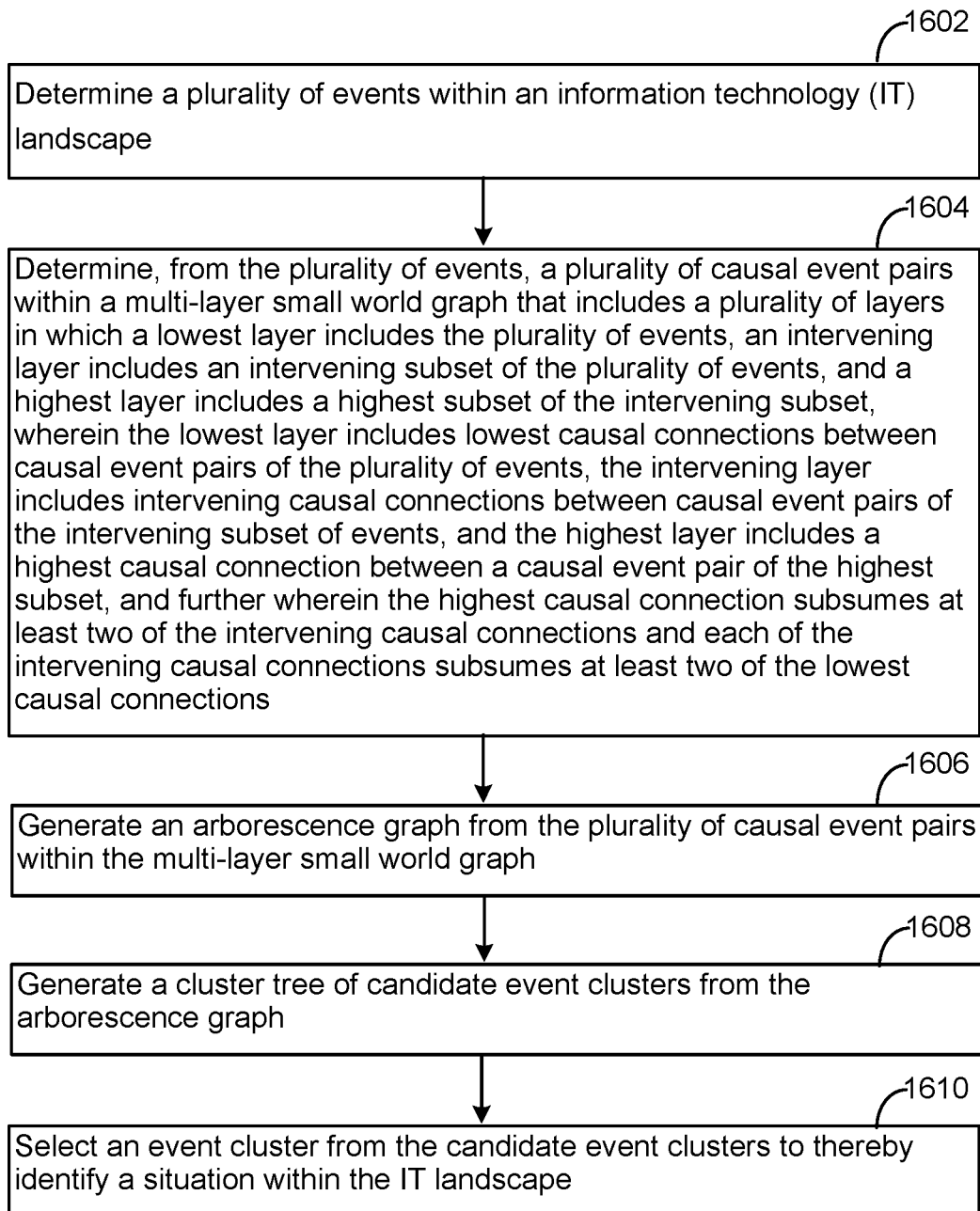
FIG. 16 is a flowchart illustrating example operations of the system of FIG. 16.

FIG. 16 is a flowchart illustrating example operations of the system of FIG. 15. In the example of FIG. 16, operations 1602-1610 are illustrated as separate, sequential operations. In various implementations, the operations 1602-1610 may include sub-operations, may be performed in a different order, may include alternative or additional operations, or may omit one or more operations. Further, in all such implementations, included operations may be performed in an iterative, looped, nested, or branched fashion.

In FIG. 16, a plurality of events within an information technology (IT) landscape may be determined (1602). For example, the event handler 136 of FIG. 1 may be configured to determine the event set 137, using the event collector 120 or the events repository 122. As described, the event set 137 may be a static set of events or may be a dynamically changing set of events.

From the plurality of events, a plurality of causal event pairs may be determined within a multi-layer small world graph (1604). As described with respect to FIG. 15, the multi-layer small world graph 1514 may be generated by the event pair selector 138 of FIG. 15 and may include a plurality of layers 1518, 1520, 1522 in which a lowest layer 1518 includes the plurality of events, an intervening layer 1522 includes an intervening subset of the plurality of events, and a highest layer 1522 includes a highest subset of the intervening subset. Further, the lowest layer 1518 includes lowest causal connections between causal event pairs of the plurality of events, the intervening layer 1520 includes intervening causal connections between causal event pairs of the intervening subset of events, and the highest layer 1522 includes a highest causal connection between a causal event pair of the highest subset.

As also illustrated and described, the highest causal connection subsumes at least two of the intervening causal connections and each of the intervening causal connections subsumes at least two of the lowest causal connections. For example, in FIG. 15, the highest causal connection 1528 subsumes at least the connections 1531, 1532 of the intervening layer 1520, and the connection 1532 subsumes at least the connections (edges) 1536, 1537 of the lowest layer 1518.

Figure 21:
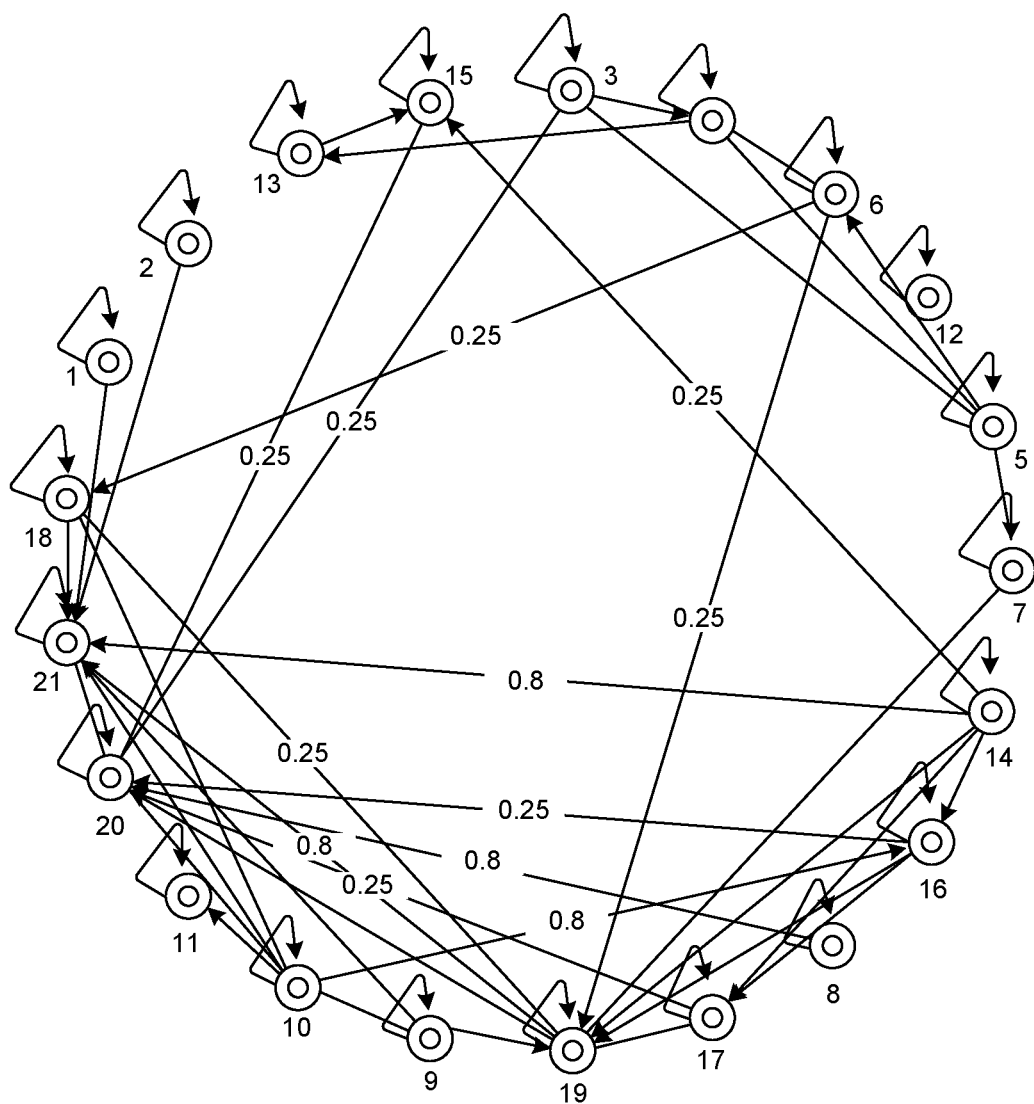
FIG. 21 illustrates an example of a small world graph calculated for the event set of FIG. 3.

An arborescence graph may be generated from the plurality of causal event pairs within the multi-layer small world graph (1606). For example, the arborescence graph generator 142 may generate the minimum arborescence graph 500 of FIG. 5. For example, as described below, FIG. 21 illustrates an example of the multi-layer small world network 1514 of FIG. 15, generated using the event set 300 of FIG. 3. Then, the minimum arborescence graph of FIG. 5 may be generated using the multi-layer small world graph of FIG. 21.

A cluster tree of candidate event clusters may be generated from the arborescence graph (1608). For example, the cluster tree generator 144 of FIG. 1 may generate the cluster tree 600 of FIG. 6. Any of the various techniques and features of the cluster tree generator 144 described above, or other suitable techniques, may be used to generate the cluster tree 600 of FIG. 6.

An event cluster may be selected from the candidate event clusters to thereby identify a situation within the IT landscape (1610). For example, the cluster selector 146 may select one or more event clusters, such as the event clusters of FIGS. 9, 12, and 13, representing corresponding IT situations. In example implementations, the cluster selector 146 may use the techniques described above, by determining a rate of change of each candidate event cluster and comparing the rates of change of parent/child candidate event clusters to determine relatively more stable event clusters. In other implementations, other clustering techniques may be used, including tuning of cluster parameters useful in selecting event clusters.

Thus, in example implementations, the techniques of FIGS. 15 and 16 may be used as an optimization of the techniques of FIGS. 1-14. In other implementations, the techniques of FIGS. 15 and 16 may be used in other approaches to event clustering.

Figure 17:
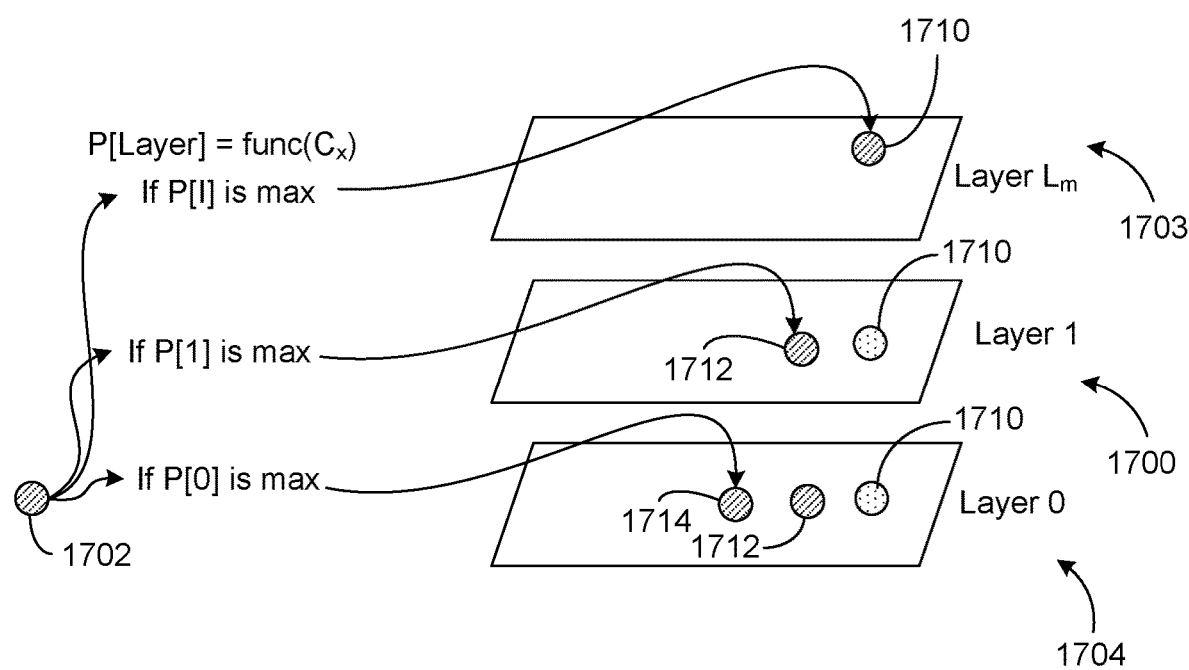
FIG. 17 is a first example operation for layer generation and event addition using the system of FIGS. 1-15.

FIG. 17 is a first example operation for layer generation and event addition using the system of FIGS. 1-15. In the example of FIG. 17, the layer generator 1502 may generate three layers 1704, 1700, 1703. As referenced above with respect to FIG. 15 and described in more detail, below, with respect to FIG. 20, the layer generator 1502 may determine the number of layers (e.g., 3 in FIG. 17) based on a maximum number $C_x$ of causal connections allowed for each event. In FIG. 17, the highest illustrated layer 1703 is illustrated as layer $L_m$, so that the number $L_m$ is understood to be a function of $C_x$.

When a new event 1702 is received, the new event 1702 may be assigned to one of the layers 1704, 1700, 1703 by the layer selector 1504 of FIG. 15, using an exponentially decaying probability (EDP) function, which may be written as P[layer]. Different versions of the EDP function P[layer] may be used. In an example implementation, the EDP function may be implemented as [int(−log 2(random( ))*L)], where L is the layer number. Thus, using the preceding or any suitable EDP function, a probability of an event being in a highest layer will be exponentially lower than a probability of the event being in the lower level. For example, in the preceding function a probability of an event being in layer L=8 would be 0.001, while the probability of an event being in layer L=0 would be 1.

In general, the EDP function P[layer] represents a probability of adding the event 1702 to one or more of the layers 1704, 1700, 1703, with a probability that decreases for higher layers, as compared to lower layers. That is, P[layer] ensures that the new event 1702 is most likely to be assigned to the lowest layer 1704, less likely to be assigned to the intervening layer 1700, and least likely to be assigned to the highest layer 1703. In some implementations, P[layer] may be implemented using a standard uniform distribution unif (0,1), with a probability of being added to a subsequent layer that is half of a probability of being added to a current layer. That is, the probability of being added to the intervening layer 1700 is half that of being added to the lowest layer 1704, and the probability of being added to the highest layer 1703 is half that of being added to the intervening layer 1700. In other implementations, P[layer] may be implemented so as to take into account various characteristics, e.g., of the new event 1702, or of the IT landscape 103.

In accordance with the above, in a first scenario, the new event 1702 may be added to the highest layer 1703 when designated by P[highest layer] as having a maximum value, which is illustrated as event 1710 to illustrate this example scenario. As shown, when the event 1710 is added to the highest layer 1703, it is also added to the intervening layer 1700, and to the lowest layer 1704.

In a second scenario, the new event 1702 may be added to the intervening layer 1700, which is illustrated as event 1712 to illustrate this example scenario. As shown, when the event 1712 is added to the intervening layer 1700, it is also added to the lowest layer 1704.

In a final example scenario, the new event 1702 is added just to the lowest layer 1704. This scenario is illustrated as event 1714 in FIG. 17.

Figure 18:
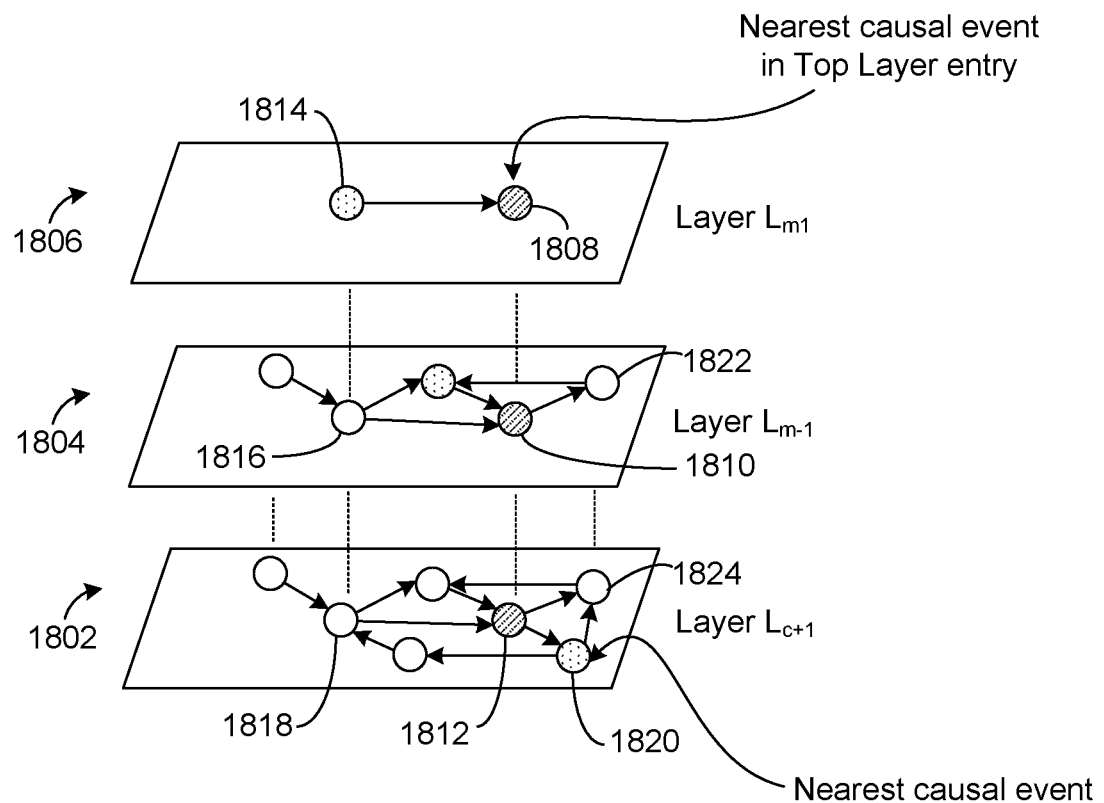
FIG. 18 is a second example operation for layer generation using the system of FIGS. 1-15.

In FIG. 18, a more detailed example of the process of FIG. 17 is illustrated. FIG. 18 illustrates a lowest layer 1802 ($L_{C+1}$), an intervening layer 1804 ($L_{m-1}$), and a highest layer 1806 ($L_{m1}$). An event 1808 has been added to the highest layer 1806, so that corresponding events, labelled as event 1810 and event 1812 for purposes of differentiation, have also been added. Similarly, a node 1814 has been added to the highest layer 1806, so that corresponding events, labelled as event 1816 and event 1818 for purposes of differentiation, have also been added to the middle layer and lowest layer, respectively.

When a new event is added to a layer, such as an event 1820 added to the lowest layer 1802, then a nearest hub event (an event in the highest layer 1806 with long-range connectivity) to the new event may be determined at each layer above the layer at which the new event was added (e.g., using the nearest event selector 1506 of FIG. 15). That is, the new event 1820 may be determined to be closer to the hub event 1808, by tracing its proximity using the same events 1812, 1810 in the intervening layers 1802, 1804, respectively.

Similarly, when a new event 1822 is added to the intervening layer 1804, the new event 1822 may be related to the hub event 1808, 1810. The new event 1822 is also added to any lower layers, which includes only the lowest layer 1802 in FIG. 18, so that the new event 1822 is illustrated as being added to the lowest layer 1802 as event 1824 for purposes of differentiation.

As the event 1820 exists at the lowest layer 1802 but not in the intervening layer 1804, a search may be made, e.g., by the proximate event searcher 1508 of FIG. 15, to determine nearest causal event(s), to which the new event should be connected. For example, in FIG. 18, the previously added event 1820 may represent a nearest causal event(s), to which the added event 1824 should be connected.

For example, to identify the approximate $M_x$ nearest neighbors in a given layer $L_c$, an active list W of $M_x$ nearest-discovered events may be maintained during the search. The list may then be revised at each step by estimating the neighborhood of the nearest formerly non-estimated event in the list, until the neighborhood of every event from the list is evaluated.

As described herein, a maximum number of connections $C_x$ may be set for each event. Therefore, as new events are added, it is possible that connecting the new event may add a candidate connection to an existing set of connections, and the edge filter 1510 of FIG. 15 may be configured to remove one or more edges, e.g., having a lowest causal score(s) of the candidate edges.

Figure 19:
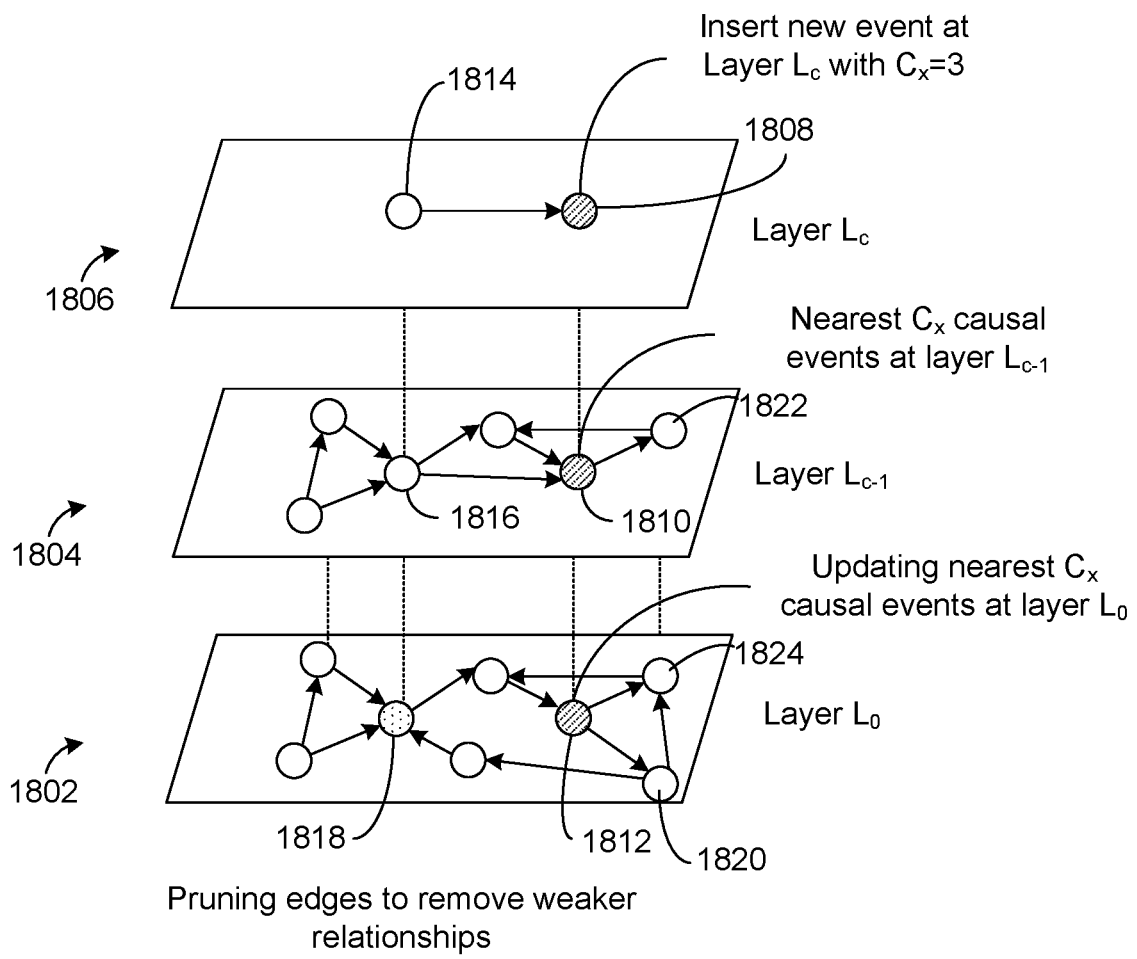
FIG. 19 is a third example operation for layer generation using the system of FIGS. 1-15.

For example, in FIG. 19, if $C_x$=3 and the event 1808 represents a new layer added at the highest layer 1806, so that the highest layer 1806 is the layer $L_C$ at which an event is added in the example, then the intervening layer 1804 may be identified as layer $L_{C-1}$, and the lowest layer 1802 may be identified at the layer $L_0$.

When the event 1808 is added, the corresponding event 1810 is added at the layer 1804, so that nearest $C_x$ causal event(s) are identified and connected with candidate causal connections. Similarly, corresponding event 1812 is added at the layer 1802, so that nearest $C_x$ causal event(s) are identified and connected with candidate causal connections.

However, in the layer 1802, the event 1812 has three connections (edges), which is the maximum $C_x$ allowed. Consequently, as may be observed in FIG. 19, no edge exists between the node 1818 and the node 1812, because the edge filter 1510 may have determined that the previously existing connection between the nodes 1818, 1812 had a lower causal score than the three remaining connections of the node 1812 that are illustrated as being retained in FIG. 19.

Figure 20:
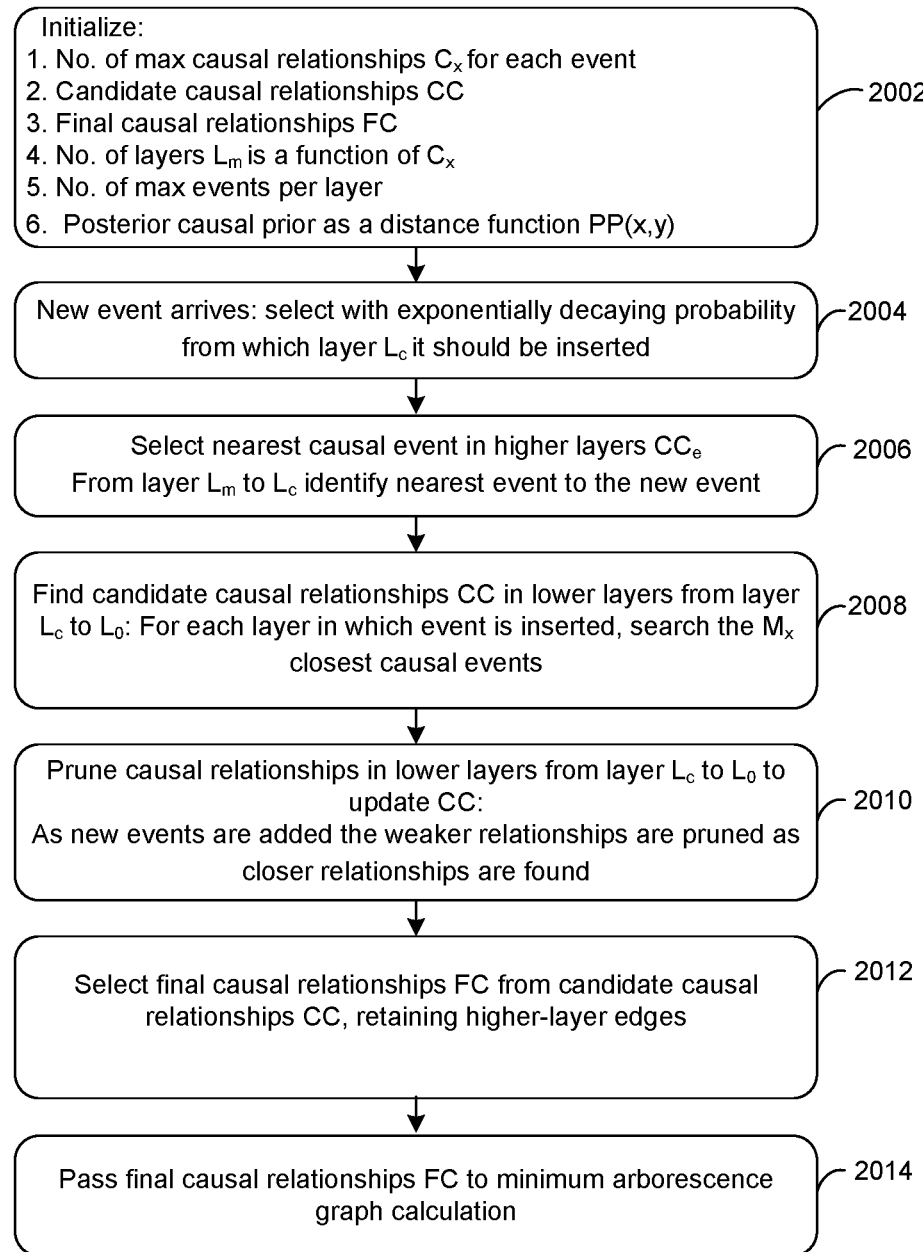
FIG. 20 is a flowchart illustrating more detailed example operations of the system of FIG. 15, and of the flowchart of FIG. 16.

FIG. 20 is a flowchart illustrating more detailed example operations of the system of FIG. 15, and of the flowchart of FIG. 16. During initialization (2002), a number of relevant parameters and processes may be defined and/or set.

For example, a maximum number of causal relationships (connections, edges) $C_x$ may be set. Candidate causal relationships CC and final causal relationships FC may be defined. A number of layers $L_m$ may be defined as a function of $C_x$.

A maximum number of events per layer may be defined, which, as may be appreciated from the above descriptions of FIGS. 15-19, may be different for each layer, but may generally decrease in a direction of higher layers. In particular, a highest layer, which includes long-range or hub events, may be set to have a smallest maximum number of events.

A posterior causal prior may be defined as a distance function PP(x,y). For example, in PP(x,y), x,y may represent any two events and the causal prior function PP may represent any desired combination of knowledge graph priors, temporal priors, or feedback priors.

When a new event arrives, the above-referenced type of EDP function may be used to determine at which layer $L_c$ the new event should be added (2004). If the new event causes the layer $L_c$ to exceed its maximum number of events, then another event from the layer $L_c$ may be removed.

When the new event is added to any layer other than the highest layer $L_m$, then a nearest causal event within layers $L_c$ to $L_m$ may be selected (2006). In this way, the new event is identified with respect to a hub event in the highest layer $L_m$.

Then, candidate causal relationships CC in lower layers, from $L_c$ to $L_0$, may be determined by searching a number $M_x$ of closest causal events (2008). These candidate causal relationships may be pruned by removing farther/weaker relationships as closer/stronger relationships are found (2010), so that $C_x$ is maintained for each event.

Final causal relationships FC may be selected from the candidate causal relationships CC, by selecting longer-range, higher-layer edges over any redundant, subsumed shorter-range, lower-layer edges (2012). Then, the final causal relationships FC may be forwarded for use in determining a minimum arborescence graph calculation (2014).

In other words, for example, when selecting the final candidate relationships, retaining information at higher layers may be understood to avoid over-reliance on formation of local event graphs. The above-described techniques incrementally converge towards inclusion of the most important (most causal) events, or best hub events, so that an entire impact event graph is obtained.

Similarly, by prioritizing relationships in the top or highest layers as compared to relationships in lower layers for the same causal strength, calculations of minimum arborescence graphs may be optimized. As referenced above, minimum arborescence graphs may have multiple causal relationships of equal strength to an individual node. By preferring relationships in top layers over those in lower layers, an automated optimization is provided that results in the retention of an optimized version of an impact event graph.

FIG. 21 illustrates an example of a small world graph calculated for the event set of FIG. 3, using the techniques of FIGS. 15-20. In other words, FIG. 21 provides an alternate graph of causal event pairs that may be used in place of the graph of FIG. 4, when computing a remainder of the techniques described with respect to FIGS. 5-14.

More specifically, as may be understood from the discussion of FIGS. 15-20, FIG. 21 represents an example of the nearest neighbor graph 1516 of FIG. 15, which is an alternate representation of the multi-layer small world graph 1514 of FIG. 15. As described in more detail, below, the nearest neighbor graph of FIG. 21 may be computed as a Delaunay graph. By employing multi-layered small world graphs, it is possible to transform the dense graph of FIG. 4 into a Delaunay graph that retains long-range links along with short-range links. Multi-layer small world networks enable sufficiently descriptive abstractions while also enabling exploration of relations on extremely large graphs.

As also described above, the multi-layer small world graphs described herein include layers formed to capture the graph such that the graph maintains coarse to finer links between events. The probability that an event will be inserted into a particular layer may be regularized by an exponential decaying distribution, such as the EDP referenced above.

In the multi-layer small world graphs constructed using the described techniques, higher layers capture and preserve long-range connections, while the lower layers identify closer, clustered information. The long-range links capture relationships between distant neighbors, whereas the short-range links refer to closer neighbors. For example, if two applications are related by an infrastructural node, the events related to the individual applications may be identified as short-range links in lower layers, whereas the high-level relationship between the two applications and infra-node relationship is preserved at the higher layers.

Such layering acts as a regularizer by sub sampling the relationships between events and enables identification of relationships of huge complex clusters while preserving their long-range relationships using the Delaunay graph construct. Since the entire directed graph is subsampled, this acts as a regularizer by voiding overfitting.

When a new event is introduced into a layer, a neighborhood list of a constant number of events may be maintained, and thereby results in evictions, of lower strength, farther distance event pairs. Also, when a new event is added, the minimum arborescence graph may be updated in an incremental fashion in real-time, as well.

Described pruning techniques enhance the diversity of the surrounding events, e.g., to avoid grouping closer nodes in top layers. Otherwise, if all events are too close together, then it becomes unnecessary to visit all those nodes (since all of them may share approximately the same amount of guiding information).

A Delaunay graph is a graph that attempts to guarantee that the neighbors of each node are the nearest neighbors. In the simplest case, for example, a Delaunay graph may be visualized using Voronoi diagrams. For example, let P be a set of points in a plane. A triangulation of P is a subdivision of the plane by edges between vertices in P, such that no edge connecting two vertices in P can be added without destroying planarity. A Delaunay triangulation is a triangulation D(P) such that no point in P is inside the circumference of any triangle in D(P). Thus, a graph is a Delaunay graph if it is the Delaunay triangulation of some set of points in the plane.

As also described, the multi-layer small world graphs optimize subsequent arborescence graphs, which may then be used to identify distances at which the differential clustering algorithm can identify a necessary graph cut and identify a rate of change for the graph separation.

Conventionally, sustaining the stability and reliability of large-scale networks has been a fundamental requirement in the network management area. However, it is challenging to do in a practical network due to the dynamic, ever-growing and distributed nature of large-scale networks. Effective management of these networks requires a proactive approach instead of a reactive approach to event management. Hence, predicting events on managed networking and infrastructure systems is desirable for the high availability of those systems considering it prevents unexpected system downtime and assures service reliability to users. Conventional predictive models observe these as a sequence prediction of a stream of events. As a result, existing systems are unable to capture the topological context, the spatiotemporal context, and the changes that result in poor resilience to ever-changing systems. Also, conventional predictive models are unable to predict the causal relations of the predicted events, which results in poor explanations for why events occurred and a lack of action to prevent catastrophic events.

Referring back to FIG. 1, the prediction manager 132 may be configured to utilize captured situation information, root cause information, and resolution information of multiple situations that occur over time, to thereby predict similar situations prior to such predicted situation actually occurring. For example, machine learning algorithms may be trained using data related to actual situations, root causes, and remediations or resolutions so that the trained algorithms may then predict similar situations in the future.

More specifically, the prediction manager 132 is configured to predict events in the IT landscape 103 of FIG. 1 that capture the causal relationships of the predicted events and that also account for topological and spatiotemporal context and changes. The prediction manager 132 predicts potential failures by learning both from historical event graphs along with topological and spatiotemporal changes and also predicts how the events are causally related and what components, situations, and type of problems it might affect in the context of the topology.

The prediction manager 132 is configured to predict future events along with the causal relationships, including adapting to changing topological and spatiotemporal changes. Given a set of training data of event graphs and/or situations, such as those identified by the situation identifier 128 created from clustering of events, such as those generated by the cluster tree generator 144, a model implemented by the prediction manager 132 learns which changes in the event graph states, relationships, and topological relationships correspond to the presence of an event along with its relationship to other events as an edge. Accordingly, given a test data or an evolving event graph and/or situation (e.g., events for which it is not known which event happens next), the model is able to predict an event in a future timestep and its causal relationship with other events even in a previously unseen or in a different environment.

Figure 22:
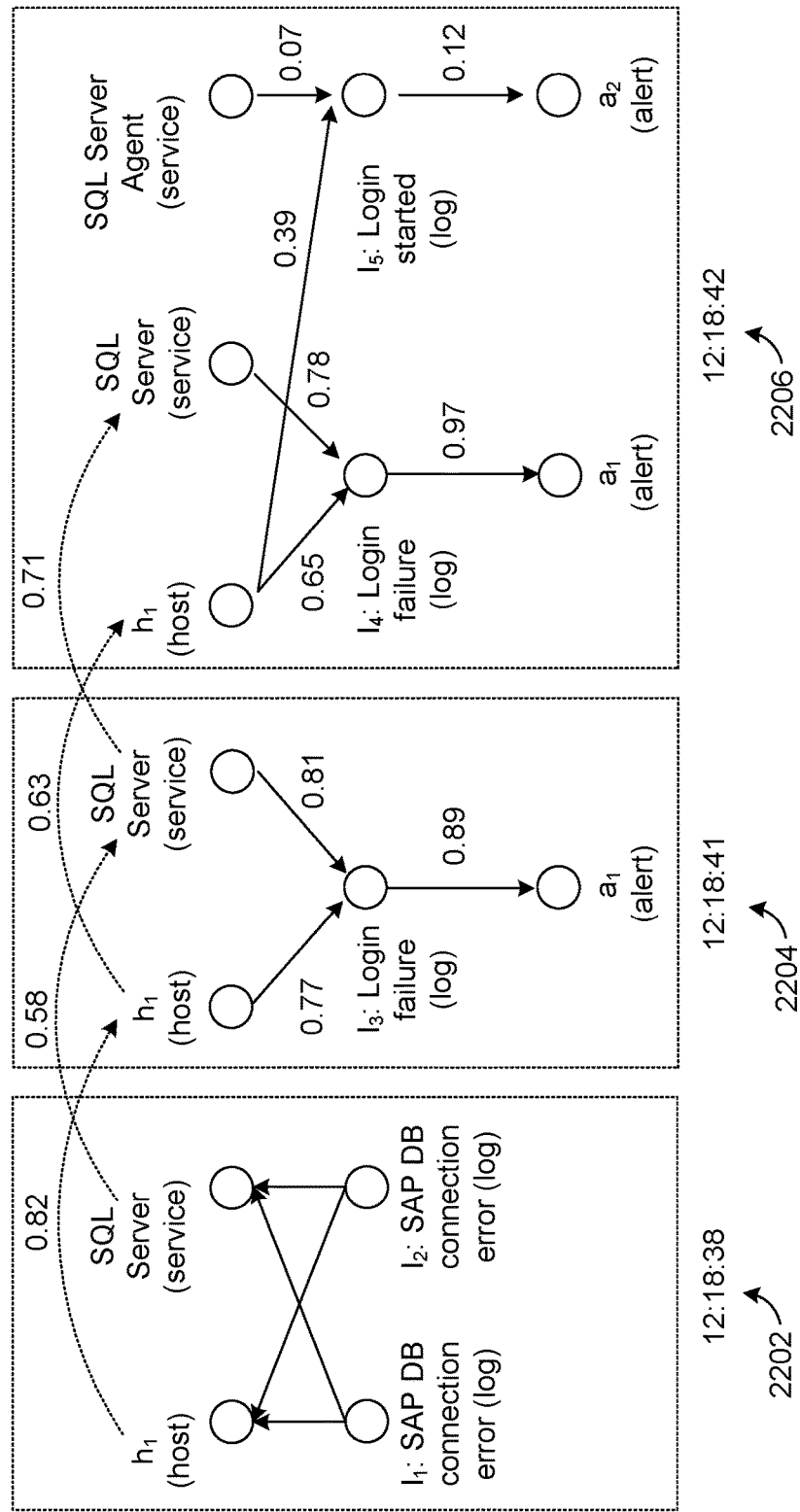
FIG. 22 illustrates an example situation.

FIG. 22 illustrates an example situation 2200. The situation 2200 starts at time 12:18:38 (2202) from the host (hi), and the SQL Server (service) is impacted as noted by the log entries, $l_1$ and $l_2$, each indicating an SAP database connection error log. At time 12:18:41 (2204), a login alert, $a_1$, may be received as noted by the log entry, $l_3$, which notes a login failure. At time 12:18:42 (2206), another alert, $a_2$, may occur on a different service, SQL Server Agent.

Figure 23:
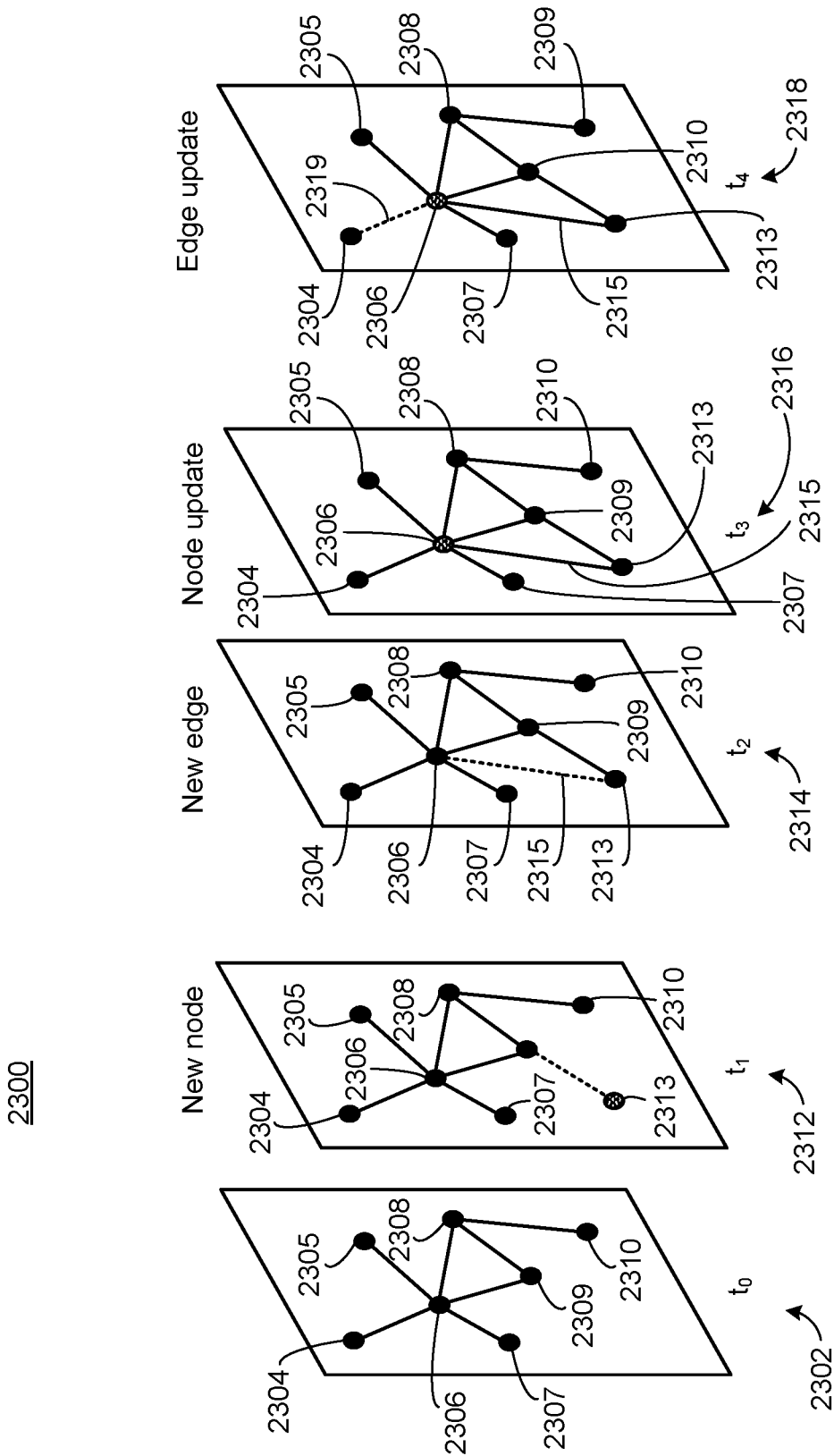
FIG. 23 illustrates an example event graph of the example situation of FIG. 22.

FIG. 23 illustrates an example event graph 2300 that is generated from a situation, such as the example situation 2200 of FIG. 22. The event graph 2300 may be represented as an ordered list or asynchronous stream of timed events. That is, the event graph 2300 may be represented as a time series of graphs. The event graph 2300 is an example of and may be referred to as a spatiotemporal graph.

The event graph 2300 may be generated using the techniques and components described above. In the event graph 2300 at time to (2302), node 2304 may represent the root cause and nodes 2305, 2306, 2307, 2308, 2309, and 2310 may represent computing devices. At time $t_1$ (2312), a new node 2313 may represent another service that is being impacted. At time $t_2$ (2314), a new edge 2315 may be added to the event graph 2300 when the techniques described previously determine that node 2306 is causally related to node 2313. At time $t_3$ (2316), node 2306 is marked as being causally related to node 2313. At time $t_4$ (2318), edge 2319 is updated to reflect a causal relationship tracing back to node 2304 as a root cause for the node 2313. The event graph 2300 provides data that graphically illustrates an understanding of how different situations and events are causally related to each other. The event graph 2300 represents a spatiotemporal graph that provides a spatiotemporal context for a situation as it changes (or propagates) over time intervals.

The prediction manager 132 may use event graphs, such as the event graph 2300, to train a model, using machine learning or equivalent technologies, that can then be used to predict the impact of events as a situation occurs and/or the situation continues to progress. Accordingly, referring back to the situation 2200, the prediction manager 132 would in a future situation similar to or exactly like the situation 2200 be able to predict the events that will occur at time 12:18:42 (2206) before it occurs. That is, the prediction manager 132 will use the trained model to predict that events that will occur at time 12:18:42 (2206) when the first event starts to occur or occurs at time 12:18:38 (2202). In this manner, the IT system may be programmed to take action to prevent and/or mitigate the effect of the events at time 12:18:42 (2206) before it occurs using, for example, the remediation generator 134, as discussed below in more detail. The prediction manager 132 may predict potential failures by learning from both the historical event graphs and topological and spatiotemporal changes. The prediction manager 132 may predict how the events are causally related and what components and type of problem might be affected in the context of the topological relationships.

Figure 24:
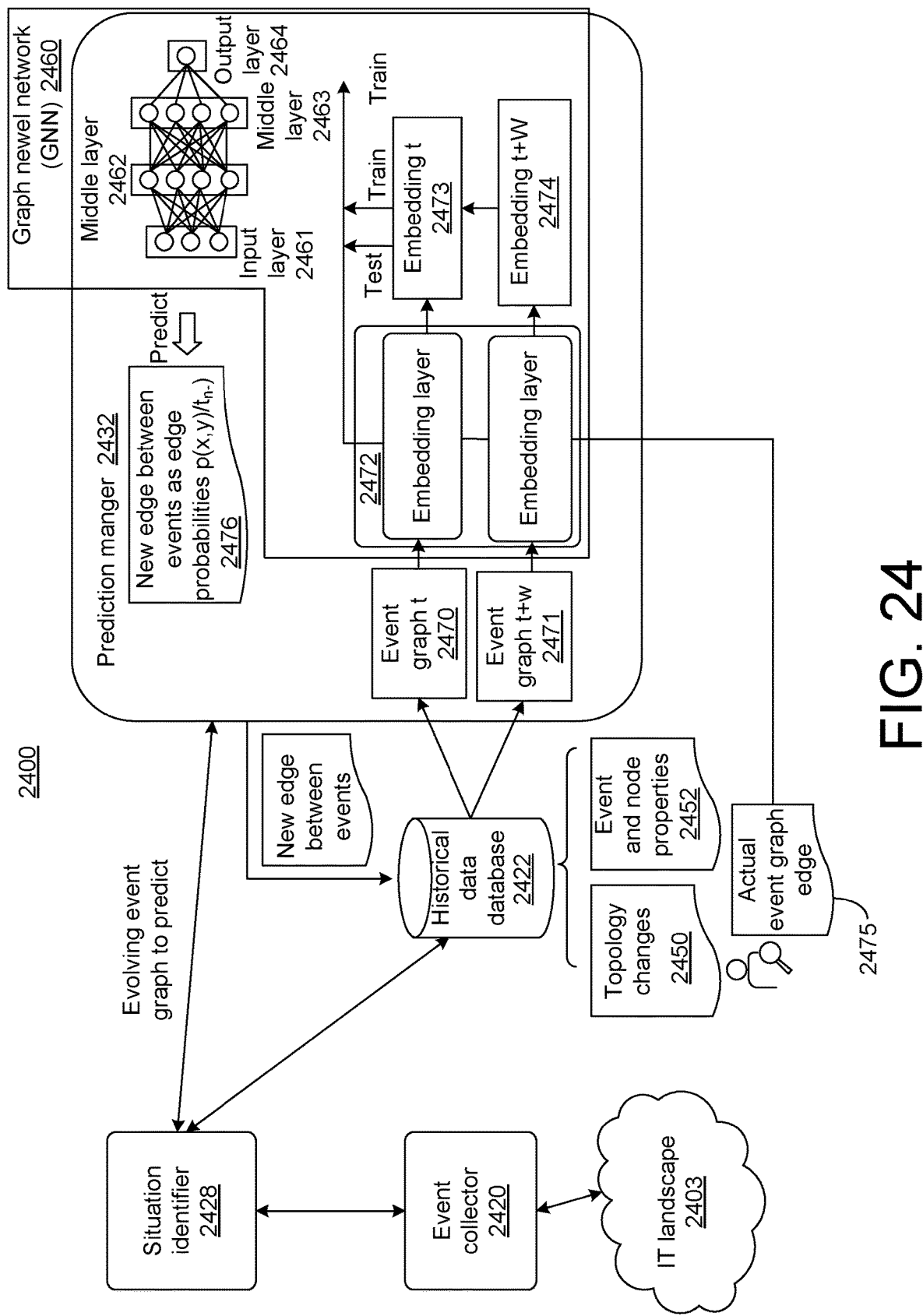
FIG. 24 is a block diagram of a system for predicting causal events.

FIG. 24 is a block diagram of a system 2400 for predicting causal events. The system 2400 may include one or more components from FIG. 1. The system 2400 may include an IT landscape 2403, and event collector 2420, a situation identifier 2428, a historical data database 2422, and a prediction manager 2432. The predication manager 2432 includes a graph neural network (GNN) 2460, which also may be referred to as a multi-layer perceptron.

For brevity, some of the components are mentioned here, but detailed descriptions of the components may be referenced above with respect to FIG. 1. For example, the IT landscape 2403 may include the same components, features, and functionality as the IT landscape 103 of FIG. 1, as described above. For example, the event collector 2420 may include the same components, features, and functionality as the event collector 120 of FIG. 1, as described above. The situation identifier 2428 may include the same components, features, and functionality as the situation identifier 128 of FIG. 1, as described above. The prediction manager 2432 may include the same components, features, and functionality as the prediction manager 132 of FIG. 1, as described above and as described in further detail below.

The data generated by the situation identifier 2428, including event graphs such as the event graph 2300 of FIG. 23, may be stored in historical data database 2422 for use by the prediction manager 2432. Other data generated by the situation identifier 2428, including directed event clusters as discussed above, may be stored in the historical data database 2422. The historical data database 2422 also maintains a history of topology changes 2450 to the IT landscape 2403, including additions, deletions, and/or any changes to the IT landscape 2403. An event node in an event graph may include topology associated with the event node. The topology associated with the event node and any changes to the topology are stored in the historical data database 2422.

Further, in FIG. 24, the historical data database 2422 also maintains historical records relating to event and node properties 2452. In this manner, the data stored in the historical data database 2422, including the data generated by the situation identifier 2428, the topology changes 2450, and the event and node properties 2452, may be used to train the graph newel network (GNN) 2460, which is also referred to as a model, generated by the prediction manager 2432.

Additionally, the data generated by the situation identifier 2428 is input directly to the prediction manager 2432 for real-time prediction of future events using the trained GNN 2460 generated by the prediction manager 2432.

As alluded to above, the prediction manager 2432 may operate in two phases: a train phase and a test phase. In the train phase, the prediction manager 2432 uses the historical data stored in the historical data database 2422 to train the GNN 2460 to make predictions based on a detected situation taking into account topology changes and spatiotemporal changes. The train phase may be performed continuously and in a self-supervised manner. That is, at each timestep, the GNN 2460 processes the event graph in chronological order and predicts a next failure based on previous failures. In this manner, the data used to train the GNN 2460 does not need to be labeled. The data from the historical data database 2422 includes the information needed to train the GNN 2460 in the self-supervised manner. Human or user intervention is not needed to tag or label the data in order to train the GNN 2460.

In the test phase, the prediction manager 2432 uses the trained GNN 2460 to predict events as the probability of the events happening based on input of a real-time (or current) situation and event graph input by the situation identifier 2428.

In general, the GNN 2460 includes an input layer 2461, one or more middle layers 2462 and 2463, and an output layer 2464. During the training phase, event graph information is obtained from the historical data database 2422. Each historical event graph is unraveled in chronological order and, for training, the $t_{n-1}$ state of the event graph is input and the GNN 2460 processes the input to predict $t_n$ new events and edges. Then, the known $t_n$ event graph is output to calculate the error from the predicted $t_n$ event graph and the error is used as feedback to change and update the GNN 2460 to improve future predictions.

Specifically, an event graph t 2470 at time t and an event graph t+w 2471 at time t+w, where w represents a time window change from time, t, are obtained from the historical data database 2422. The time window may be any length of time such as, for example, one second, five seconds, ten seconds, thirty seconds, one minute, etc. The event graph t 2470 and the event graph t+w 2471 are input to the input layer 2461 of the GNN 2460.

Then, the event graph t 2470 and the event graph t+w 2471 are transformed by an embedding layer 2472 into respective GNN node embedding t 2473 and embedding t+w 2474. The embedding layer 2472 may be the middle layer 2462 of the GNN 2460. The embedding t 2473 and the embedding t+w 2474 are processed through the middle layer 2463. In the test phase, the output layer 2464 outputs a loss that is compared to the actual event graph edge 2475.

At a high level, during the test phase, an evolving, real-time event graph is input from the situation identifier 2428 directly into the prediction manager 2432 and the GNN 2460. The GNN 2460, which may be continuously being trained as described above, results in a trained GNN. The GNN 2460 processes the real-time event graph through the input layer 2461, the middle layers 2462 and 2463, and the output layer 2464. The output layer 2464 outputs a new edge between events as an edge probability at a particular future time. That is, for each event graph, the stream of events is input to the GNN 2460 that produces a time-dependent embedding for each node of the graph. The embedding is processed through the GNN 2460 that is designed to produce a particular output. The particular output is a prediction of which node and event is going to be impacted in the future from the current event graph or situation. For example, the predicted edge can be from an SQL server node to a Tomcat node, and the edge can be due to a central processing unit's saturation to latency.

Figure 25:
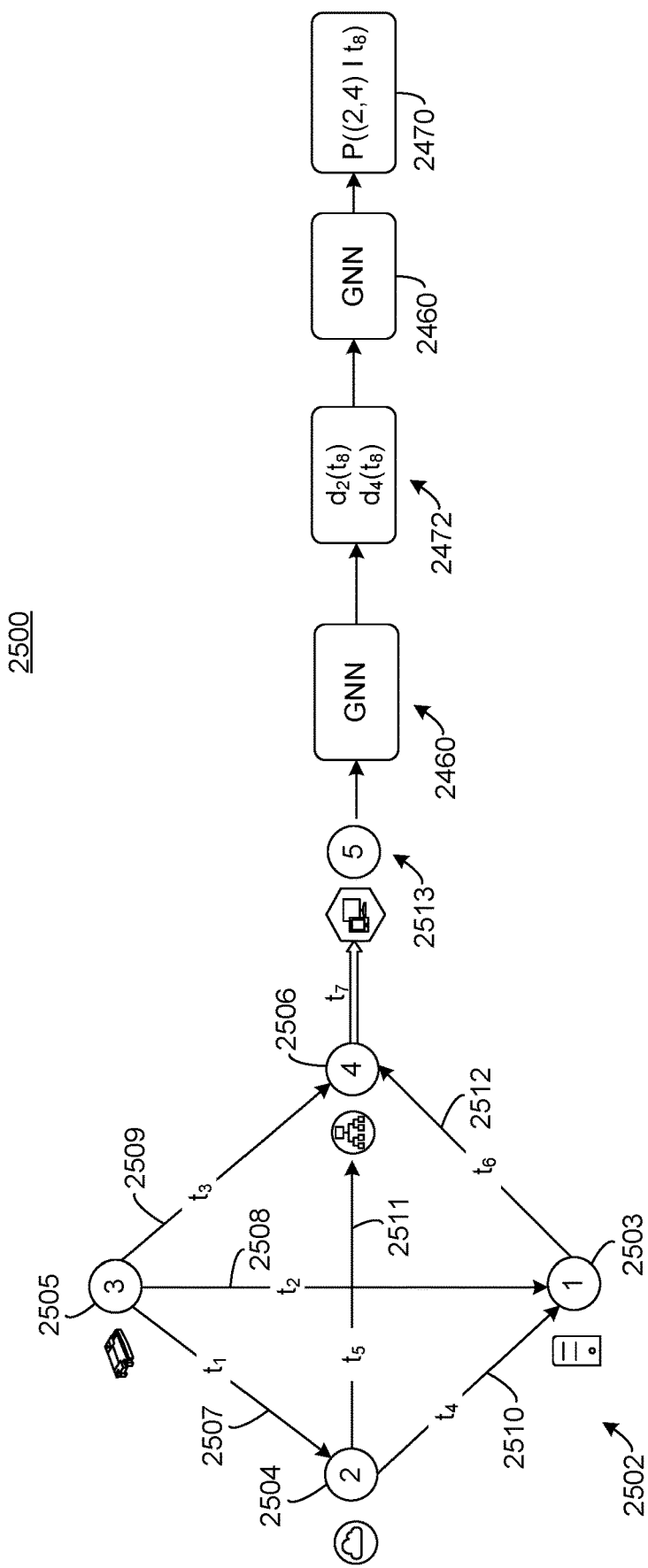
FIG. 25 illustrates an example flow diagram of a real-time event graph through the graph neural network (GNN) from FIG. 24.

FIG. 25 illustrates an example flow 2500 of a real-time event graph through the GNN 2460. An event graph 2502 includes five nodes 2503, 2504, 2505, 2506, and 2513 having six visible edges 2507, 2508, 2509, 2510, 2511, and 2512. In some implementations, the nodes 2503, 2504, 2505, 2506, and 2513 represent components of an IT landscape 103. The event graph 2502 is input into the GNN 2460 with timestamps $t_1$-$t_7$ with the goal of predicting the future failure at node 2504 propagating from node 2506 at time $t_8$. The embedding layer 2472 transforms the event graph 2502 to embeddings, which are fed through the layers of the GNN 2460 to output a prediction of the probability of a future failure at node 2504 propagating from node 2506 at time $t_8$.

Figure 26:
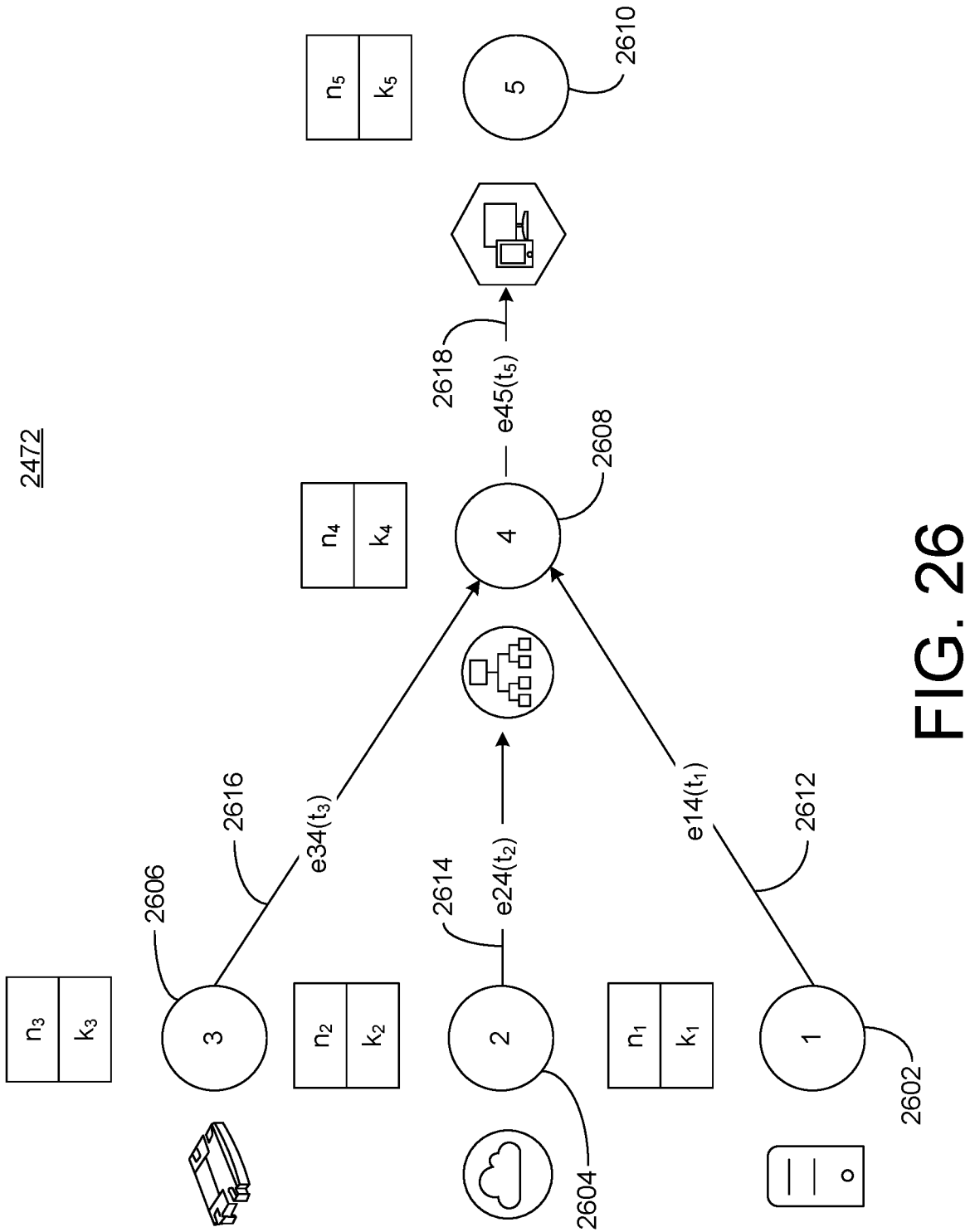
FIG. 26 illustrates an example embedding layer from the GNN from FIG. 24.

FIG. 26 illustrates an example embedding layer 2472 from the GNN 2460 from FIG. 24 for an event graph having five nodes: node 1 (2602), node 2 (2604), node 3 (2606), node 4 (2608), and node 5 (2610). The event graph includes edges 2612, 2614, 2616, and 2618.

The embedding layer 2472 also may be referred to as a spatiotemporal embedding layer. The embedding layer 2472 calculates the temporal embedding by executing a graph aggregation over the spatiotemporal neighbors of that node. Even though an event on a device may be inactive, the events around the device might be active. The embedding layer 2472 can compute an up-to-date embedding for the node by aggregating the memories of the node.

When calculating the embedding for causal event node 1 (2602) at some period t greater than $t_1$, $t_2$, and $t_3$, but lesser than $t_5$, the spatiotemporal neighborhood will include only edges that occurred before t and a neighboring t. Thus, the edge 2618 with node five (2610) is not involved in the computation because it happens in the future. Instead, the embedding layer 2472 aggregates from both the features and memories of node 2 (2604), node 3 (2606), and node 4 (2608) and the features on the edges 2612, 2614, and 2616 to compute a representation for node 1 (2602). The embedding layer 2472 is able to learn which neighbors are the most important based on the memory of the nodes, features, and time of interaction. The generated node embeddings are then passed through the middle layers 2462 and 2463 of the GNN 2460 to predict the future state of the event graph as a probability of new event causal edges. In the training phase, these predicted edges are used to calculate the loss or error of the GNN 2460 against the event graph known at a future timestamp and pass the feedback back to the GNN 2460 to improve the GNN 2460.

Figure 27:
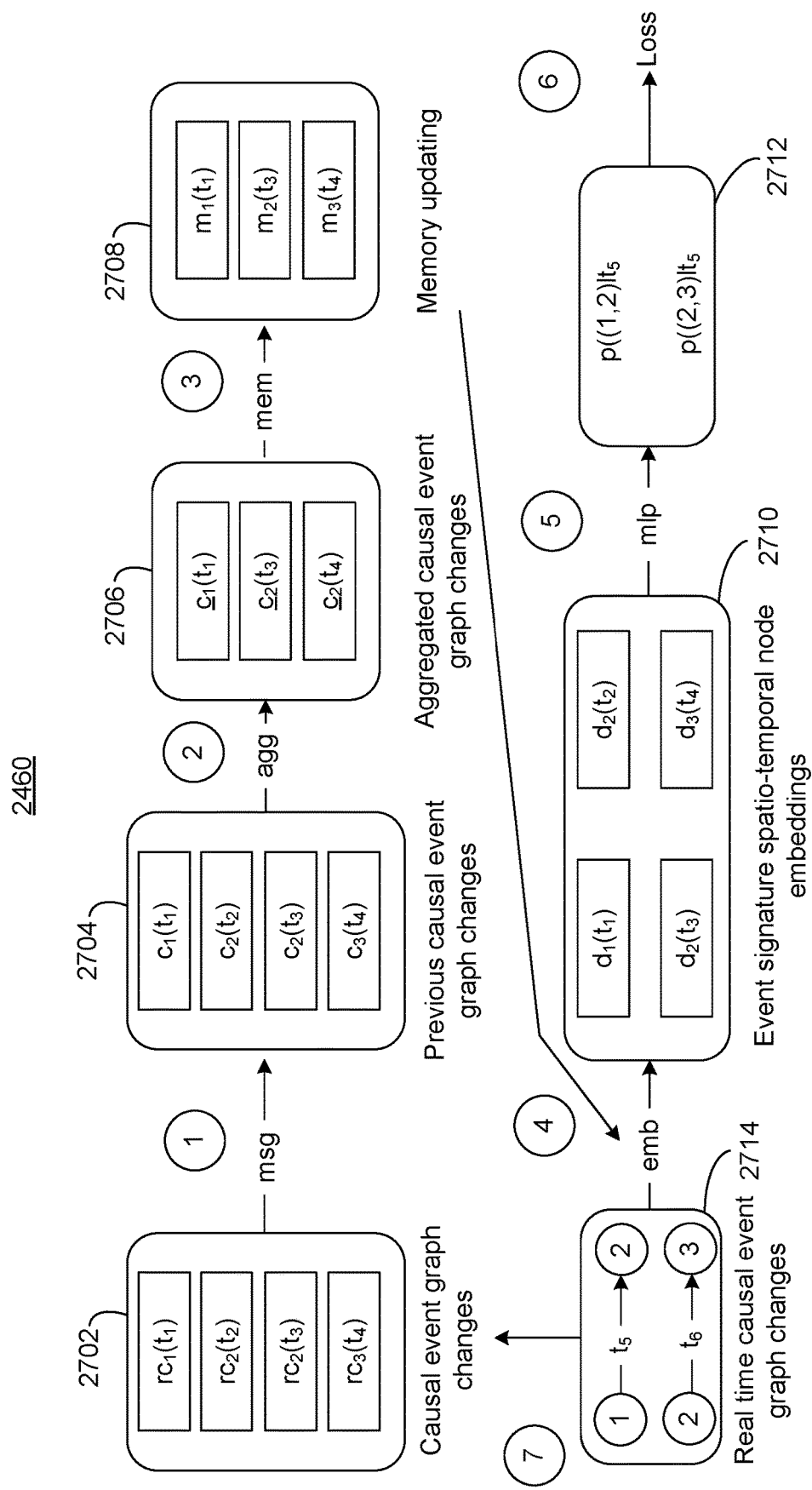
FIG. 27 illustrates an example GNN architecture flow for the GNN from FIG. 24.

FIG. 27 illustrates an example GNN architecture flow for the GNN 2460 from FIG. 24. The GNN 2460 obtains causal event graph changes (2702) in the form of a message and also obtains previous causal event graph changes (2704). The causal event graph message updates whenever a new edge is added. Both the source event signature and the destination event signature may be updated. The causal event graph message updates whenever a topology or node property changes. The GNN 2460 aggregates the causal event graph changes (2706), and updates memory (2708). The memory component stores the states of all nodes, which is essentially a compressed representation of the nodes' past interactions. The memory preserves the node topological property, the time delta, and the edge interaction.

The GNN 2460 uses the embedding layer to generate the event signature spatiotemporal node embeddings (2710). The node embeddings are not just a representation of the node but also the node's neighbors and the node's temporal neighborhood. The node embeddings also take into account the global evolution of the event graph since it includes the event graph changes and previous causal event graph changes.

The GNN 2460 processes the node embeddings through the middle layers 2462, 2463 of the GNN 2460 and outputs an edge probability of a future event between pairs of nodes at a future time (2712). For the training phase, a loss is output and compared to the known edge probability to provide feedback to the GNN 2460. For the test phase, the final output is the real time causal event graph changes (2714).

Figure 28:
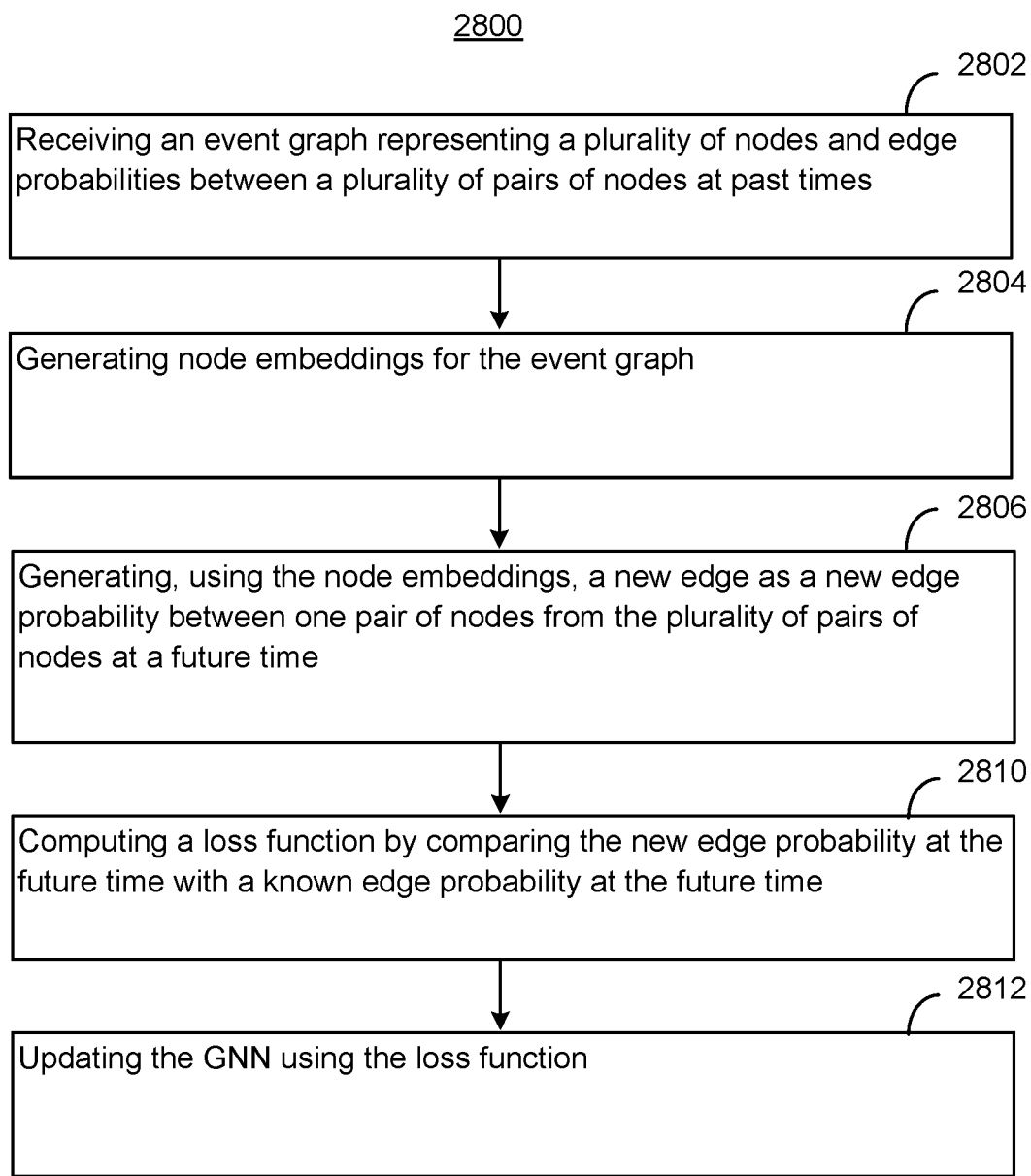
FIG. 28 is an example flow diagram of a process for training the prediction manager of FIG. 24.

FIG. 28 is an example flow diagram of a process 2800 for training the prediction manager 2432 of FIG. 24. Process 2800 includes receiving an event graph representing a plurality of nodes and edge probabilities between a plurality of pairs of nodes at past times (2802). For example, the prediction manager 2432 is configured to receive an event graph from the historical data database 2422. In some implementations, the event graph includes topology changes associated with the plurality of nodes in the event graph. The prediction manager 2432 may process the event graph in chronological order using the past times.

Process 2800 includes generating node embeddings for the event graph (2804). For example, the embedding layer 2472 is configured to generate node embeddings for the event graph. Generating the node embeddings for the event graph includes executing a graph aggregation over spatiotemporal neighbor nodes of the plurality of nodes in the event graph.

Process 2800 includes generating, using the node embeddings, a new edge as a new edge probability between one pair of nodes from the plurality of pairs of nodes at a future time (2806). For example, the GNN 2460 is configured to generate a new edge as a new edge probability between one pair of nodes from the plurality of pairs of nodes at a future time. The GNN 2460 uses the node embeddings to generate the new edge.

Process 2800 includes computing a loss function by comparing the new edge probability at the future time with a known edge probability at the future time (2810). For example, the GNN 2460 is configured to compute a loss function by comparing the new edge probability at the future time with a known edge probability at the future time (2810).

Process 2800 includes updating the GNN 2460 using the loss function (2812). For example, the GNN 2460 is updated using the loss function. In this manner, the GNN 2460 is trained in a continuous, self-supervised manner.

The updated GNN 2460 (or the trained GNN 2460) may receive a new event graph. The updated GNN 2460 may process the new event graph to generate and output a new edge for the new event graph having a new edge probability at a future time. In this manner, the trained GNN 2460 is able to predict future events and the probability of the future event as a new edge probability between a pair of nodes for current, real-time event graphs. The new edge probability represents the probability that one node in the pair has a causal relationship to the other node in the pair at the future time.

Figure 29:
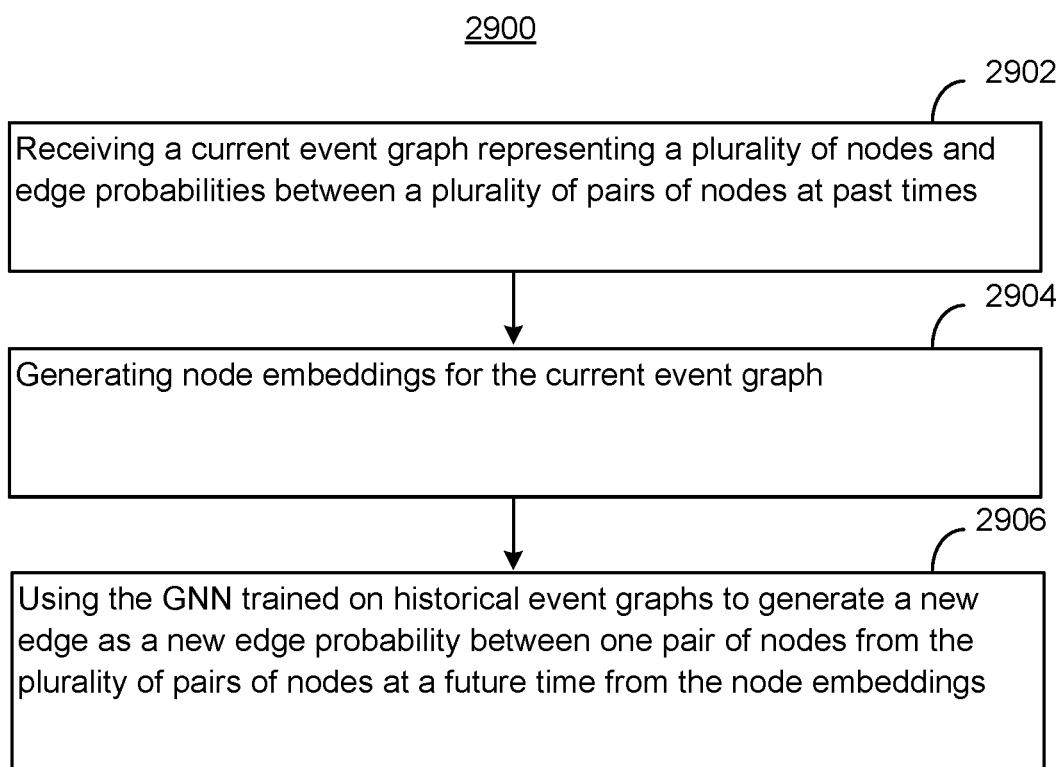
FIG. 29 is an example flow diagram of a process for using the prediction manager of FIG. 24 to process current event graphs.

FIG. 29 is an example flow diagram of a process 2900 for using the prediction manager 2432 of FIG. 24 to process current event graphs. Process 2900 includes receiving a current event graph representing a plurality of nodes and edge probabilities between a plurality of pairs of nodes at past times (2902). For example, the prediction manager 2432 is configured to receive a current event graph representing a plurality of nodes and edge probabilities between a plurality of pairs of nodes at past times. The current event graph may be a real-time event graph.

Process 2900 includes generating node embeddings for the current event graph (2904). For example, the embedding layer 2472 is configured to generate node embeddings for the event graph. Generating the node embeddings for the event graph includes executing a graph aggregation over spatiotemporal neighbor nodes of the plurality of nodes in the event graph.

Process 2900 includes using the GNN trained on historical event graphs to generate a new edge as a new edge probability between one pair of nodes from the plurality of pairs of nodes at a future time from the node embeddings (2906). For example, the GNN 2460 trains on historical event graphs to generate a new edge as a new edge probability between one pair of nodes from the plurality of pairs of nodes at a future time from the node embeddings. In this manner, the trained GNN 2460 is able to predict future events and the probability of the future event as a new edge probability between a pair of nodes for current, real-time event graphs. The new edge probability represents the probability that one node in the pair has a causal relationship to the other node in the pair at the future time.

Referring back to FIG. 1, the remediation generator 134 is discussed below in more detail with respect to FIGS. 30-37. In general, as information technology (IT) environments are getting more complex and dynamic, it is challenging for systems administrators, including site reliability engineers (SREs) to gain expertise across a varied spectrum of domains, from networking and infrastructure to applications. At the same time, without a flexible feedback mechanism, an SRE may not be able to capture the historical knowledge base on how specific issues have been fixed. For particular domains, where it takes an extensive understanding of a situation, event, or problem and an enormous amount of time to comprehend it, the tribal knowledge of experienced SREs is invaluable. Conventionally, although there are a few known policy-driven mechanisms to tackle such situations, events, or problems, those mechanisms are rigid and need to be updated whenever new patterns of situations, events, or problems emerge. Automation jobs may be executed to perform the remediation and resolve the situation, event, or problem.

The remediation generator 134 may be configured to recommend relevant remedial actions for a specific component and its failure mode in a ranked list. The order of the ranked list may be designed to be as close as possible to a user's sense of the ideal ordering of remedial actions dependent on specific failures. The remediation generator 134 also may also provide confidence values for each of the remedial actions. The confidence values may be a prediction of the user's sense of the relative usefulness of a remedial action when there are alarms for exceeded thresholds.

The remediation generator 134 may provide a technical solution that leverages textual, temporal, and topological space as well as custom user attributes to correlate the problems and the remedial actions uniquely. The remediation generator 134 includes a remedial action recommendation (RAR) model that learns from various user interactions along with signals from monitoring automation systems to improve the recommendations in a continuous fashion. These learnings primarily come from two kinds of feedback: implicit feedback and explicit feedback, as discussed in more detail below.

Figure 30:
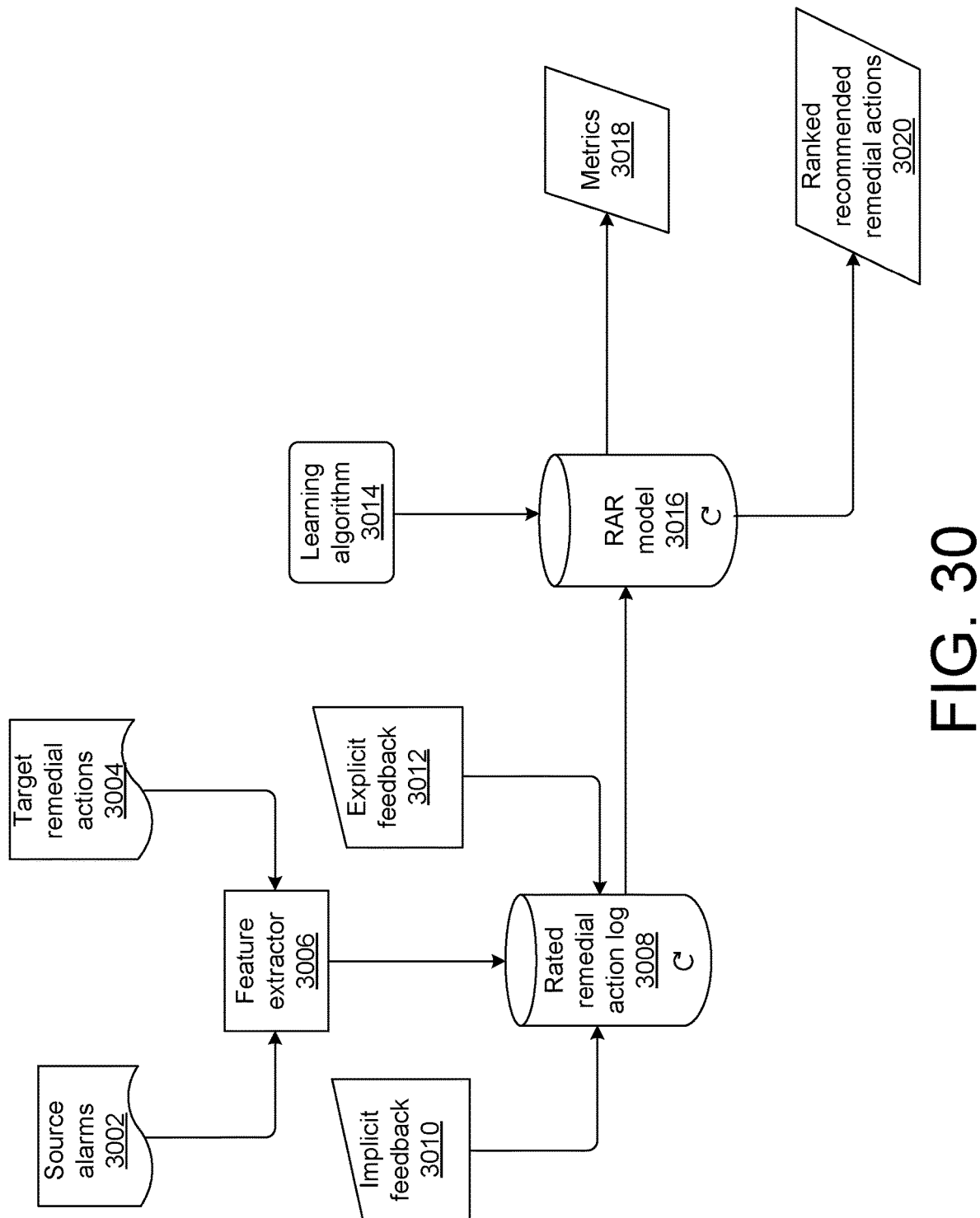
FIG. 30 illustrates an example flow diagram for overall operations of the remediation generator of FIG. 1.

FIG. 30 illustrates an example flow diagram for overall operations of the remediation generator 134 of FIG. 1. In general, data from source alarms 3002 and target remedial actions 3004 are input into a feature extractor 3006. Features may be ones that describe the source alarms 3002, the target remedial actions 3004, or some relationship between the source alarms 3002 and the target remedial actions 3004. The features extracted by the feature extractor 3006 may be administrator or user-configurable and/or customizable. In the absence of administrator-configured or user-configured features and/or custom features, a set of default features may be extracted.

Source alarms 3002 may refer to problems identified as being a root cause by the root cause inspector 130 of FIG. 1, as discussed above and below. Target remedial actions 3004 may refer to automated scripts that may be run to solve the identified situation, events, or problems. In some implementations, the source alarms 3002 and the target remedial actions 3004 may include event graphs such as event graph 2300 of FIG. 23, which are generated as discussed in detail above. The source alarms 3002 and the target remedial actions 3004 also may include topology information such as topology changes 2450 of FIG. 24 and event and node properties such as event and node properties 2452 of FIG. 24.

The features extracted by the feature extractor 3006 from the source alarms 3002 and the target remedial action 3004 are stored in a rated remedial action log 3008. The features extracted by the feature extractor 3006 include features extracted from event graphs. Additionally, both implicit feedback 3010 and explicit feedback 3012 are also stored in the rated remedial action log 3008. For example, implicit feedback is the feedback inferred from the interactions while the user is using the components of and interacting with the IT landscape 103 of FIG. 1. Implicit feedback can be positive or negative reinforcement based on the type of feedback. For example, an action where a user executes an automation job is positive reinforcement. Implicit feedback also includes delayed observations, such as whether the automation job was executed successfully and whether the automation job execution results in resolving the problem. If the problem persists after remediation, then the implicit feedback is captured as negative reinforcement.

Explicit feedback includes feedback that is given specifically with the intention to make the RAR model learn a particular heuristic. The explicit feedback may include feedback provided by experts, where the feedback is used to train the RAR model in terms of the nature of the environment. In some implementations, star ratings may be used as a form of explicit feedback for each recommendation, where a rating of 5 stars can be treated as a highly relevant recommendation and 1-star rating can be treated as a highly irrelevant recommendation.

The information stored in the rated remedial action log 3008, including the features extracted by the feature extractor 3006, the implicit feedback 3010, and the explicit feedback 3012 may be input to the RAR model 3016. Additionally, an output from a learning algorithm 3014 is input to the RAR model 3016.

In some implementations, the RAR model 3016 is an ensemble tree-based model based on LambdaMART. LambdaMART is a technique where ranking is transformed into a pair-wise classification or regression problem. The algorithms consider a pair of items at a single time, coming up with a viable ordering of those items before initiating the final order of the entire list. LambdaMART is a combination of LambdaRank and multiple additive regression trees (MART). MART uses gradient-boosted decision trees for prediction tasks; however, LambdaMART improves this by using gradient-boosted decision trees with a cost function derived from LamdaRank to order any ranking situation.

In the RAR model 3016, each tree of the ensemble is a weighted regression tree, and the final predicted score is the weighted sum of the prediction of each regression tree. A regression tree is a decision tree that receives as input a feature vector and returns a scalar numerical value as output. At a high level, the RAR model 3016 is an algorithm that uses gradient boosting to directly optimize rank-specific cost functions like normalized discounted cumulative gain also known as NDCG and expected reciprocal rank also known as ERR. The RAR model 3016 handles pair-wise errors by measuring the pair-wise errors according to how poorly the RAR model 3016 orders the corresponding sets of pairwise errors in terms of the margin and how significant the right order is from the aspect of the performance measure.

During the training operations discussed below with respect to FIG. 32, the RAR model 3016 uses the inputs from the rated remedial action log 3008 and the learning algorithm 3014 to output metrics 3018, which are used to improve the performance of the RAR model 3016. During real-time operations discussed below with respect to FIG. 33, the RAR model produces ranked recommended remedial actions 3020. In some implementations, the ranked recommended remedial actions 3020 include a confidence value for the ranked recommended remedial actions 3020.

Figure 31:
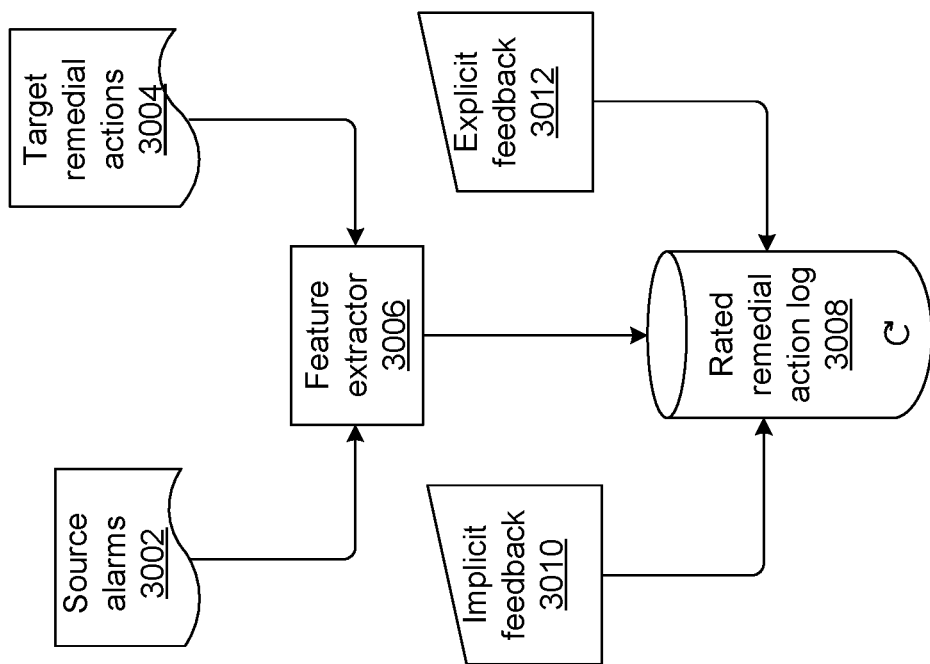
FIG. 31 illustrates an example flow diagram for logging operations of the remediation generator of FIG. 1.

FIG. 31 illustrates an example flow diagram for logging operations of the remediation generator 134 of FIG. 1. As mentioned above with respect to the overall flow illustrated in FIG. 30, the remediation generator 134 performs logging operations to capture and log various different types of information. For example, as discussed above, both source alarms 3002 and target remedial actions 3004 are input to the feature extractor 3006. The feature extractor 3006 extracts user-configurable and/or customizable features from the source alarms 3002 and the target remedial actions 3004. In the absence of user-configured features and/or custom features, the feature extractor 3006 extracts a set of default features from the source alarms 3002 and the target remedial actions 3004.

Examples of features extracted from the source alarms 3002 include an alarm text such as, for instance, "The alert M2E_average response time has exceeded major target." Other features extracted from the source alarms 3002 may include a product name, a severity level (e.g., normal, minor, major, critical, etc.), and an entity type. Examples of features extracted from the target remedial actions 3004 may include an object name, an object type, an object title, a last execution timestamp, and a number of executions of a workflow. The feature extractor 3006 may be configured to characterize and/or categorize the type of source alarms 3002 and the type of target remedial actions 3004.

The features extracted by the feature extractor 3006 are input to the rated remedial action log 3008. Additionally, as discussed above, both implicit feedback 3010 and explicit feedback 3012 are input and stored in the rated remedial action log 3008. In this manner, the rated remedial action log 3008 logs the implicit feedback 3010 and/or the explicit feedback 3012 associated with particular source alarms 3002 and/or particular target remedial actions 3004. For example, implicit feedback 3010 and/or explicit feedback 3012 associated with a particular target remedial action from the target remedial actions 3004 is logged in the rated remedial action log 3008 with the features extracted by the feature extractor 3006 for the particular target remedial action. Similarly, for example, implicit feedback 3010 and/or explicit feedback 3012 associated with a particular source alarm from the source alarms 3002 may be logged in the rated remedial action log 3008 with the features extracted by the feature extractor 3006 for the particular source alarm. The logging operations performed by the remediation generator 134 may be performed in a continuous operation of logging features and feedback as those items are received. The data logged in the rated remedial action log 3008 in then used to train the RAR model 3016 of FIG. 30.

Figure 32:
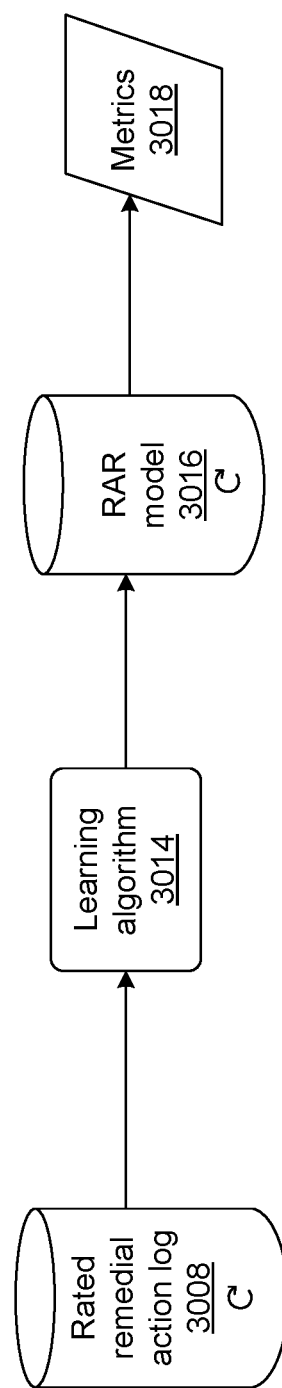
FIG. 32 illustrates an example flow diagram for model training operations of the remediation generator of FIG. 1.

FIG. 32 illustrates an example flow diagram for model training operations of the remediation generator 134 of FIG. 1. The model training operations may be performed offline to improve the performance and produce results of the RAR model 3016 for when the RAR model 3016 is used to provide real-time remedial recommendations.

Specifically, the logs from the rated remedial action log 3008 may be input to a learning algorithm 3014. In some implementations, the learning algorithm is a machine learning algorithm. In some implementations, the machine learning algorithm is a regression model that trains an ensemble of regression trees sequentially. At each inner vertices, a smaller number represents a feature label, and a larger number represents a threshold. The number at each leaf vertices represents the leaf output. The learning algorithm 3014 produces the trained regression trees, which are then input to the RAR model 3016.

Additional information may be input to the RAR model 3016 for training including identified root causes from discovered situations and remediation workflows from various automation products. Details of the RAR model 3016 are discussed above. The RAR model 3016 produces metrics to rate the RAR model 3016. The RAR model 3016 is optimized to minimize the loss in recommending relevant remedial actions in line with implicit feedback and explicit feedback. The RAR model 3016 is refreshed using the metrics 3018 before the RAR model 3016 is placed online to make real-time remedial action recommendations.

In this manner, the RAR model 3016 is trained using the implicit feedback 3010 and the explicit feedback 3012 associated with features of particular source alarms 3002 and target remedial actions 3004. Thus, when the RAR model 3016 is placed online, the RAR model 3016 receives input related to real-time source alarms and real-time target remedial actions, and the RAR model 3016, which has the benefit of being trained using previous feedback, may thus be able to provide meaningful ranked recommended remedial actions.

Figure 33:
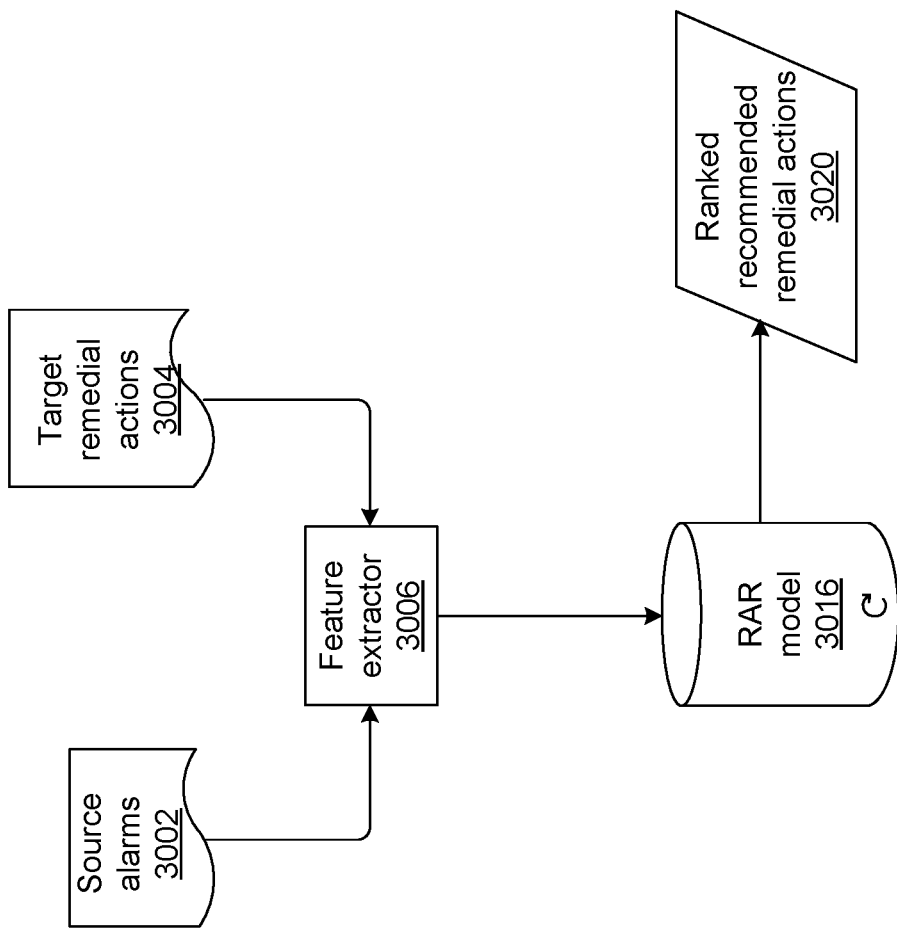
FIG. 33 illustrates an example flow diagram for real-time remedial action operations of the remediation generator of FIG. 1.

FIG. 33 illustrates an example flow diagram for real-time remedial action operations of the remediation generator 134 of FIG. 1. As mentioned above, during real-time remedial action operations, source alarms 3002 and target remedial actions 3004 are input to the feature extractor 3006. The source alarms 3002 and the target remedial actions 3004 may be received in real-time or in substantially real-time. The feature extractor 3006 extracts the features from the source alarms 3002 and the target remedial actions 3004, as discussed above. The features extracted by the feature extractor 3006 are input to the RAR model 3016. The RAR model 3016, which was trained offline as described above with respect to FIG. 32, processes the features and may produce ranked recommended remedial actions 3020. The ranked recommended remedial actions 3020 may include confidence values indicating a confidence level of each of the remedial actions. The ranking of the remedial actions may be based on the confidence value of the remedial actions.

FIG. 34 illustrates an example screen shot 3400 for obtaining implicit feedback and explicit feedback. For instance, the window 3402 may be presented to a user to elicit explicit feedback. In some implementations, the window 3402 may be presented with the intent to solicit particular feedback to train the RAR model 3016 for a particular heuristic. As mentioned above, the window 3402 may present a number of stars or other icons for the user to select to provide the explicit feedback.

The window 3404 on the screen shot 3400 provides an example for receiving implicit feedback. For example, the implicit feedback is received and inferred based on the interactions of the user when interacting with the solution. In this example, the solution is an example of ranked recommended remedial actions.

The implicit feedback can be either positive reinforcement or negative reinforcement. For example, if the user selects "Run this Automation," then that selection results in an inference of positive reinforcement.

In some implementations, delayed observations are also captured. For example, if the selected remediation action results in resolving the problem, then positive reinforcement implicit feedback is recorded. On the other hand, if the selected remediation action does not result in resolving the problem, then negative reinforcement implicit feedback is recorded.

In another example, FIG. 35 illustrates an example screen shot 3500 for obtaining implicit feedback or explicit feedback. In this example, feedback icons 3502 are provided to illicit explicit feedback from the user based on whether the user is positive or negative towards the recommended remedial action displayed alongside the feedback icons 3502.

Figure 36:
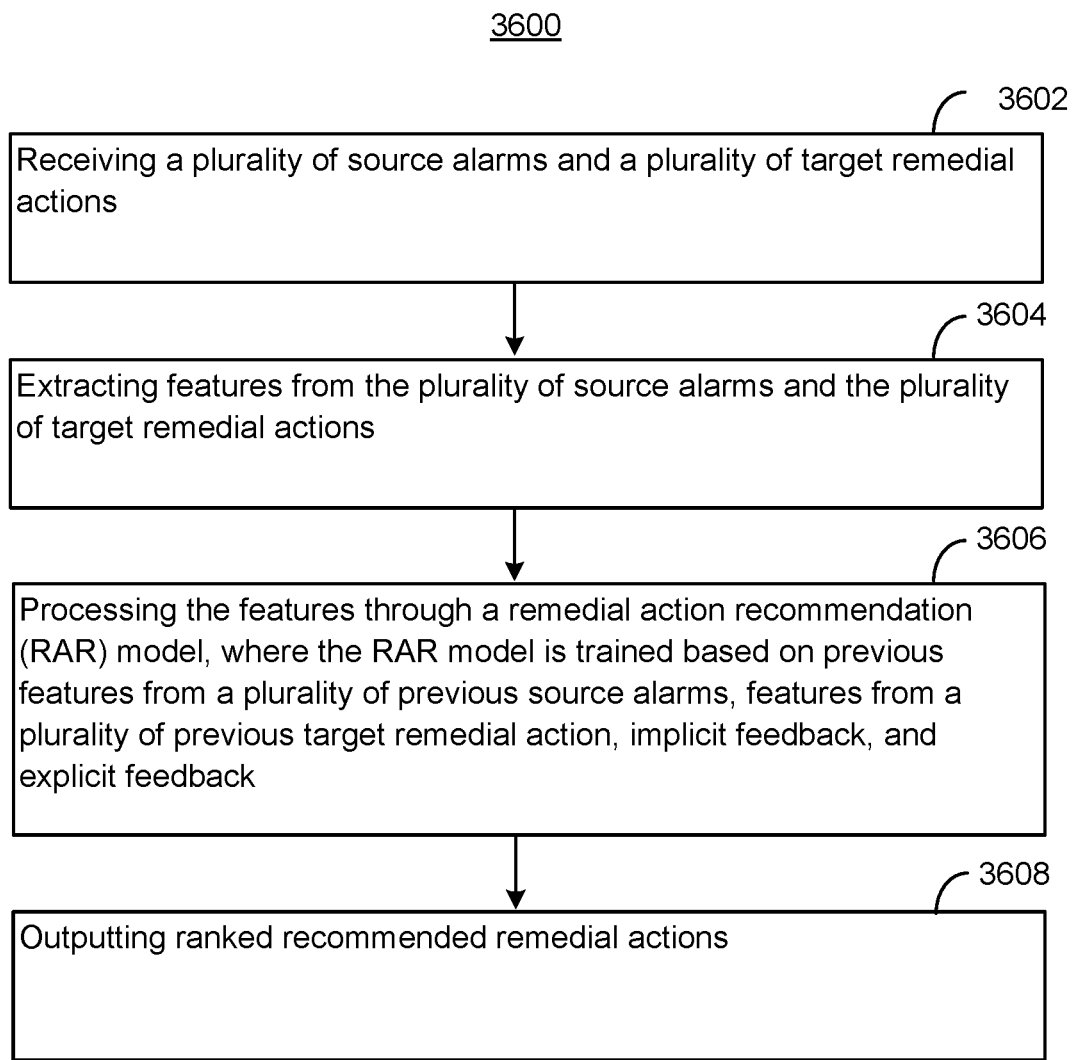

FIG. 36 is an example flow diagram of a process 3600 for using the remediation generator 134 of FIG. 1. In this example process 3600, the trained RAR model 3016 is used to determine ranked recommended remedial actions 3020.

Process 3600 includes receiving a plurality of source alarms and a plurality of target remedial actions (3602) and extracting features from the plurality of source alarms and the plurality of target remedial actions (3604). For example, the feature extractor 3006 may receive the source alarms 3002 and the target remedial actions 3004. The feature extractor 3006 may extract the features from the source alarms 3002 and the target remedial actions 3004.

Process 3600 includes processing the features through a remedial action recommendation (RAR) model, where the RAR model is trained based on previous features from a plurality of previous source alarms, features from a plurality of previous target remedial action, implicit feedback, and explicit feedback (3606). For example, the RAR model 3016 processes the features, where the RAR model 3016 was trained based on previous features from a plurality of previous source alarms, features from a plurality of previous target remedial action, implicit feedback, and explicit feedback.

As discussed above, in some implementations, the implicit feedback includes positive reinforcement implicit feedback when a target remedial action from the plurality of remedial actions closes a corresponding source alarm from the plurality of source alarms. In some implementations, the implicit feedback includes negative reinforcement implicit feedback. In some implementations, the implicit feedback includes feedback received without manual intervention. In some implementations, the explicit feedback includes a selected response from a user.

Process 3600 includes outputting ranked recommended remedial actions (3608). In some implementations, the RAR model 3016 may produce ranked recommended remedial actions 3020.

Figure 37:
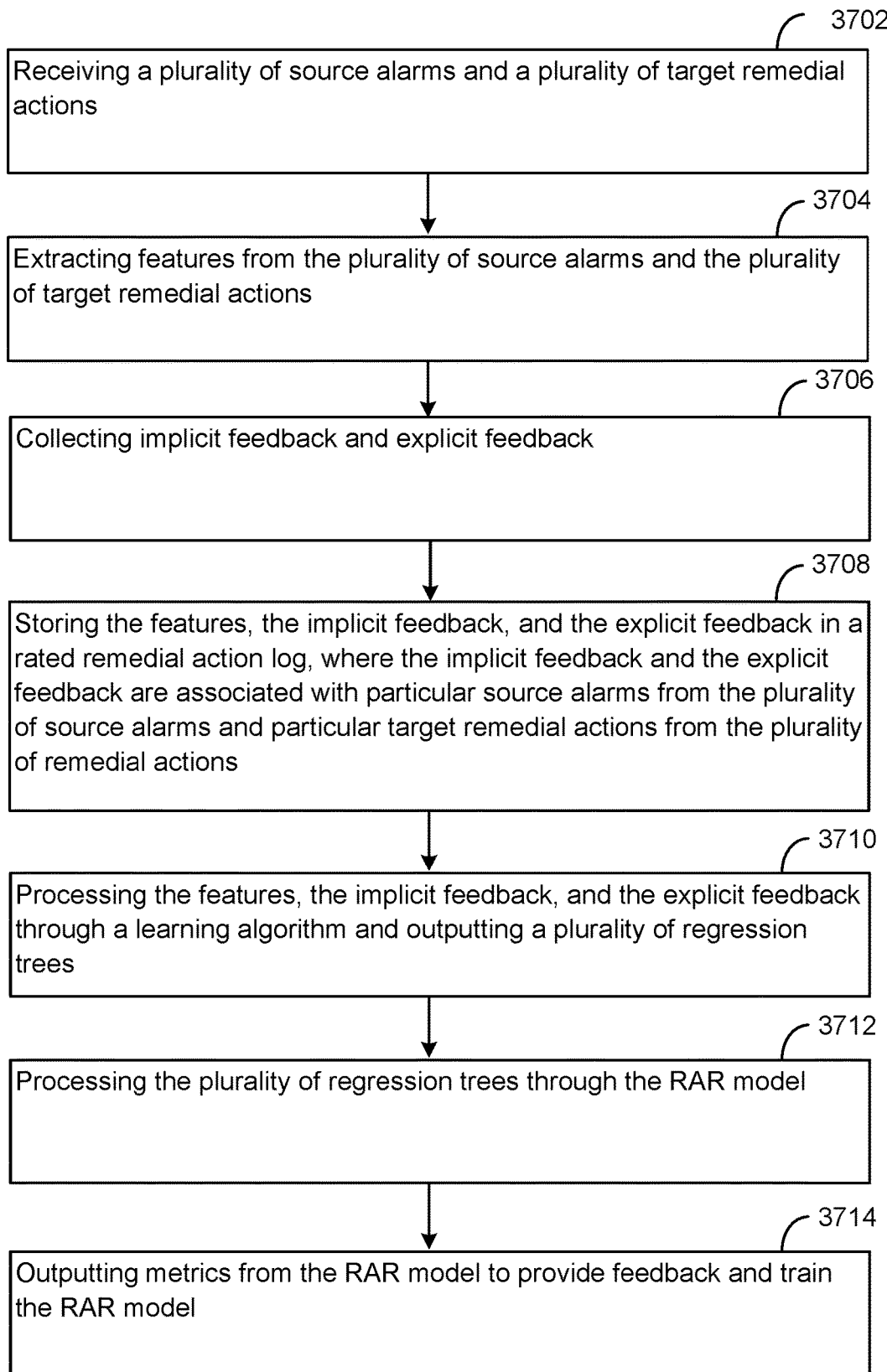
FIG. 37 is an example flow diagram of a process for using the remediation generator of FIG. 1.

FIG. 37 is an example flow diagram of a process 3700 for using the remediation generator 134 of FIG. 1. In this example process 3700, the remediation generator 134 is used to train the RAR model 3016.

Process 3700 includes receiving a plurality of source alarms and a plurality of target remedial actions (3702) and extracting features from the plurality of source alarms and the plurality of target remedial actions (3704). For example, the feature extractor 3006 may receive the source alarms 3002 and the target remedial actions 3004. The feature extractor 3006 may extract the features from the source alarms 3002 and the target remedial actions 3004.

Process 3700 includes collecting implicit feedback and explicit feedback (3706) and storing the features, the implicit feedback, and the explicit feedback in a rated remedial action log, where the implicit feedback and the explicit feedback are associated with particular source alarms from the plurality of source alarms and particular target remedial actions from the plurality of remedial actions (3708).

Process 3700 includes processing the features, the implicit feedback, and the explicit feedback through a learning algorithm and outputting a plurality of regression trees (3712). For example, the learning algorithm 3014 may process the features, the implicit feedback, and the explicit feedback and produce a plurality of regression trees.

Process 3700 includes processing the plurality of regression trees through the RAR model (3712) and outputting metrics from the RAR model to provide feedback and train the RAR model (3714).

Referring back to FIG. 1, the root cause inspector 130 is discussed below in more detail with respect to FIGS. 38-40. In the IT landscape 103 of FIG. 1, a failed component often causes other systems to fail, creating event and alarm situations, where the event and alarm situations may hide the real root cause of the failed component. The root cause inspector 130 may provide a technical solution to the technical problems encountered by a failed component that enables the root cause to be determined despite other system failures, events, and alarms, which may mask the root cause. In the described techniques, the root cause inspector 130 constructs a narrative for the administrator or end user, such that the root cause and its impact is determined and explained. The root cause inspector 130 constructs a causal graph that includes multiple causal priors including, for example, historical causal priors, topological causal priors, real-time causal priors, and custom causal priors. The root cause inspector 130 performs probabilistic root cause identification by ranking the graph vertices in their order of impact and importance, reducing the causal chains having multiple causal paths, and retaining the longest impacted path, which identifies the root cause.

Figure 38:
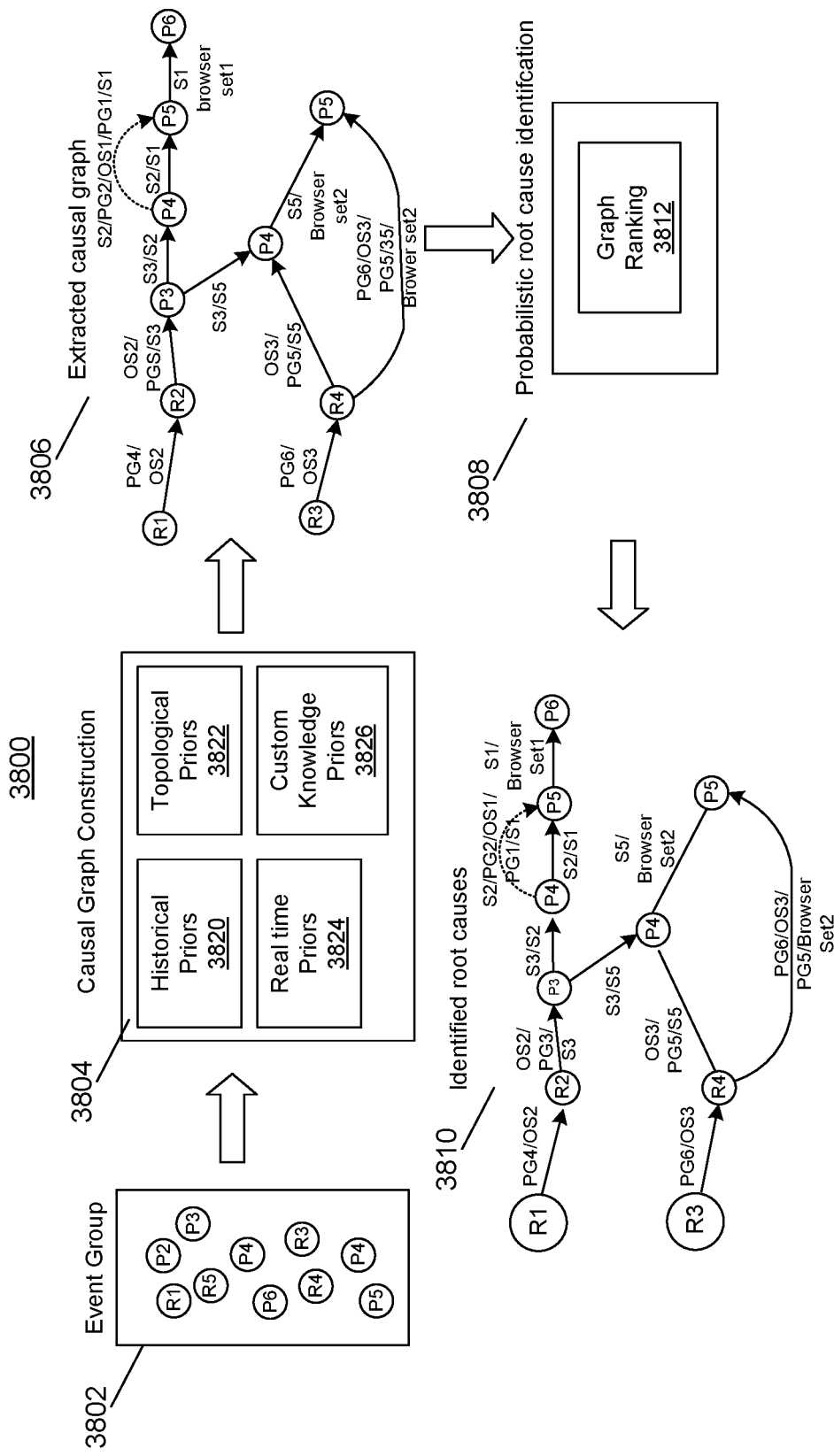
FIG. 38 illustrates an example flow diagram for operations of the root cause inspector of FIG. 1.
Figure 39:
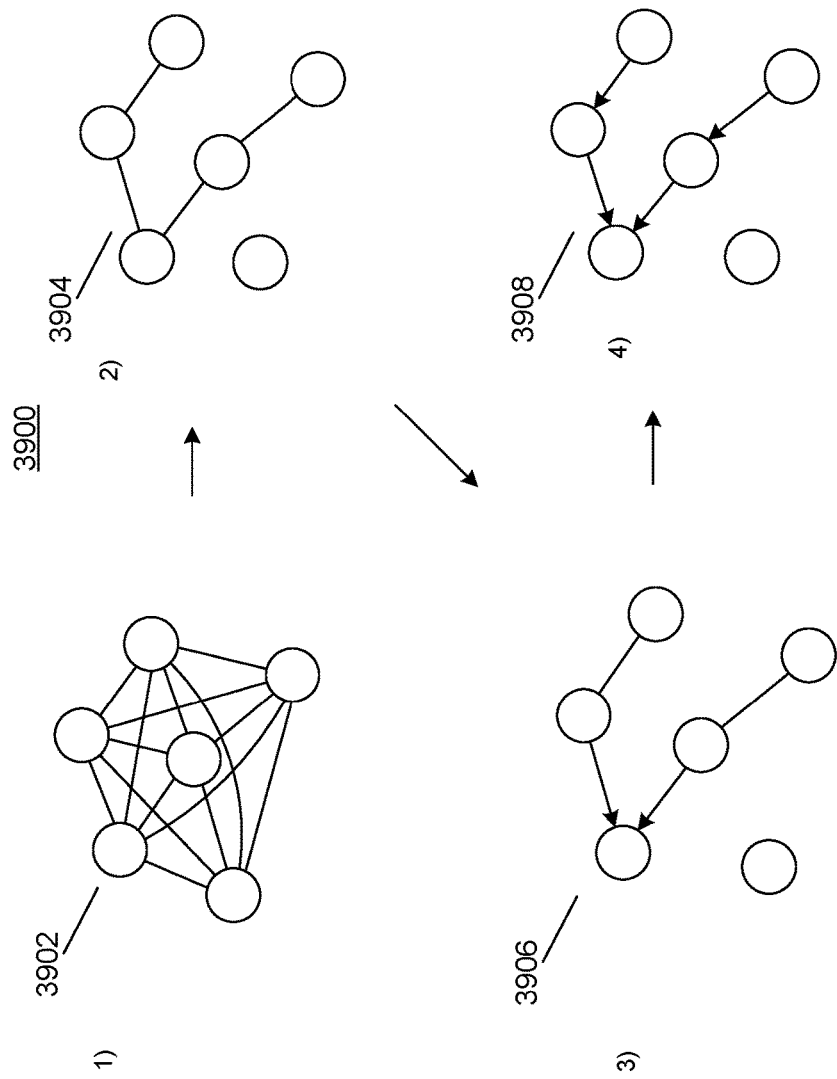
FIG. 39 illustrates an example directed acyclic graph estimation process using historical data.

Referring to FIG. 38, an example flow diagram 3800 details the operations of the root cause inspector 130 for identifying root causes. An event group 3802, analogous the event set 137 of FIG. 1, is input to and received by the root cause inspector 130. As discussed above, the situation identifier 128 of FIG. 1 provides directed clusters of events that define corresponding situations. Consequently, the root cause inspector 130 may be configured to identify, within each directed cluster of events, one or more specific events that should be a focus for correcting situations, events, or problems or for avoiding such situations, events, or problems in the future.

For example, the event group 3802 may include 10 events that lead to a system crash of the system 104 of FIG. 1. The 10 events may each include corresponding system violations, such as excessive memory usage. However, the excess memory usage may be caused by an underlying application that is malfunctioning, which also may be causing other events (e.g., excessive processor usage). The root cause inspector 130 may thus be configured to identify an event of a directed cluster of events as a root cause event. In many scenarios, however, identifying a root cause node may be more complex than simply picking an earliest event node within a directed cluster of event nodes.

Similar to the edge generator 140 of FIG. 1, the root cause inspector 130 may utilize various types of data referred to herein as 'priors,' to indicate types of information determined prior to root cause calculations being performed. The priors include historical priors 3820, topological priors 3822, real time priors 3824, and custom knowledge priors 3826. The root cause inspector 130 is configured to construct a causal graph by calculating one or more causal priors using the priors. Each causal prior is a probability distribution that will explain the causal effect of a variable over another. Below explains how each different prior is extracted and their significance.

The causal graph includes historical priors 3820. Historical priors are used to detect the causality of two given events using historical data about the system. The causality is a partial order relationship different from correlation, which is typically quantified by a correlation coefficient. The method using correlation as a causality may yield many false positives. The existence of a positive correlation between two events does not always imply causality. Hence, causal directions are estimated among events using historical data. The root cause identifier 130 uses probabilistic causal graphical models to infer causal relationships from the history of events.

Additionally, the root cause identifier 130 may use conditional independence to construct the causal graph from historical priors 3820. Assume that there are three events A, B, and C. A and B are conditionally independent for given C if $$P(A,B|C)=P(A|C)P(B|C).$$

Where the events A and B are independent as long as C appears. If A and B have a causality with C, A and B are independent because they always occur with C. In other words, a correlation between A and B disappeared by considering the related event C. It is understood that C may represent multiple events.

A probabilistic causal graphical model is a graph-based method to reconstruct causal relationships among nodes with conditional independence. It assumes a direct acyclic graph (DAG) of events corresponding to the causality of events. It does not allow any loops. FIG. 39 illustrates a DAG estimation process 3900 using historical priors, where process 3900 may be implemented by the root cause inspector 130.

Process 3900 includes constructing a complete (i.e., fully connected) undirected graph from nodes (events) (3902). Process 3900 includes detecting and removing edges without causality (i.e., uncorrelated edges) by checking conditional independence (3904). Process 3900 includes determining edge direction based on applying a V-structure (3906). Finally, process 3900 includes determining edge direction by applying an orientation rule (3908).

In some implementations, a G-square test is used to test conditional independence. The G-square test is a method to evaluate conditional independence of binary (consisting of zeros and ones) or multi-level data. The G-square test is a natural extension of the Chi-square test and is based on information theory, using cross-entropy. The G-square statistic G2 is defined as:

$$G2=2mCE(X,Y|Z)$$

Referring back to FIG. 38, the root cause inspector 130 constructs a causal graph using topological priors 3822. Topological priors 3822 also may include knowledge graph priors. The topology data 124 of FIG. 1 and the knowledge graph data 126 of FIG. 1 may be used when constructing a causal graph using topological priors 3822. The root cause inspector 130 detects the causality of given events using the observed topological priors 3822.

In some implementations, the root cause inspector 130 uses an attribute graph-based topological ontology service (TOS) that maintains the structure and dependencies within the environment to extract dependencies between different entities and extract topological priors. TOS forms the topology using a different source like transaction traces for application performance monitoring (APM) and network logs for network operations (NetOps).

The root cause inspector 130 constructs a causal graph using real time priors 3824. For example, events collected by the event collector 120 of FIG. 1 such as an alarm time-series captured from the periodic sampling of monitors 112 and 114, can be presumed to exhibit the behavior of a continuous, dynamic multi-variate system that is complex, non-linear, and non-stationary. If the entropy of events exciting an entity is more than the incoming entropy, then the extra information must have begun from disruption or failure. The real time priors 3824 measure the uncertainty imported into a system that affects vital entities, which intimates the severity and location of a fault or failure, and leverages information theory along with graph theory to track this uncertainty back to its original source.

Accordingly, the root cause inspector 130 may use transfer entropy (TE) evaluation to infer a weighted directed graph of events. TE is a dynamic, non-linear, and non-parametric measure for measuring the amount of directed transfer of information between two random processes. TE reduces to Granger causality for multivariate Gaussians.

TE evaluation models directed information transfer between time-series. The result includes an amount of information that a source event provides about a target event. TE explains the phenomena regarding how much information about the state change $X(k)$ i→X i+1 of X can be observed in the past state Y(1) of a source event Y. For example, how much information regarding an availability of a particular switch is provided about the running of a particular webserver running, given the previous state of the switch.

The root cause inspector 130 constructs a causal graph using custom knowledge priors 3826. Custom knowledge priors are probabilities from a knowledge graph (e.g., knowledge graph 126 of FIG. 1) extracted from a high-level understanding of specific systems along with incorporating domain knowledge. In some implementations, the root cause inspector 130 uses an adjacency matrix as a form of a directed graph for the custom knowledge priors 3826. In some implementations, the implicit feedback 3010 and/or the explicit feedback 3012 of FIG. 30 may be used to derive the high-level understanding of specific systems and domain knowledge of those systems.

From the event group 3802 and the causal graph construction 3804 using the priors, the root cause inspector 130 constructs an extracted cause graph 3806. The extracted causal graph 3806 uses edges between the nodes to indicate a probabilistic causal relationship between the nodes. The edges in addition to the probabilistic causal relationship between nodes also represent the causal strength of the relationship normalized from (0 to 1) where 1 means highly causal and 0 means barely causal.

The root cause inspector 130 then performs probabilistic root cause identification 3808 to find identified root causes 3810. Probabilistic root cause identification includes ranking the graph vertices from the extracted causal graph 3806 in their order of impact and importance and reducing the causal chains having multiple causal paths such that the longest impacted path is retained. Probabilistic root cause identification 3808 uses graph ranking 3812 to rank the graph vertices from the extracted causal graph 3806.

In graph ranking 3812, an algorithm is used to analyze the connectivity between event graph nodes to rank high impact causal nodes. The cumulative of the different causal priors is leveraged to determine a weighted directed graph. A combination of transfer entropy-based causal inference, historical causal inference, topological causal inference, and eigenvector network centrality is used to identify the probabilistic root causes.

In some implementations, there are two ways in which the eigenvector centrality can be leveraged to extract rank. For most of the applications, like ranking of web pages, entity rank based on the number and importance of incoming links to a specific vertex, or associations back to a particular page. Where it is desirable to determine the entity which has the maximum considerable amount of causal inference on the rest of the nodes, it is optimum to assign significance depending on the number and importance of outward connections from a specific entity.

Using eigenvector centrality, the influence of an entity present in a weighted directed graph is measured as the cumulative of impact score of entities having an edge connected to it which will in turn be multiplied by respective edge weights, where $C_{eig}(k)$ is the significance of entity k, $L_k$ is the list of entities with associations to $x_k$ and $w_{kj}$ are records of the edge weight matrix W. For this application, setting the edge weight matrix W should be column-stochastic, which means the sum of all the columns should be one and also the records are real and positive representing a standard for the strength of the connection between entities. The problem may be represented as a conventional eigenvalue problem.

$$Wx = \lambda x.$$

Even though many eigenvalues λ may be obtained with respect to several eigenvectors x, which can satisfy the above equation, those eigenvectors, which have all positive records and with an eigenvalue of unity i.e., λ=1, comprise the corresponding significance scores. This is the eigenvector associated with the probability vector specified on the stochastic matrix.

The root cause inspector 130 outputs the identified root causes 3810. As shown in the weighted directed graph of the identified root causes 3810, the nodes R1 and R3 have been identified as root causes because of their high impact causal chain with R1 having the longest impacted path from node R1 to node P6.

Figure 40:
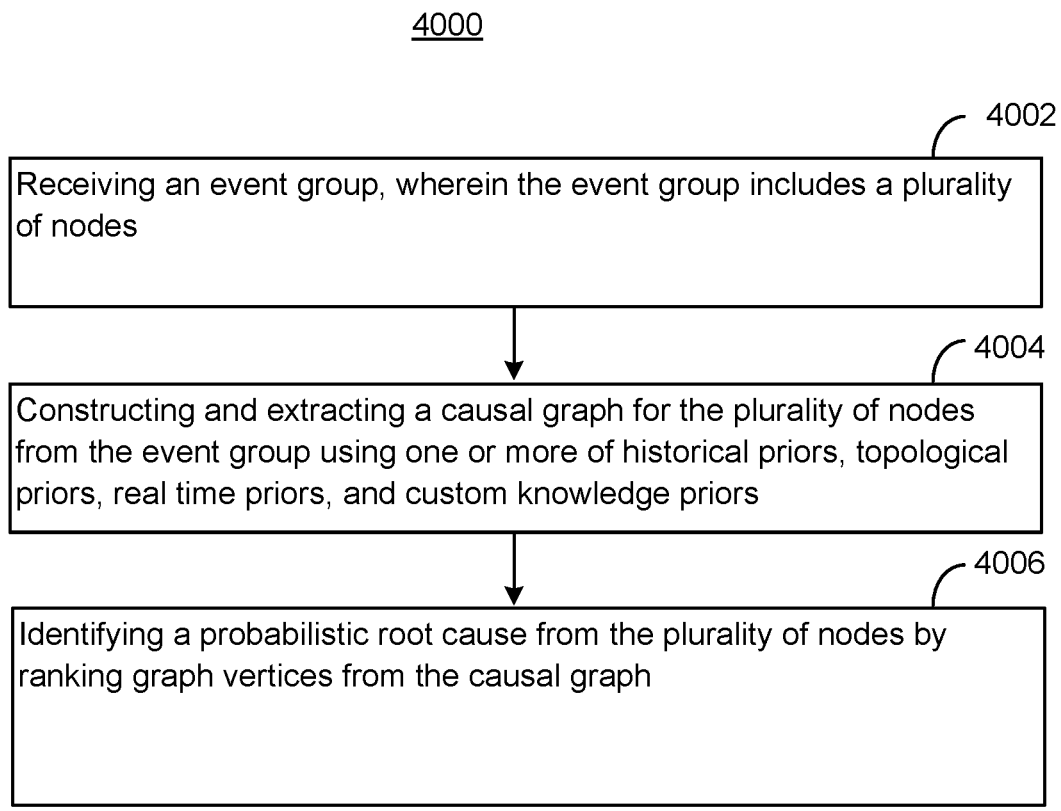
FIG. 40 is an example flow diagram of a process for using the root cause inspector of FIG. 1.

FIG. 40 is an example flow diagram of a process 4000 for using the root cause inspector 130 of FIG. 1. The process 4000 may be a computer-implemented method for identifying root causes. Process 4000 includes receiving an event group, where the event group includes a plurality of nodes (4002). For example, the root cause inspector 130 may receive the event group 3802, as discussed above.

Process 4000 includes constructing and extracting a causal graph for the plurality of nodes from the event group using one or more of historical priors, topological priors, real time priors, and custom knowledge priors (4004). For example, the root cause inspector 130 may construct and extract a causal graph 3806 for the plurality of nodes from the event group 3802 using one or more of historical priors 3820, topological priors 3822, real time priors 3824, and custom knowledge priors 3826.

Process 4000 includes identifying a probabilistic root cause from the plurality of nodes by ranking graph vertices from the causal graph (4006). For example, the root cause inspector 130 identifies a probabilistic root cause 3808 from the nodes by ranking graph vertices 3812 from the causal graph 3806. A longest impacted path between nodes in the plurality of nodes may be retained.

In some implementations, constructing and extracting the causal graph using the historical priors includes constructing an undirected graph from the plurality of nodes, detecting and removing edges without causality by checking conditional independence, determining an edge direction by applying a V-structure to the plurality of nodes, and determining the edge direction by applying an orientation rule to the plurality of nodes to generate a directed acyclic graph of the plurality of events. In some implementations, the conditional independence may be checked by applying a G-square test.

In some implementations, constructing and extracting the causal graph using the real time causal priors includes using a transfer entropy model to generate a weighted directed graph of the plurality of nodes.

In some implementations, constructing and extracting the causal graph using the custom knowledge priors includes using an adjacency matrix to determine a weighted directed graph of the plurality of nodes.

Implementations of the various techniques described herein may be implemented in digital electronic circuitry or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers, including mainframes and distributed servers, at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to, receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer-implemented method for identifying root causes, the computer-implemented method comprising:
   receiving an event group, wherein the event group includes a plurality of nodes;
   constructing and extracting a causal graph for the plurality of nodes from the event group using one or more of historical priors, topological priors, real time priors, and custom knowledge priors, wherein the causal graph uses edges between nodes of the causal graph to indicate a probabilistic causal relationship between the nodes and a normalized causal strength of the probabilistic causal relationship between the nodes; and
   identifying a probabilistic root cause from the plurality of nodes by ranking graph vertices from the causal graph using a root cause inspector.

2. The computer-implemented method as in claim 1, wherein constructing and extracting the causal graph using the historical priors includes:
   constructing an undirected graph from the plurality of nodes;
   detecting and removing edges without causality by checking conditional independence;
   determining an edge direction by applying a V-structure to the plurality of nodes; and determining the edge direction by applying an orientation rule to the plurality of nodes to generate a directed acyclic graph of a plurality of events.

3. The computer-implemented method as in claim 2, wherein checking conditional independence includes applying a G-square test.

4. The computer-implemented method as in claim 1, wherein constructing and extracting the causal graph using the real time priors includes using a transfer entropy model to generate a weighted directed graph of the plurality of nodes.

5. The computer-implemented method as in claim 1, wherein constructing and extracting the causal graph using the custom knowledge priors includes using an adjacency matrix to determine a weighted directed graph of the plurality of nodes.

6. The computer-implemented method as in claim 1, wherein constructing and extracting the causal graph includes using at least two of historical priors, topological priors, real time priors, and custom knowledge priors.

7. The computer-implemented method as in claim 1, wherein identifying the probabilistic root cause includes retaining a longest impacted path between nodes in the plurality of nodes.

8. A computer program product for identifying root causes, the computer program product being tangibly embodied on a non-transitory computer-readable medium and including executable code that, when executed, implements a root cause inspector that causes a computing device to:
receive an event group, wherein the event group includes a plurality of nodes;
construct and extract a causal graph for the plurality of nodes from the event group using one or more of historical priors, topological priors, real time priors, and custom knowledge priors, wherein the causal graph uses edges between nodes of the causal graph to indicate a probabilistic causal relationship between the nodes and a normalized causal strength of the probabilistic causal relationship between the nodes; and
identify a probabilistic root cause from the plurality of nodes by ranking graph vertices from the causal graph.

9. The computer program product of claim 8, wherein constructing and extracting the causal graph using the historical priors includes executable code that, when executed, causes the computing device to:
construct an undirected graph from the plurality of nodes;
detect and remove edges without causality by checking conditional independence;
determining an edge direction by applying a V-structure to the plurality of nodes; and
determine the edge direction by applying an orientation rule to the plurality of nodes to generate a directed acyclic graph of a plurality of events.

10. The computer program product of claim 9, wherein checking conditional independence includes applying a G-square test.

11. The computer program product of claim 8, wherein constructing and extracting the causal graph using the real time priors includes using a transfer entropy model to generate a weighted directed graph of the plurality of nodes.

12. The computer program product of claim 8, wherein constructing and extracting the causal graph using the custom knowledge priors includes using an adjacency matrix to determine a weighted directed graph of the plurality of nodes.

13. The computer program product of claim 8, wherein constructing and extracting the causal graph includes using at least two of historical priors, topological priors, real time priors, and custom knowledge priors.

14. The computer program product of claim 8, wherein identifying the probabilistic root cause includes retaining a longest impacted path between nodes in the plurality of nodes.

15. A system for identifying root causes, comprising:
at least one processor; and
a non-transitory computer readable medium comprising instructions that, when executed by the at least one processor, implements a root cause inspector that causes the system to:
receive an event group, wherein the event group includes a plurality of nodes;
construct and extract a causal graph for the plurality of nodes from the event group using one or more of historical priors, topological priors, real time priors, and custom knowledge priors, wherein the causal graph uses edges between nodes of the causal graph to indicate a probabilistic causal relationship between the nodes and a normalized causal strength of the probabilistic causal relationship between the nodes; and
identify a probabilistic root cause from the plurality of nodes by ranking graph vertices from the causal graph.

16. The system of claim 15, wherein constructing and extracting the causal graph using the historical priors includes instructions that, when executed by the at least one processor, causes the system to:
construct an undirected graph from the plurality of nodes;
detect and remove edges without causality by checking conditional independence;
determining an edge direction by applying a V-structure to the plurality of nodes; and
determine the edge direction by applying an orientation rule to the plurality of nodes to generate a directed acyclic graph of a plurality of events.

17. The system of claim 16, wherein checking conditional independence includes applying a G-square test.

18. The system of claim 15, wherein constructing and extracting the causal graph using the real time priors includes using a transfer entropy model to generate a weighted directed graph of the plurality of nodes.

19. The system of claim 15, wherein constructing and extracting the causal graph using the custom knowledge priors includes using an adjacency matrix to determine a weighted directed graph of the plurality of nodes.

20. The system of claim 15, wherein constructing and extracting the causal graph includes using at least two of historical priors, topological priors, real time priors, and custom knowledge priors.

21. The system of claim 15, wherein identifying the probabilistic root cause includes retaining a longest impacted path between nodes in the plurality of nodes.

* * * * *